United States Patent [19]
Sager et al.

[11] Patent Number: 5,835,745
[45] Date of Patent: Nov. 10, 1998

[54] HARDWARE INSTRUCTION SCHEDULER FOR SHORT EXECUTION UNIT LATENCIES

[76] Inventors: David J. Sager, 11 Larch Rd., Acton, Mass. 01720; James Benjamin Saxe, 1072 Tanland Dr., #106, Palo Alto, Calif. 94303

[21] Appl. No.: 612,130

[22] Filed: Mar. 7, 1996

Related U.S. Application Data

[63] Continuation of Ser. No. 499,874, Jul. 10, 1995, abandoned, which is a continuation of Ser. No. 975,319, Nov. 12, 1992, abandoned.

[51] Int. Cl.⁶ .................................................. G06F 9/06
[52] U.S. Cl. .......................... 395/391; 395/390; 395/392; 395/393; 395/800.23
[58] Field of Search .................... 395/800, 376, 395/427, 390, 391, 392, 393, 800.23; 369/DIG. 1

[56] References Cited

U.S. PATENT DOCUMENTS

| | | | |
|---|---|---|---|
| 4,807,115 | 2/1989 | Torng | 364/DIG. 1 |
| 4,847,755 | 7/1989 | Morrison et al. | 364/DIG. 1 |
| 5,021,945 | 6/1991 | Morrison et al. | 364/DIG. 1 |
| 5,202,975 | 4/1993 | Rasbold et al. | 395/500 |
| 5,247,628 | 9/1993 | Grohoski | 395/390 |
| 5,251,306 | 10/1993 | Tran | 395/375 |
| 5,313,551 | 5/1994 | Labrouse et al. | 395/425 |
| 5,371,684 | 12/1994 | Iadonato et al. | 364/491 |
| 5,509,130 | 4/1996 | Trauben et al. | 395/391 |
| 5,517,628 | 5/1996 | Morrison et al. | 395/581 |

OTHER PUBLICATIONS

Gao et al; "An Efficient Pipelined Dataflow Processor Architecture"; IEEE; 1988; pp. 368–373.

Moore et al., "IBM Single Chip RISC Processor (RSC)", Computer Design—ICCD '92, IEEE, pp. 200–204, 1992.

Two–Level Adaptive Training Branch Prediction Yeh et al. International Symposium on Microarchitecture After Nov. 18–20, 1991 Paper # 0–89791–460–0/91/0011/0051.

Instruction Reordering for Fork–Join Parallelism, After Jun. 20–22, 1990 Paper # 0–89791–364–7/90/0006/0322.

Alternative Implementations of Two–Level Adaptive Branch Prediction, Yeh, et al. The 19th Annual Symposium on Computer Architecture May 1992.

Dynamic Instruction Scheduling and the Astronautics ZS–1, James E. Smith, Jul. 1989, Computer Magazine.

*Primary Examiner*—Alyssa H. Bowler
*Assistant Examiner*—Walter D. Davis

[57] ABSTRACT

A pipelined processor includes an instruction box including a register mapper, to map register operand fields of a set of instructions and an instruction scheduler, fed by the set of instructions, to reorder the issuance of the set of instructions from the instruction processor. The mapped register operand fields are associated with the corresponding instructions of the reordered set of instructions prior to issuance of the instructions. The processor further includes a branch prediction table which maps a stored pattern of past histories associated with a branch instruction to a more likely prediction direction of the branch instruction. The processor further includes a memory reference tagging store associated with the instruction scheduler so that the scheduler can reorder memory reference instructions without knowing the actual memory location addressed by the memory reference instruction.

12 Claims, 27 Drawing Sheets

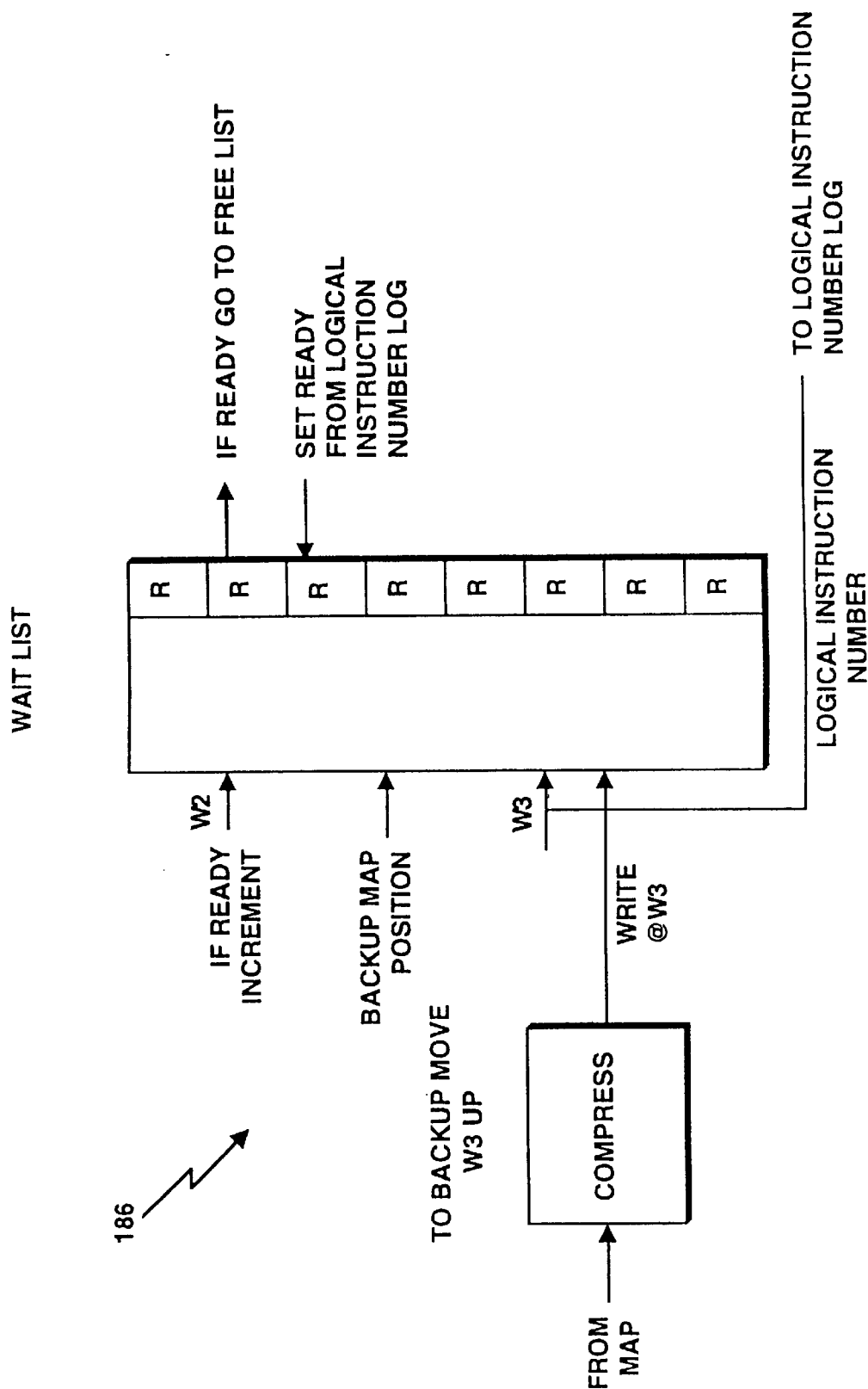

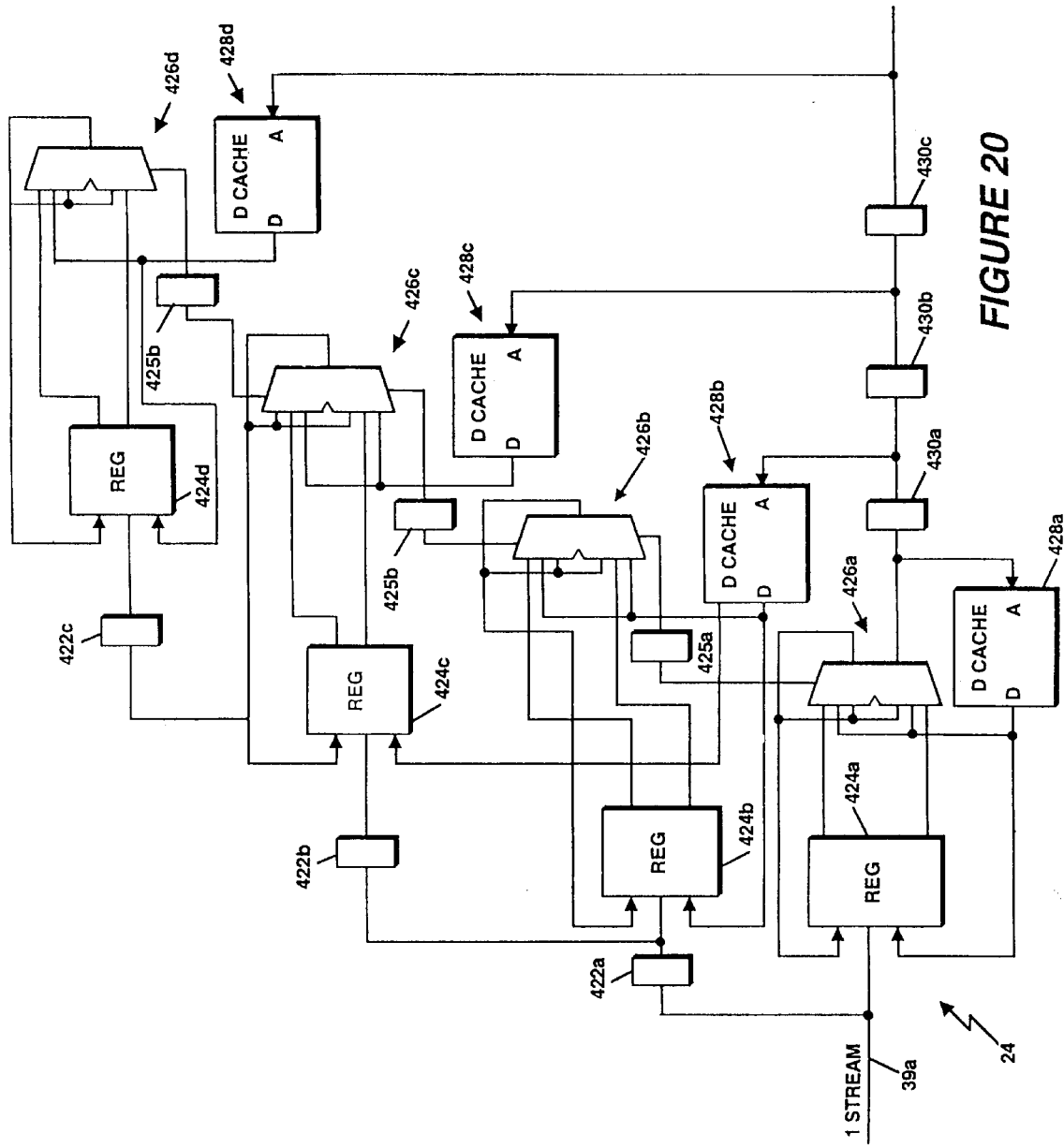

HARDWARE INSTRUCTION SCHEDULER FOR SHORT EXECUTION UNIT LATENCIES

This application is a continuation of application Ser. No. 08/499,874, filed Jul. 10, 1995, now abandoned, which is a continuation of application Ser. No. 07/975,319, filed Nov. 12, 1992 now abandoned.

BACKGROUND OF THE INVENTION

This invention relates generally to computer systems and more particularly to reordering of instructions in pipelined processors.

As it is known in the art, computer systems have become ubiquitous. In particularly, one type of computer system widely employed is the so-called pipeline processor. In a pipeline processor, processor actions are decomposed into a plurality of steps in order to increase throughput. As an example of pipelining, a pipelined instruction stage decomposes instructions into assembly like stages. Illustratively, a pipeline stage includes an instruction fetch stage in which instructions are fetched in one or several cycles from a cache memory, and instruction decode stage in which the op code of the instruction, that is the portion of the code which determines the function of the instruction is examined to ascertain the function as well as the resources needed by the instruction. Illustrative example of resources may include general purpose registers within the CPU, access to internal buses and external buses, and functional units such as I/O units and arithmetic logic units and so forth. A third stage is typically the instruction issue stage in which resource availability is checked for each instruction and resources are reserved for particular instructions. Generally during the instruction issue stage operands are read from registers during the issue stage. The fourth stage of a typical parallel pipeline computer system is the execution stage in which instructions are executed in one or several pipelined execution stages typically writing results into general purpose registers during the last execution stage.

In an ideal pipeline processor, time is measured in CPU clock periods. In theory, the clock period for a P-stage pipelined processor would be 1/P of the clock period for a non-pipelined equivalent since the non-pipelined equivalent would have P–1 less stages of execution for the instruction. Thus, with the pipelined approach there is the potential for a P times increase in throughput or performance improvement over a conventional non-pipelined architecture.

There are several practical limitations on pipeline performance however which prevents a pipeline processor from achieving a times P throughput improvement.

One particular limitation on practical performance are instruction dependencies. Instruction dependencies occur when instructions that are next to execute depend upon the results of previous instructions which have not yet finished executing. Therefore the instructions that are next to execute have to wait for the previous instructions to complete before they can proceed through the pipeline.

Two types of instruction dependencies may be identified. The first one is the so-called data dependency which occurs when instructions use the same input and or output operands as for example when an instruction uses the result of a preceding instruction as an input operand. A data dependency may cause an instruction to wait in the pipeline for the preceding instruction to complete. A control dependency on the other hand, occurs when a control decision such as for example a conditional branch decision must be made before subsequent instructions can be executed.

When an instruction dependency occurs, all instructions following the instruction being executed are blocked from executing and typically the instruction in the pipeline is stalled in the instruction pipeline stage and does not proceed further until the instruction ahead of it proceeds or at the issue stage until all resources and data dependencies for the particular instruction are satisfied. When a large number of instruction dependencies occur in a program executed by a pipeline processor, the performance advantages implicit in a pipeline processor are reduced accordingly.

One technique known in the art to overcome the occurrence of instruction dependencies is so-called instruction scheduling. That is by using equivalent but reordered code sequences, the pipelined processor can have improved performance by having the instruction scheduler eliminate many of the so-called instruction dependencies. This is often done in an instruction scheduler in which the instructions are reordered by some algorithm to eliminate register conflicts that appear to the hardware as data dependencies and thus reduce the occurrence of data dependencies by executing instructions in a rescheduled order.

The general approach to instruction scheduling is the so-called Tomasulo scheduler. In this technique, logical decisions are made to reorder instructions at the time they are issued from the instruction box. This technique has several drawbacks. One problem is that this type of scheduling technique is not suitable for short latency instruction execution.

That is, since the scheduler logic schedules instructions at the time they issue, a signficant amount of logically decisions are required to be processed via an appropiated logic network, before the instructions involved can issue. For example, if an instruction sequence contains instructions A, B, and C where B depends upon A and C depends upon B, the Tomasulo scheduler can only schedule one the instructions A, B, C per cycle. Since there is a signficant amount of logic involved to schedule instructions, the cycle time of the scheduler is too long to permit scheduling of these instructions in a common cycle. That is there is by necessity, a minimun time between issuance of instruction A and B and between issuance of instructions B and C. This minimum time is longer than the latency of integer arithematic logic units that can be designed for fast execution. Hence, the scheduler has a cycle time which could be longer than the remaining portions of the machine.

SUMMARY OF THE INVENTION

In accordance with the present invention an apparatus for scheduling a stream of instructions per cycle of the apparatus includes means for scheduling a stream of instructions for execution by providing each instruction in said stream of instruction with a cycle number indication of when the instruction can be issued by the apparatus and means for storing said stream of instruction and the cycle number of when the instruction can be issued. With such an arrangement, a scheduler which is suitable for short latency execution cycles is provided. Since the scheduler schedules instructions before a need arises to issue them, the scheduler can work as fast as is necessary. Moreover, the scheduler can handle instruction dependancies by scheduling in the same scheduling cycle multiple instructions with such dependencies to issue in different cycles. The scheduler can also schedule the instructions to issue in a cycle with other instructions for which resources are ready or for which no dependancy is found. That is, the scheduler is particular well suited for multiple execution machines having fast execution units.

In accordance with a further aspect of the present invention, an apparatus includes means for storing a status bit indication of the availability of data associated with the contents of a plurality of stored register operands and means for determining whether a source register operand of one of said instructions is dependant upon a destination operand of any one of the plurality of instructions preceding said instruction. The apparatus further includes means for determining for each of said instructions suceeding a current instruction, possible combinations of latencies of said current instruction and preceding ones of said current instruction in a current instruction cycle and a base number of cycles of execution when each operand of said current instruction will have valid data ready, and means for comparing the base number and an earliest possible cycle number value and said latency combinations for each of said instructions, and assigning for each of said instructions the smallest one of said values as an issue cycle number associated with said instruction. The instructions and the associated issue cycle numbers are stored. The instructions are issued from the scheduler in accordance with the associated issue cycle numbers. With such arrangement, a scheduler apparatus is provided which schedules instructions as they are fetched from a cache of instructions rather than at the time the instructions are needed by an execution box. The scheduler examines all potential data dependencies associated with a stream of instructions and determines when results needed by one later instruction will be available from an earlier instruction. The scheduler assigns a cycle number based upon these dependancies to the instruction. The cycle number is an indication of when an instruction can be sent to an execution box. The scheduler stores this cycle number with the associated instruction. Since, the scheduler can schedule multiple instructions in an instruction cycle it is well suited for multiple execution, short latency execution units.

BRIEF DESCRIPTION OF THE DRAWINGS

FIG. 6A is a block diagram of a wait list used in the integer mapper of FIG. 6;

FIG. 20 is a block diagram of an arithmetic logic unit used in the computer system of FIG. 2.

DESCRIPTION OF THE PREFERRED EMBODIMENTS

Figure 1:
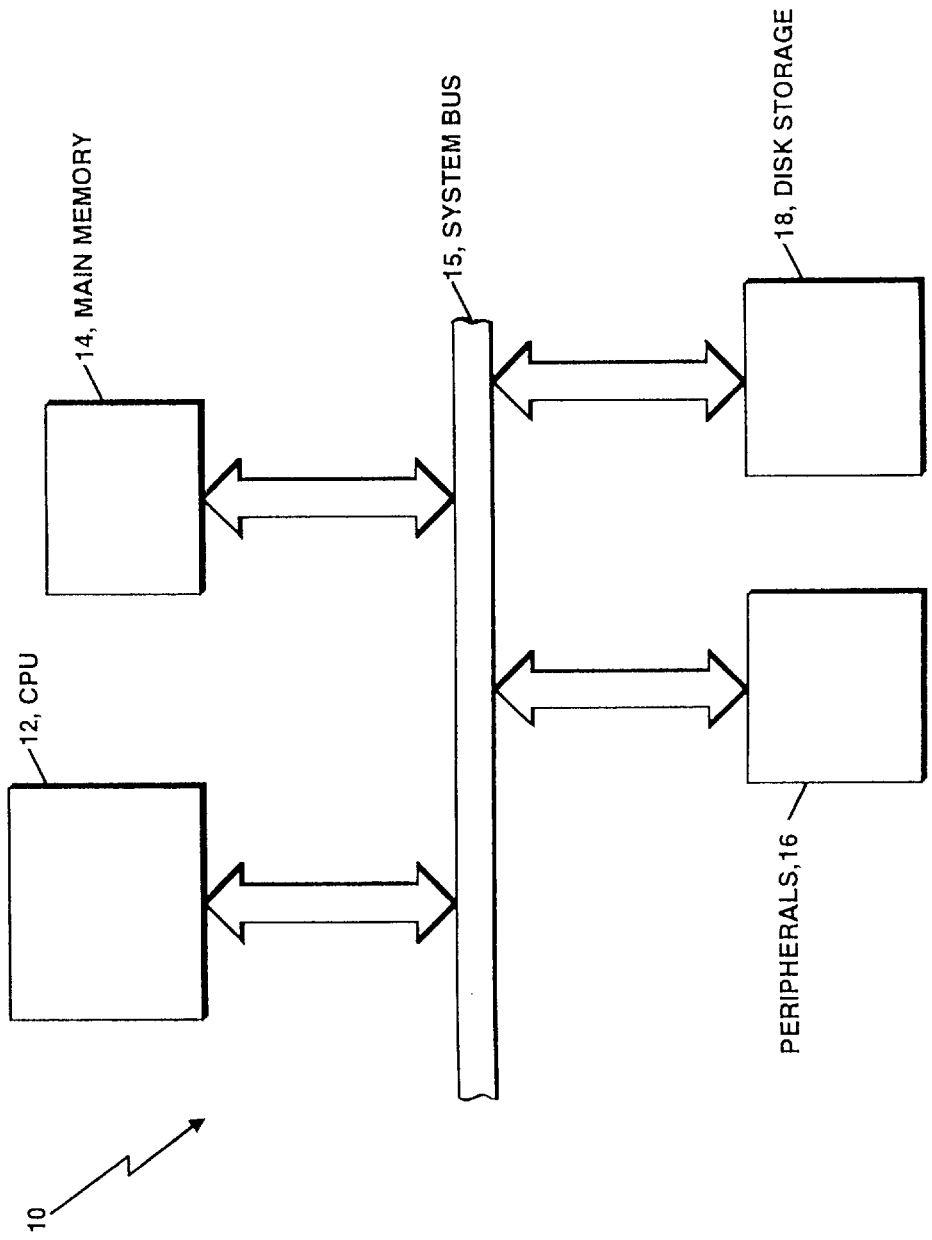
FIG. 1 is a block diagram of a pipelined computer system in accordance with the present invention.

Referring now to FIG. 1, a computer system 10 is shown to include a central processing unit (CPU) 12, coupled to a main memory 14, peripherals 16 and disk type storage elements 18 via a system bus 15. The CPU 12 fetches instructions and data from main memory 14 and disk type storage 18 and issues in response to the execution of said instructions, data, addresses, and control signals over system bus 15 to interface and control the peripherals 16 disk type storage 18 and the main memory 14 for the performance of a particular task.

A preferred implementation of the central processing unit (CPU) 12 will be described in conjunction with FIGS. 2–20. Suffice here to say that the described computer system 10 is a high speed computer system of pipeline architecture. That is each of the functional portions of the CPU are segmented into clocked stages that perform a portion of a given task.

Figure 2:
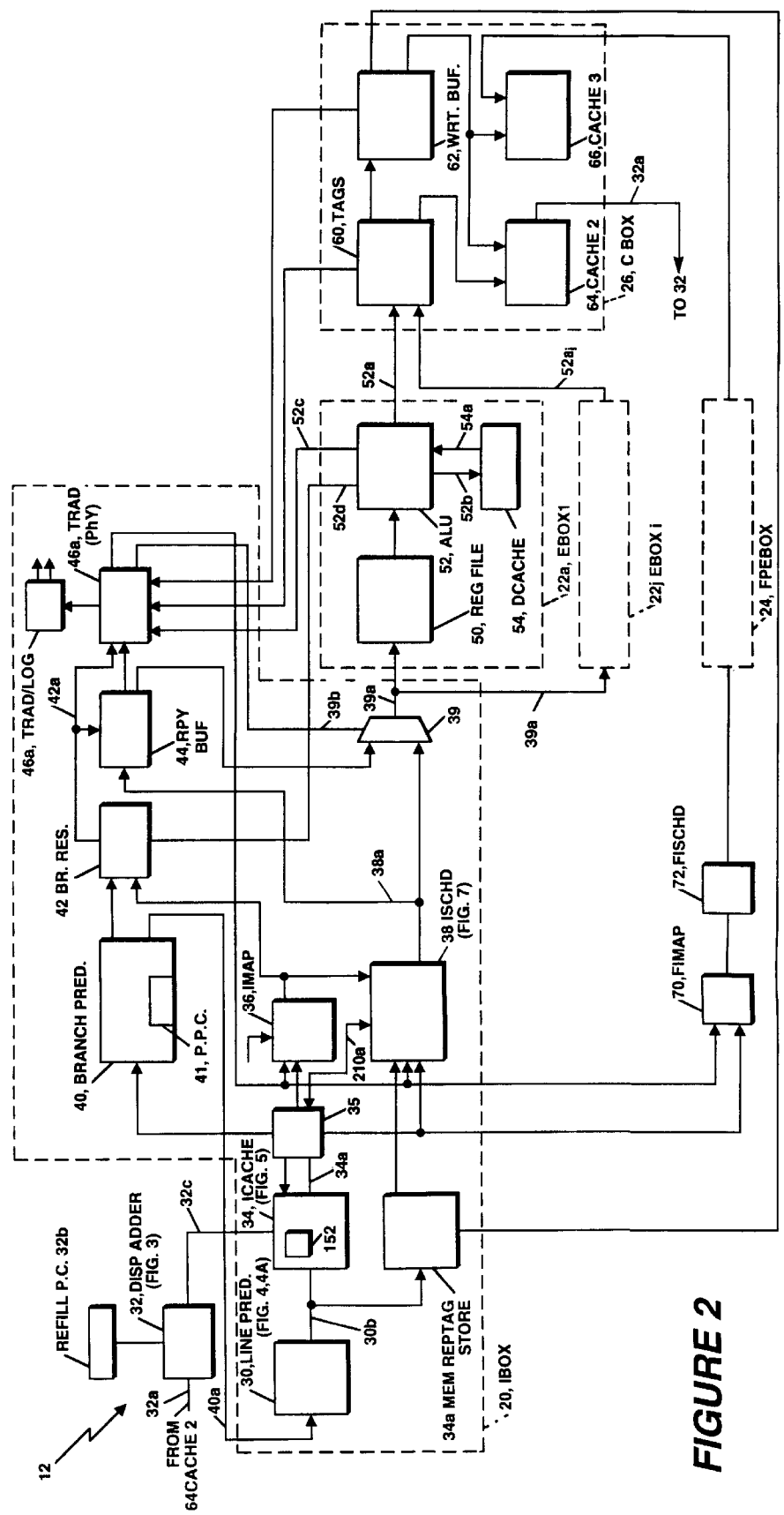
FIG. 2 is a block diagram of a pipelined central processing unit (CPU) used in the computer of FIG. 1.

Referring now to FIG. 2 the pipelined CPU 12 is shown to include an instruction box (I BOX) 20 here a pipelined instruction box comprised of several elements which fetch and preprocess instructions. The CPU further includes one or more execute boxes (EBOX) 22 here in particular EBOX $22_a$–EBOX $22_i$ which are also pipelined, as will be discussed, and which provide the arithmetic and logical manipulation of data fed to the EBOX under control of instructions issued from the IBOX 20. The IBOX 20 fetches and preprocesses instructions for execution by one or several EBOXs 22 in sequence to provide a high throughput of instructions through the particular EBOX 22. The CPU 12 further includes a cache box (CBOX) 26 which is used to control writing to storage devices including cache type storage as well as main memory and mass storage devices. The CBOX also includes logic circuits to control identification of read-write reordering problems, memory tags, and trap dispositions, as well as a translation buffer which is used to convert virtual addresses to physical addresses.

As used herein, many of the signal lines coupling together functional circuits are strictly speaking internal buses of the CPU 12. That is the lines represent a collection of parallel signal lines used to transfer data.

The instruction box (IBOX) 20 includes logic circuits to rapidly fetch instructions, predict the next instruction that will be executed after a branch instruction, that is whether those instructions that are branch instructions will take or not take a branch and provide presumed displacement addresses for the presumed taken branch instructions. The IBOX 20 further includes a store for a large plurality of instructions in a readily accessible cache memory type store. In addition the IBOX 20 includes circuits for assigning unique physical names (i.e. physical numbers) to register operand fields of each fetched instruction. Concurrently with register name assignment the IBOX 20 reorders the sequence of issuance of instructions to the various execution boxes. Here the IBOX 20 further includes a store 33 which maintains memory reference tags. These tags are assigned to each instruction address fetched from the line predictor 30 along line 30b. The instruction scheduler 38 uses these tags inorder to determine whether memory reference instructions can be reordered. The instruction scheduler ignores these tags for non-memory reference instructions.

The reassignment of register operands and the rescheduling of instructions including memory reference instructions occurs in parallel for integer instructions to shorten the overall pipe length of the pipeline and thus minimize the amount of processor time required to initiate a new sequence of instructions after a branch mispredict occurs. The locations of a sufficient number of register operands are saved in order to be able to return the IBOX 20 to a previous state as may be required. The IBOX 20 also provides control circuits for permitting a sequence of instructions to be replayed or restarted in response to an error condition detected later in the EBOX 22.

The IBOX 20 is shown to include a line predictor circuit 30 which used to predict the next two addresses to be applied to the ICACHE 34. ICACHE 34 stores the instructions and certain branch prediction information for later processing by the remaining portions of the IBOX 20.

The IBOX further includes an IMAP circuit 36 and an ISCHED circuit 38. The ICACHE 34 feeds fetched instructions to an IBUFF circuit 35. The IBUFF 35 is a memory type buffer circuit which provides these instructions to both the IMAP 36 and ISCHED 38 via signal lines 34a. The IMAP 36 is a register mapper which assigns a new register number (i.e. register name) for each register specified as a register operand in the instruction stream fetched from the ICACHE 34. In parallel with the IMAP 36 is the ISCHED 38 which schedules the order of issuance of instructions based upon a validity of results of previous instructions in a group of instructions and availability of computer resources needed by instructions to be scheduled which may be used or needed by those instructions which are presently or had just recently executed.

A stream of instructions as well as some data operands are fetched from the CBOX 26 which includes various cache memory units. Remaining data operands are fetched from a DCACHE 54 in EBOX 22. Instructions are here fetched along line 32a coupled between displacement adder 32 of instruction box 20 and a second level cache 64 of CBOX 26. The instruction stream is provided when the ICACHE 34 does not contain the necessary instructions and thus the ICACHE 34 is refilled with instructions from line 32a.

Instructions are issued from the instruction box 20 via output line 39a to one of the plurality of execution boxes (EBOX's) 22a–22i. The execution boxes 22a–22i comprised the logic necessary to execute instructions in accordance with the op-code of the particular instructions issued from the instruction box 20 as mentioned above. Likewise the execution boxes 22a–22i are pipelined. Outputs from execution boxes 22a–22i are fed via lines 52a–52i to CBOX 26.

The instruction box IBOX 20 is shown to be fed signals from a displacement adder 32 which is fed here four (4) refill instructions IF00–IF03 via line 32a from the second level cache 64 based upon address from a refill program counter 32b. The displacement adder 32 adds a displacement address to the instructions which are of the type that may cause the program counter to jump to a non-sequential address. The displacement adder 32 provides as an output a modified instruction if the instruction is a branch type of instruction.

Two typical instruction formats are shown below:
Branch type:

| 31 | 26 25 | 20 19 00 |
|---|---|---|
| OPCODE | REG A OPERAND | DISPLACEMENT |

Non Branch type:

| 31 | 26 25 | 21 20 | 16 15 | 5 4 | 00 |
|---|---|---|---|---|---|
| OPCODE | REG A OP | REG B OP | FUNCTION | REG C OP | |

These instructions are fed via line 32c to a store in instruction cache 34. The displacement adder 30 thus converts the displacement field of branch instructions here into 21-bits of branch target and a carry bit. The target is sufficient to index the ICACHE 34 during subsequent processing of the instruction while the carry bit is sufficient to provide the higher order bits of the target address. The full target address is generated by only incrementing the high order bits of the refill program counter 32b in accordance with the carry bit and concatenating the incremented higher order bits of the program counter 32b with the branch target.

The displacement adder 32 is an optional circuit and is disposed in series in the refill path of the ICACHE 34. Since the generation of a displacement address occurs is parallel with the instruction stream processing, instruction processing is in general speeded up, because the displacement adder 32 eliminates adding circuits to provide the displacements to the program counter later in the instruction pipeline. Once it is determined by the IBOX 20 that a branch will be taken and thus there is a need for the displacement address, the displacement address is already present at the instruction cache (ICACHE) 34. Thus in general the presence of the displacement adder speeds up the instruction processing in the IBOX 20. It however can add a lag time to so called "ICACHE Misses" or events that occur when the ICACHE does not have saved the next instruction.

The line predictor circuit 30 provides a stream of instruction addresses to the ICACHE circuit 34, independent of the output from the ICACHE 34. Thus, the ICACHE 34 and instruction decoding are removed from the line prediction loop. The line predictor 30 thus generates addresses faster than would be possible using a loop that included the actual instructions in the ICACHE 20.

Outputs from the line predictor 30 and displacement adder 32 are each fed to the ICACHE 34 as mentioned above. The ICACHE 34 provides a store for a large number of instructions which may be executed during operation of the computer system 10.

The output from the ICACHE 34 is fed via lines 34a to the IBUFF 35 to provide instructions to the integer register mapper (IMAP) 36. IMAP 36 is a register mapper which is used to change register number assignments in the register operand field of those instructions fed from the ICACHE through the IMAP 36. The purpose of changing the register number assignments is to obtain an instruction stream which is re-executable and in which all ordering conflicts have been removed other than those conflicts in which one instruction requires the result of a preceding instruction. The integer register mapper 36 thus assigns new registers to remove read/write conflicts in which a register must be read before the data is overwritten by a subsequent instruction and write/write conflicts in which a second write, overwrites a first write and hence must be in order. Thus the instruction stream will be a re-executable instruction stream if no data that is an input to any of the instructions of the stream is overwritten. Thus, by reassigning registers, the register mapper saves data used in a corresponding plurality of instructions. The register mapper saves said data by allocating a new register to each event of storing data in a register. The mapper also recirculates unused registers or registers having old data thus preventing the register mapper from quickly running out of registers. In addition the register mapper also has a backup store which can be used to return the IBOX 20 to a previous state in the event of a trap or other condition which would require a replay or restart of the instructions. A preferred implementation of register mapper 36 which maps registers for a plurality of instructions in a cycle will be described in conjunction with FIG. 6.

The output from the IBUFF 35 is also fed to an instruction scheduler 38. The instruction scheduler 38 rearranges the order of the instruction stream as fed to the instruction scheduler 38 in accordance with the resources needed by each of the instructions in the present stream of instructions, the availability of registers, and instruction dependencies associated with the instructions, that is the availability of values or results of other instructions needed by the instruction which the scheduler is currently scheduling.

The instructions are issued from the instruction scheduler 38 generally in a rearranged order compared to the original order associated with the instructions inputted to the instruction scheduler 38. Reordering the instruction stream is provided so that the instruction stream can be executed in a more efficient manner than the order of the instructions originally fed to the scheduler 38.

For example, often in a stream of instructions, an instruction will be present in which a long operation must first be performed before that instruction can execute. However, within the instruction stream there are instructions which while not dependant upon the results of the waiting instruction must nevertheless wait to execute because of the preceding waiting instruction. Without instruction rescheduling, these other instructions must likewise wait. With instruction scheduling, these other instructions can be re ordered ahead of the waiting instruction and thus be executed while the one instruction is waiting, thus speeding up the processing of instructions.

The scheduler 38 also uses the results from the instruction mapper 36 to complete the new assignment of register operands prior to issuing the instructions to the EBOX 22.

The register mapper 36 and the instruction scheduler 38 are operated in parallel thus reducing the latency of the instruction scheduling and mapping operations provided by IBOX 20.

The output from the instruction cache 34 is also fed to a branch prediction circuit 40. The branch prediction circuit 40 checks the prediction made by the line predictor 30 against the best available prediction made by a branch prediction store 152 (as will be further described in conjunction with FIGS. 14–16. If the line predictor 30 is in error the branch predictor circuit 40 sends the correct predicted address by sending the current predicted program counter contents to the line predictor 30.

The branch resolution circuit 42 determines whether a branch-type instruction did "take" or did "not take" the branch. Further it determines whether the line predictor 32 has correctly controlled branching by providing the correct sequential execution between taken branches. By branching is meant a jump or non-sequential change in the logical sequence of instructions. Upon deciding that the prediction made by the line predictor is not the best prediction, the branch predictor sends this information via line 40a to the line predictor, to overwrite the instruction prediction and thus to train the line predictor. When the branch predictor 40 is overwriting the line predictor, it also sends control signals to the instruction scheduler 38 and the IMAP 36 to notify those circuits that some of the instruction sent should be ignored. This will initiate a backup of the circuits of the buffer. The branch prediction store 152 predicts if the branch is to be taken or not taken based upon a past history of branchings of the particular instruction. The branch predictor 40 also keeps a predicted program counter 41 and analyzes the instruction stream as delivered from the ICACHE 34 to determine those instructions which may result in branches to a different target address.

The branch predictor 40 is disposed in parallel with the instruction scheduler 38 and thus is removed from the instruction path through the I box 20. The branch predictor 40 checks on what the line predictor 30 does when handling branch instructions. The branch predictor checks on the operation of the line predictor 30. If the line predictor provided the incorrect addresses for the ICACHE 34, the branch predictor 40 issues a signal via line 40a to stop fetching of instructions from the ICACHE 34 and backs up the IBOX 20 using the IMAP 36 to the point in the instruction stream prior to the line predictor 32 error. The branch predictor makes the line predictor start over again at the better predicted address. The branch predictor 40 also uses this signal to train the line predictor 32 to do better the next time, via data on line 30a.

The instruction box 20 and thus the remainder of the central processor 12 assumes that data delivered by the ICACHE is exactly the right instruction stream. The instruction stream is executed and processed as fast as possible (not waiting for the branch predictor to predict the correct branch). By using a branch predictor scheme here having a relatively high degree of accuracy, fewer restarts in the event of a branch mispredict are generally encountered. With fewer restarts caused by branch mispredicts, there is less waste of processing time. Moreover, since instructions issue sequentially and since instruction scheduling is not dependent upon the results of branch predictions, there is no delay provided in the instruction stream path.

Amongst other events the processor will be involved in "replays" and "restarts". Here a replay is performed for events such as Cache misses (ie. when the correct data is not in a cache), whereas a restart is performed when there was for example a branch mispredict or other error in instruction processing. In the case of a replay, the exact previous instruction stream is replayed from some previous instruction, whereas for a restart a new instruction stream is provided to be processed.

The I box 20 further includes a branch resolution circuit 42 which is fed data from the branch predictor 40 and the output from EBOX 30. The branch resolution circuit matches the results assumed from the branch prediction circuit 40 with the results provided from the EBOX for each branch type instruction and determines whether the branch predictor circuit 40 provided a correct prediction (i.e. whether the branch was "taken" or "not taken"). The branch resolution circuit examines the branch result line 52d to determine whether the prediction was made correctly. If the determination indicates that the branch prediction was correct and hence instruction execution was correct then the processor continues processing instructions unaffected. However, if the determination indicates that a "branch mispredict" occurred then the branch resolution circuit 42 issues a branch mispredict signal B_MISPR on line 42a to a Trap Arbitration circuit 46a.

The IBOX 20 also includes a replay buffer circuit 44 here a memory type of device. The replay buffer 44 records a cycle by cycle image of each of the instructions issued by the instruction scheduler 38 to the E boxes. These instructions as issued are saved in correct order in the replay buffer in the event that a replay trap condition is detected in the EBOX 22 or CBOX 26. Events which would initiate a replay of an instruction sequence includes D CACHE misses, second level or third level Cache misses, various resources shortages, memory references out of order, and so forth. A replay is performed by stopping the instruction scheduler from sending new instructions on line 38a.

The replay buffer 44 changes an address pointer (not shown) in the buffer 44 back to a buffer address of a desired cycle of instructions stored in the replay buffer 44 and the replay buffer issues those instructions so that the instructions are replayed in the exact image of the last preceding N cycles of instructions issued to the E box. As the last replay cycle instruction is issued from the replay buffer 44, the instruction scheduler 38 resumes operations sending additional instructions to the E box and the replay buffer records the instructions. Thus, the output from the replay buffer 44 is fed to one input of a MUX 39 with the other input to the MUX 39 fed along line 38a from the instruction scheduler 38. The MUX is selected to either process instructions from the I scheduler 38 or the replay buffer 44 from a signal on control line 39b which is provide from the trap replay logic 46a.

The trap replay logic 46a as well as trap replay logic 46b are used to provide so called "trap arbitration." Trap arbitration determines which replay or restart requests to honor among a plurality of such requests that may be presented. The trap arbitration then initiates the proper replays or restarts. To do a replay, the trap replay logic stalls the instructions scheduler 38 in instruction box 20 inorder to source instructions into the EBOX's from the replay buffer, to replay a selected portion of previously executed instructions in response to cache misses or resource shortages. The trap arbitration logic 46 decides whether the particular event requires the replay of the same instruction stream from the replay buffer 44 or a restart of a different instruction stream as would commonly occur for a branch mispredict or an exception. As mentioned above, a replay of the instruction stream requires stalling of the instruction scheduler 38 and replaying of the sequence of instructions stored in the replay buffer 44. In that instance, the replay logic 46 provides the MUX select signal 39b, selecting multiplexer 39 to couple inputs fed from the output of the replay buffer 44 to lines 39a from the output of the MUX 39. These instructions are thus fed into the execution box 22a–22i.

If the trap replay logic indicates that a branch mispredict or an exception occurred then a new instruction stream is necessary. However, using a different instruction stream requires a new predicted program counter thus requiring fetching of a new set of instructions, mapping the instructions, and scheduling the new instructions. The trap arbitration logic 46 arbitrates these inputs to provide a coherent policy that correctly deals with all interactions among these various conditions. The policy should also arbitrate between multiple exceptions should they arise.

The output from the instruction box 20 along line 39a is fed to one of a plurality of E boxes 22a (E box 1–22i)–(EBOX$_i$). The execution boxes contain the register file 50, the pipelined arithmetic logic unit (ALU) 52, (both or mentioned above) and a pipelined data cache (D CACHE) 54 as will be described. The output from the arithmetic logic unit 52a is fed to the cache box CBOX 26 to a TB/tags circuit 60 which contains the translation buffer to convert from virtual address space to physical address space and associated tags for D CACHE 54 and the second and higher level caches 64, 66 as are known. The output from the TB/tag circuit 60 are fed to a write buffer 62 and the second level cache 64. A third level cache 66 is also fed from the output of the write buffer 62. CBOX 26 is comprised of generally conventional functional circuits having differences as will be described.

The processor further includes a floating point register mapper 70 which is fed an instruction stream from instruction buffer 35. The instruction buffer 35 sorts the instructions to determine which are integer and which are floating point type of instructions. The floating point register mapper 70 is here similar to the integer mapper 36 as will be further discussed below. The floating point instruction stream are then fed to an instruction scheduler 72 which is here a conventional type of scheduler. The processor further includes a conventional floating point execution box FPEBOX 24, as shown.

Displacement Adder

Figure 3:
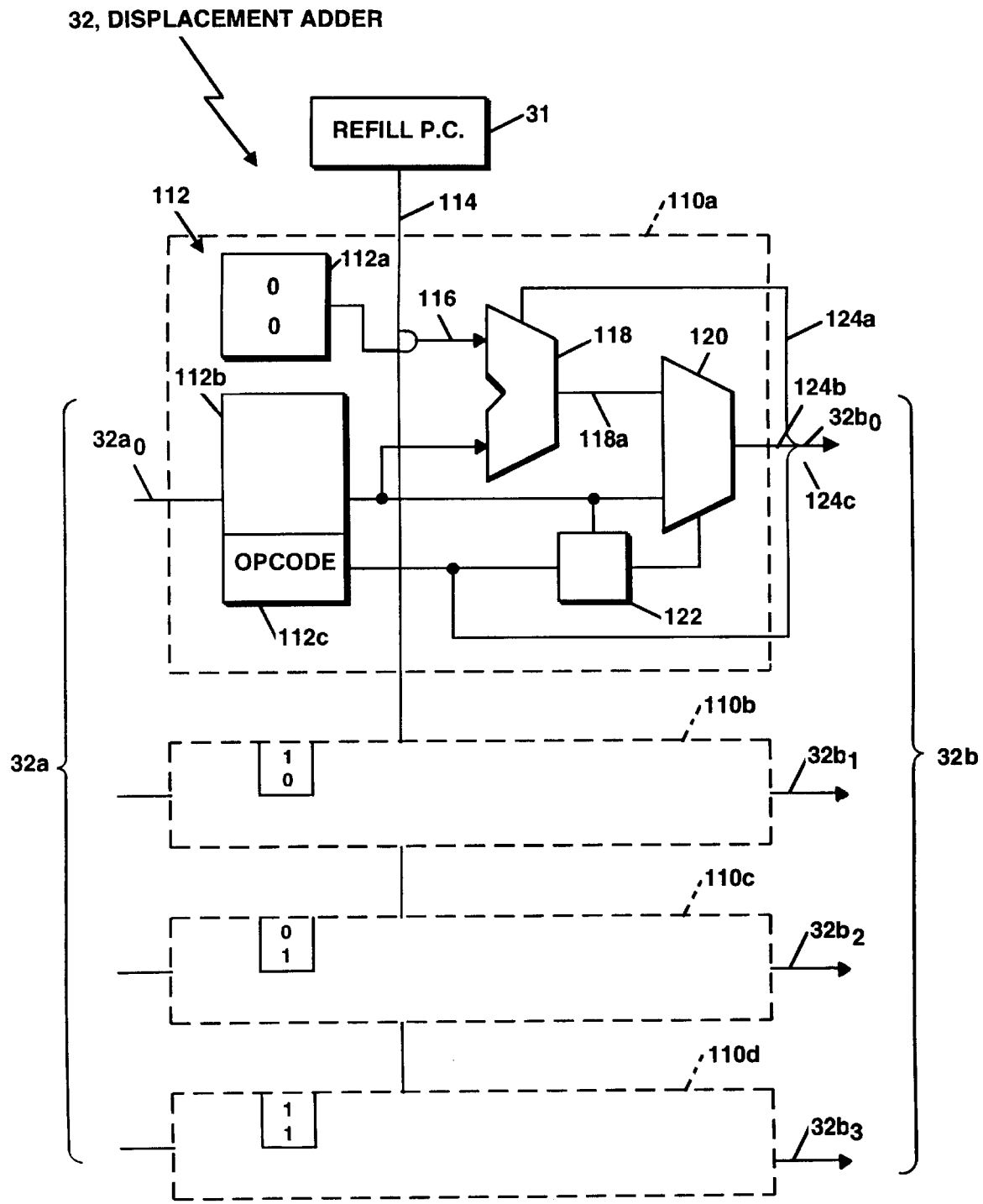
FIG. 3 is a block diagram of a displacement adder used in the CPU of FIG. 2.

Referring now to FIG. 3 a branch displacement adder circuit 32 used in the processor of FIG. 2 is shown to include here four identical logic networks 110a–110d which are fed a branch displacement from a fetched instruction via input line groups $32a_0$–$32a_3$ and provide outputs along lines $32b_0$–$32b_3$. Each of inputs line groups $32a_0$–$32a_3$ are comprised of parallel signal lines which are illustratively of 32 bits wide. Each of output line groups $32b_0$–$32b_3$ are here 33 bits wide i.e. a 21-bit sum for the displacement address, the remaining portion of the instruction, and a carry bit for each of four instructions processed through circuits 110a–110d and thus which were fetched and fed to the displacement adder 32.

Since each of the logic networks 110a–110d are the same, the discussion of network 110a will suffice for the remainder of the networks. Logic network 110a is shown to include a register 112. A first portion of register 112a has 2-bits which are the two lower order bits of the address in memory of the instruction, a second portion 112b has the 21 bits of the displacement address, and a third portion 112c having an op code portion of the instruction. Here since the processor fetches an instruction from the second level cache in the CBOX 26, with the two lower order bits of the instruction being fixed. Thus, in block 110a those 2-bits are 00, in block 110b the 2-bits are 01, in block 110c the 2-bits are 10, and in block 110d the two bits are 11. These 2-bits are concatenated with the bits of the address from the refill counter 31 and are provided to the first port of a adder 118 which is here used to add the contents of the refill program counter 31 for location "00" to the address displacement contained in register portions 112b. Output 118a of ALU 118 is the sum of the contents of the refill program counter 31 that correspond to the present instruction (or in some archetures the contents of the refill program counter of the next instruction) and the address displacement portion of the instruction. This output on lines 118a is fed to one input of a multiplexer 120.

The second input of the multiplexer 120 is fed from the address displacement portion 112b. The op code portion of the instructions contained in register portion 112c is partially decoded in decoder 122 to provide a select signal at line 123 to select one of the two inputs to the multiplexer 120 as the output 124b. That is, the sum of the refill program counter 31 and the assumed address displacement is selected as the input source to the MUX 120 when the select signal on line 123 indicates that the op code portion of the instruction in register portion 112c indicates that the instruction is a branch type instruction. The selected signal on line 123 selects the second input to the multiplexer 120 when the op code of the instruction in register 112c indicates that instruction is not a branch type of instruction. Decoding of the op code in decoder 122 determines therefore whether the portion 112b of the instruction is an address displacement or is a collection of bits for any other purpose.

In either event, in accordance with the decode result provide from the op code, if the op code indicates that the instruction in register 112 is a branch type of instruction and thus the contents of 112b is a displacement address, the select signal will be asserted on line 123 to choose the first input to the MUX120. Thus at the output of the MUX 120 on line 124b will be the sum of the refill program counter and the displacement address or contents of register portion 112b. A carry bit from the carry output of the adder 118 which is fed on line 124a and the op code which is on line 124c, are concatenated with the address on lines 124b to form a combined output on line $32B_0$.

Similarly, if the decode of the op code from decoder 122 indicates that the op code is not a branch type of instruction and thus the contents of register 112b are not a address displacement then the second input to the multiplexer is selected by the select signal on line 123 and thus the output of 124b is simply the contents of register 112b, 112c portions. A similar arrangement is provided for each of the remaining instructions fed to networks 112b–112d, thus providing four instructions with either an assumed displacement or the contents of the instruction on lines $32b_0$–$32b_3$. The addition of the displacement address to the program counter occurs when the ICACHE 34 is refilled due to an ICACHE miss, and thus the contents are available for the instruction scheduler 38 as will be described later.

Line Prediction

Figure 4:
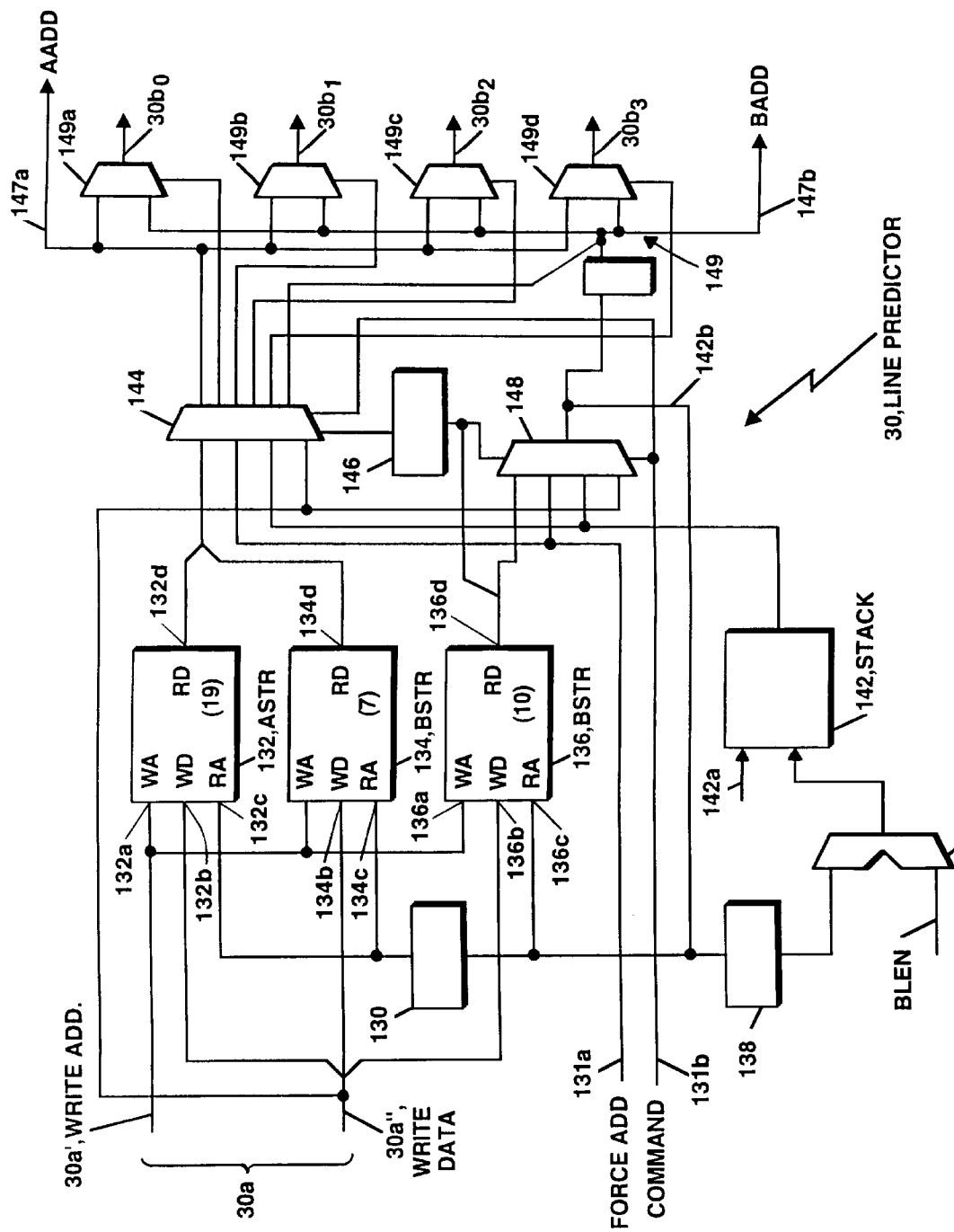
FIG. 4 is block diagram of a line prediction circuit used in the CPU of FIG. 2.

Referring now to FIG. 4, the line predictor circuit 30 is shown to include here data stores 132, 134 and 136. Each of data store 132, 134 and 136 has a write port with write data inputs 132b–136b (D) and write address inputs (A) 132a–136a as well as a read port with read data (RD) outputs 132d–136d and read address inputs 132c–136c (RA). Each store further has control lines (not shown) for reading and writing to the line predictor circuit 30. The line predictor circuit 30 provides two (2) addresses per cycle that are ultimately fed to the ICACHE 34, as will be further described. These two addresses are the start of the next two potential instruction sequences. In the embodiment of the IBOX 20 each line prediction cycle (i.e. fetch of the addresses A, B) provides up to twelve instructions from the ICACHE. With two addresses the line predictor 30 can provide the start of two instruction sequences each of which may contain fewer than 12, valid instructions.

The first storage 132, here a memory or register file, stores addresses of the start of a first sequence of instructions (A addresses). The store 132 is 256 locations by 19-bits of data. The first 15-bits of data corresponding to the A address of the first basic block of instructions and the next 4-bits correspond to the bank address select bits with one of the address bits indicating whether the address is empty (i.e. does not contain a valid instruction address). Thus, the A address store contains two fields. As mentioned above, the A address store contains a read port and a write port and the A address store has the characteristic that a read operation and a write operation can be performed in the same cycle.

The second address store for the B addresses (start of the second sequence of instructions) is broken into two individual stores 134 and 136. Store 134 contains here the high order 7-bits of the B address and store 136 contains the low order eight bits of the B address. The B address includes two fields. The first field (fifteen bits) correspond to the B address bits, and the second field two bits corresponds to the branch type bits in store 136. As with the A address store, the B address stores 134 and 136 each having one read port and one write port and having the property that each store can do a read and write in the same cycle.

The stores 132, 134, and 136 are each addressed during a write cycle to the stores via a write address provided on line 30a from the branch predictor 40. Write data is provided into the stores 132, 134, 136 as data appearing on line 30a from branch predictor 40. Writing to the stores is accomplished by asserting a write enable to the three stores in response to "Line Miss Predict" or Train Commands from the Branch predictor 40. Writing to the A address store 132 and B address stores 134 and 136 is provided to train the line predictor in accordance with the branch predictor's evaluation of the line predictor's performance and the training strategy.

Each of the address stores 132, 134, and 136 likewise have a read port which are addressed at lines 132c–136c respectfully and provide output data or read data at outputs 132d–136d. The data from line 132d and 134d are concatenated together and provide a first input to a MUX 144. The read data output 136d from store 136 are fed to a first input to a second MUX 148 as shown with 2 (two) of said bits being also fed to a register 146.

A second input to the first MUX 144 is provided from a external line 131a which contains a forced address which is generally provided from the branch predictor 40. A forced address is provide during a restart caused by a branch mispredict or an exception. Also a forced address is used after an ICACHE miss. The output mux 148 selects the FORCED Address as if it were a B address with no A address. All cache banks use this address and it is recirculated. During a line mispredict, the A and B address stores 132, 134, 136 are written at the address with a new address. This is bypassed to the output as if it were being read in the cycle in which the write occurred. Recirculation occurs normally for a subsequent read cycle. During training the A and the B address stores 132, 134, 136 are written at the address supplied with a new line of addresses but normal operations take place at the output mux and reads happen during writes. Training thus occurs by the branch predictor 40 when the branch predictor 40 has a better prediction on whether a branch will be taken or not taken.

This likewise provides the second input to the second MUX 148. The third input to the first and second MUXs 144 and 148 are provided from the output of a subroutine stack 142 which here contains addresses corresponding to program routines or subroutines. A line 142a fed to the stack contains the address of an address pointer 141 pointing to the address of the top of the stack used to "pop off" or address, the address of the last preceding, previous routine which was placed on the stack. The output from stack 142b thus provides the third input to each of the MUXs 144 and 148. The fourth input to MUXs 144 and 148 are provided from the write data fed from line 30a" from the branch predictor. The output for multiplexer 144 is used to control several portions of the remainder of the line predictor 30. The first set of outputs 144a is here 15 bit addresses which are fed to each of the one of here four bank address multiplexers 149a–149d. The four remaining ports from multiplexer 144 here all generally denoted as 144b provide multiplexer selects for multiplexers 149a–149d as shown. The second input to multiplexers 149a–149d are provided from the output of the multiplexer 148. The A address from the stack 132 is also provide as an output along lines 147a and the B address is also provided as an output along lines 147b. The write port address and write data to the line predictor comes from the branch predictor circuit (FIG. 2).

The subroutine stack is here 15-bits by 8 locations and the pointer 141 is a three bit up down counter which is used to address one of the address portions of the stack 142. A first input to the first MUX 144 is the A address and a portion of the B address (i.e. read data from stores 132 and 134). A second input to the MUX 144 is the predicted subroutine stack 142 in the B position with all banks selecting the B address. The third input is the forced address in the B position with all banks selecting B, and the fourth input is the write data for the A address and the B address stores. The output of MUX 144 is the high order 7-bits of the B address, the A address from the A address store, and the bank select bits. The output of mux 148 is the low order 8-bits of the B address. The full output from this MUX is provided to an instruction cache bank address multiplexer 149. The instruction cache bank multiplexer 149 is a 15-bit 2 input MUX. The inputs to the MUX 149 are the A and B 15 bit addresses plus the four bank selects.

The line predictor 30 is trained and works as follows: Given an instruction address of the start of any given basic block of instructions, the index of the A address and B address stores, the predicted cache index of the start of the next two basic blocks of instruction following the given instruction block one are provide from the output of the line predictor. Control of multiplexer 144 occurs by decoding the "type" bits from the B address store 136. Registers 130 and 146 are time delays. They are used to isolate the critical loop in order to obtain faster cycle time. The critical loop here is through the B address store and through MUX 148. Therefore, the A address store 132, 134 are a cycle behind the B address store 136. This is also the reason why the B address is split with one portion in a critical loop and the remaining portion removed from the critical loop.

Alternatively, the control of the multiplexer 144 is accomplished by a command issued on line 131b from branch predictor 40. The MUX 148 is also controlled in this manner. The forced address line 131a is provide from the branch predictor 40 and is used to force the line predictor 32 to fetch instructions from an address provided by the branch predictor. Thus the output MUXs 144a and 148b can control three separate settings.

The first command can correspond to a "GO TO" statement in which the output MUX selects a forced address as if it were a B address with no A address. All the cache banks use the address and the address is recirculated. However, the line predictor 30 is not retrained and thus no data is written into the A address store 132 or the B address stores 134, 136.

The second command can correspond to a "line mispredict". For this command the A address and B address stores are written at an address provided on line 30b from data on lines 30a from the branch predictor 40 (FIG. 2) This data is also bypassed to the output via line 131c as if the data were being read from the address stores 132–136. Again since the data bypasses the stores 132, 134, and 136, this causes an immediate "Go To" as well as a retrain of the line predictor. That is this condition retrains the line predictor to go to the instruction address in the future.

The third external command is a "train command." During a train command the A and B address stores are written at the address supplied along line 30a with the data on line $30a_1$. Normal operations take place at the output and reads happen during this write as is required by the processor. This trains the line predictor without interfering with ongoing operations.

Figure 4A:
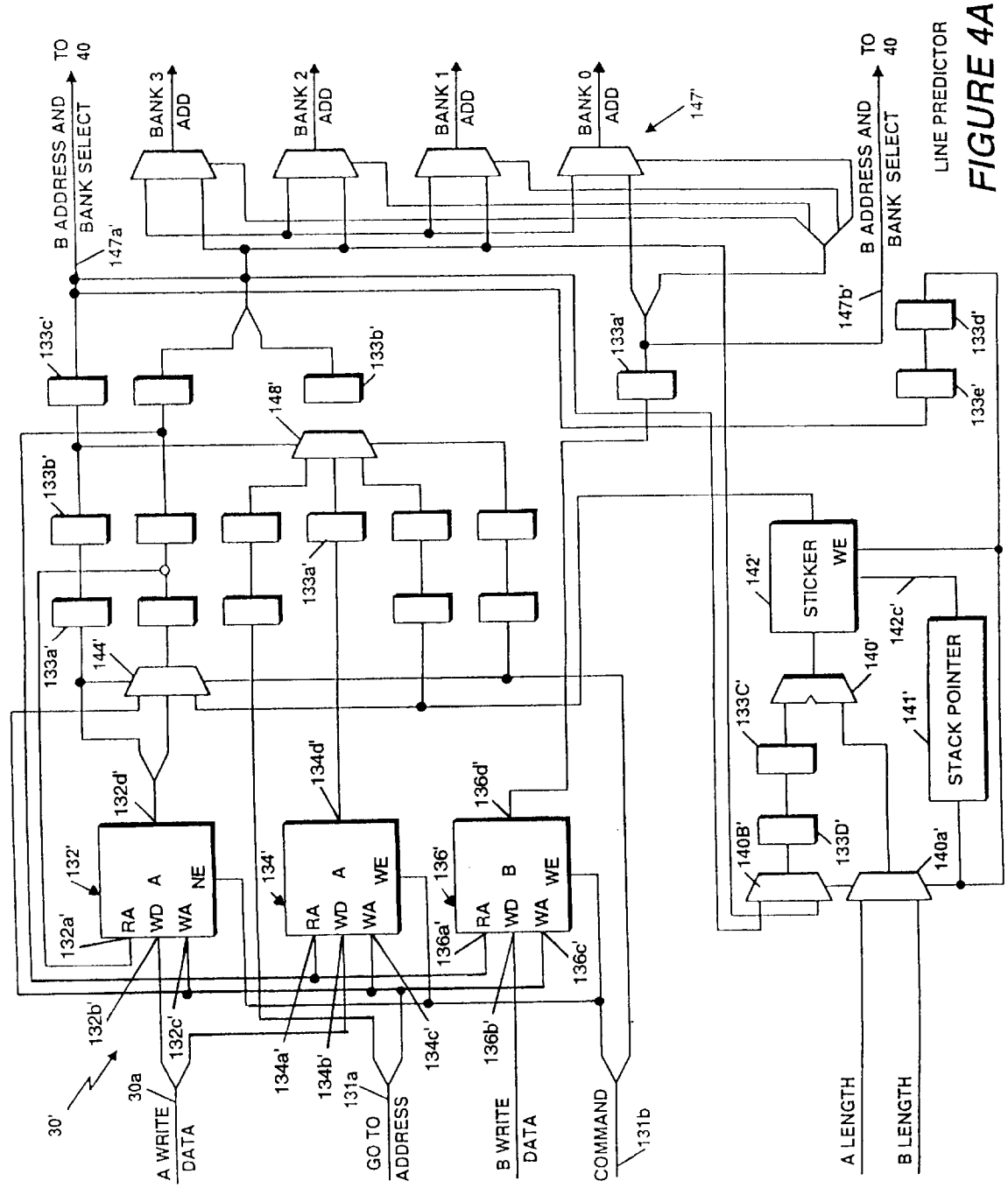
FIG. 4A is block diagram of an alternate embodiment of a line prediction circuit used in the CPU of FIG. 2.

Referring now to FIG. 4A, an alternate embodiment of the line predictor circuit 30' is shown to include here data stores 132', 134' and 136'. Each of data stores 132', 134' and 136' has a write port with write data inputs 132b'–136b' (D) and write address inputs (A) 132a'–136a' as well as a read port with read data (RD) outputs 132d'–136d' and read address inputs 132c'–136c' (RA). The line predictor circuit 30' provides two (2) addresses per cycle that are ultimately fed to the ICACHE 34, as will be further described. These two addresses are the start of the next two potential instruction sequences. In the embodiment of the IBOX 20 each line prediction cycle (i.e. fetch of the addresses A, B) provides up to twelve instructions from the ICACHE. With two addresses the line predictor 30 can provide the start of two instruction sequences each of which may contain fewer than twelve valid instructions.

The first storage stack 132 stores starting address of the first sequence of instructions the A basic block. This store is 256 locations by 10-bits of data. The first 8-bits of data correspond to the lower order bits of the next A address of the A basic block of instructions and the next 2-bits correspond to branch type bits. The branch type bits indicate that the branch is normal sequencing (ie. not a branch); procedure call at the end of the A block; procedure call at the end of the B block or a procedure return. Thus, the A address store 132 contains two fields. The lower order A address bits stored here are sufficient to address the line prediction store 30 for the next cycle but are not all the bits which are required to address the ICACHE 34. The remainder of the bits of the A address (7 bits )are contained in the second store 134'.

As mentioned above, the A address store contains a read port and a write port and the A address store has the characteristic that a read operation and a write operation can be performed in the same cycle.

The third address store 136' contains all of the address bits (15 bits ) for the starting address of the B basic block sequence of instructions ) and four bank select bits.

In principal therefore there could be a C basic Block store, a D basic block store and so forth. Each of these subsequent blocks would be provided the same as the B basic block store 136'. As with the A address store, the B address store 136' has one read port and one write port and has the property that the store can do a read and write in the same cycle.

The stores 132', 134', and 136' are each addressed during a write cycle to the stores via a write address provided on line 131a from the branch predictor 40. Write data is provided into the stores 132', 134', 136' as data appearing on line 30a from branch predictor 40. Writing to the stores is accomplished by asserting a write enable to the three stores via line 131b "command" in response to "Line Miss Predict" Commands from the Branch predictor 40. Writing to the A address store 132' and 134' and B address store 136' is provided to train the line predictor in accordance with the branch predictor's evaluation of the line predictor's performance and the training strategy.

Each of the address stores 132', 134', and 136' likewise have a read port which are addressed at lines 132c'–136c' respectfully and provide output data or read data at outputs 132d'–136d'. The data from line 132d' and 134d' are fed respectively to a MUX 144', and a register (not individually numbered) in a register rank 133a' onto a MUX 148'. Two of the bits (the branch type bits) from the store 132' are used as enable bits for MUX 144, to select between the Forced Address (Go To); lower order starting address of the A basic block; and the output from stack 142'. The second input to the first MUX 144' is provided from a external line 131a which contains a forced address which is generally provided from the branch predictor 40. A forced address is provide during a restart caused by a branch mispredict or an exception. Also a forced address is used after an ICACHE miss. The high order part of the forced address is also fed to mux 148, via two registers (ranks 133a' and 133b').

The read data output 136d' from store 136' are fed to a register (not individually numbered) in register rank 133a', as shown, with the B address fed to a MUX bank 147' and the bank select field fed to select inputs of the MUX bank 147'.

The selected outputs from MUX 144' and 148' are concatenated together to provide the second input to each MUX 149a–149d of MUX bank 147'. Appropriate register delays are provided by registers in ranks 133a', 133b' and 133c' as shown.

During a line mispredict, the A and B address stores 132, 134, 136 are written at the address provided on the lines 131a "Go To Address" with data provided on the lines 30' "A write data" and "B write data". The write data bypasses the A stores 132', 134'. This data will be the index for a lookup in the B store 136' to complete the data required for the first cycle, and it will be the index for a lookup in the A store to continue operations in the next cycle of instructions. Training thus occurs by the branch predictor 40 when the branch predictor 40 has a better prediction on whether a branch will be taken or not taken.

The third inputs to MUXes 144' and 148' are provided from the output of a subroutine stack 142' which here contains addresses corresponding to program routines or subroutines. A line 142c' fed to the stack contains the contents of an address pointer 141' pointing to the top of the stack used to "pop off" or address the last preceding, previous routine which was placed on the stack. The output from stack 142' thus provides the third input to each of the MUXs 144 and 148.

The first set of outputs 144a from MUX 144 is here 8 bit addresses which are fed to each one of here four bank address multiplexers 149a'–149d', via three ranks of registers, as shown. Other bits of the first inputs to the multiplexers 149a'–149d' are from the multiplexer 148' via a rank one register. This provides 7 bits so the total first input is 15 bits. The second inputs to multiplexers 149a–149d' are provided from the output of the B address store, as shown via a rank 1 register. The A address from the stores 132' and 134' is also provide as an output along lines 147a' and the B address is also provided as an output along lines 147b'. The branch type bits are also included in the signals 147a' and the bank select bits are included in the signals 147b'. These signals 147a' and 147b' are provided to the branch predictor so that the branch predictor 40 may follow what the line predictor 30 has done and may determine if its actions are in accordance with the branch predictor tables 152. The write port address and write data to the line predictor comes from the branch predictor circuit 40 (FIG. 2).

The subroutine stack 142' is here 15-bits by 8 locations and the pointer 141' is a three bit up/down counter which is used to address one of the address positions of the stack 142'. A first input to the first MUX 144' is the low order 8 bits of the A address (i.e. read data from store 132'). A second input to the MUX 144' is the low order 8 bits of the predicted subroutine return stack 142' in the B position with all banks selecting the B address. The third input is the low order 8 bits of the "Go To" address (forced address). The output of MUX 144 is the low order 7-bits of the A address. The output of mux 148' is the high order 7-bits of the A address. The full output from MUX 144' (7 bits) and MUX 148' (7 bits) is provided to an instruction cache bank address multiplexer 149' as one of two inputs. The instruction cache bank multiplexer 149' is a 15-bit 2 input MUX. The inputs to the MUX bank 149' are the A and B addresses plus the four bank selects.

The line predictor 30 is trained and works as follows:

The line Predictor responds to 3 commands from the Branch Predictor:

1. Continue
2. Go To
3. Line Mispredict

The commands are coded on the Command input 131b' from the Branch Predictor. Continue indicates that the Line Predictor should generate addresses without interference from other address sources. Go To, along with an address supplied on the "Go To Address" lines means the Line Predictor should use the supplied address and branch type as the next A basic block starting address. Go To is asserted for just 1 cycle and then the command reverts to Continue so that the Line predictor effectively jumps to the given address and then continues.

Line Mispredict indicates that the Line Predictor should write data presented on the "A Write Data" and "B Write Data" lines into the prediction store at the location given on the lower order 8 bits of "Go To Address" lines. In addition, the Line Mispredict command forces the next emitted A block starting address to be the data supplied on the "Go To Address" lines.

The continue command is usually being performed. For a restart, a Go To command is issued along with the address of the instruction in the I Cache to Jump to. A Go To command is also issued if the Line Predictor went to the wrong place due to not getting the right address for a procedure return.

If the Branch Predictor determines that the Line Predictor did not properly fetch from the I Cache other than as a result of the wrong procedure return address (Line Mispredict), the Branch Predictor issues the Line Mispredict command. This performs a Go To jump to the instruction that the Branch Predictor wanted, and in addition it trains the Line Predictor to, in the future, go to this address.

To train the Line Predictor with a Line Mispredict command, the "last good A address" is supplied as "Go To Address". The correct starting address of the next basic block is supplied as "B Write Data", along with the correct bank select bits. The correct starting address of the next basic block after that is supplied as "A Write Data", along with the branch type bits. The write enables are asserted on the 3 register files.

The "last good A Address" is a correct A address provided by the Line Predictor, and all A and B addresses preceding this were correct. Either the following B address or the A address following that was wrong since either the B or A address following the "last good A Address" was wrong, the prediction store needs to be rewritten at the location given by the "last good A Address". The Go To that is done at the same time starts by forcing the Line Predictor to emit the "last good A address" as the A block address. This will cause the data we just wrote to be looked up as the following B address and the A block address following that. Hence, after a branch mispredict a refetch of the I cache packet that started at the "last good A Address" is provided, knowing that at least the A block part of that as correct. The B block part of it may or may not have been correct already and the next I Cache packet was not correct.

Operation when the Go To Command is asserted is as follows:

Mux 144' selects data from the "Go To Address" lines, in place of 132' that would have been read out of the top part of store 132'. After 3 cycles this emerges as the low order bits of the A basic block address. The High order bits of the "Go To Address" passes through 2 registers and then Mux 148' and a third register. Both low order and high order bits pass through a total of 3 levels of registers so they arrive at the Mux bank 147' to provide A address. The branch type bits from A store 132 are irrelevant when the Go To command is asserted. MUXES 144' and 148' are designed so that the command signal has priority over the branch type enables to the MUXES.

With Mux 144' selecting the low order bits of the "Go To Address", after 1 register, this data will be supplied to the prediction store 132' as an address to look up the low order bits of the following A block for the following cycle.

After 2 registers, i.e. 2 cycles after the mux, this data is supplied to the remaining portion of the prediction store.

The middle portion of the prediction store 134' provides the high order bits of the following A block for the following cycle. This data goes with the low order bits provided from the prediction store 132'. In order to minimize the critical loop for lowest cycle time, the higher order part of the A address is always looked up one cycle later than the low order bits are. Since there is one less register in the data path after the register file lookup for the high order bits relative to the low order bits of the A Address for the next cycle, both parts of it, line up correctly in the third rank registers.

The B block line 136' provides the B address for this (not the next) cycle. Note that if A and B are the A and B addresses that are emitted in the same cycle, then B results from a lookup in the B part of the prediction store using A as an index into the prediction store. Here we are forcing the A address to be the number input as "Go To Address". That number must go through the B part of the prediction store to get the B address that corresponds with this A Address.

Note that the data read out of the B part of the prediction store goes directly to a third Rank register. Thus this data gets to the third rank register 1 cycle BEFORE the data read from the A parts of the prediction store does, even though the lookup itself happens later than the lookup of low order A bits. Thus, the B data looked up from an A address is data for this cycle to go along with the A that was the index for the B lookup, while A data looked up is for the following cycle.

Assuming now that the Command is changed to Continue, the data read from the A part of the prediction store as just described will make it through Mux 144' and Mux 148' to the third level registers. In addition this data will go to index the B prediction store after passing Mux 144'. Looked up B data will then go to the third rank registers where it lines up with the data for this cache cycle.

Meanwhile, the A Address from the first rank register 133a' from the output of MUX 144' is fed back to 132' to lookup the low order A part of the prediction store 132'. The A address from the rank 2 register 133b' looks up in the high order A part of the prediction store 134' to form the A address for the succeeding I Cache cycle.

As long as the command is Continue this cycle will keep repeating.

The branch type bits that are provided from the B prediction store 132', were ignored for a Go To. For a Continue, however they are significant and control Mux 144' and Mux 148', as follows:

1. Normal Sequencing
2. Procedure Call at end of A block
3. Procedure Call at end of B block
4. Procedure return Mux 144' and Mux 148' perform as has been described as long as the branch type bits are anything other than "procedure Return". If the branch type bits are "Procedure Return", Mux 144' and Mux 148' select data from the Procedure Return Stack 142' instead of the A address read from the prediction store 132'.

If there is a previous procedure call, at that time branch type bits asserted one of the two procedure call codes. This causes a predicted return address to be pushed on the stack. When branch type "Procedure Return" is coded, instead of using a fixed A address from the prediction store, we used the predicted return address from the stack 141'. The stack 141' is also popped. Note that whatever the source of the A address, we look up the B address that goes with it in the same I cache cycle from this A address in the B part of the prediction store. We also look up the succeeding A address from it in the A portion 132' of the prediction store.

The A and B addresses and bank selected bits for a given I cache cycle provide 4 separate addresses, one for each I Cache bank at the final 4 Muxes 149a'–149d'. The address for each of the I Cache banks may be either the A address or the B address. There is one bank select bit for each bank that determines which address to use for that bank. The A and B addresses and bank select bits are passed on as outputs. The Branch Predictor will have to analyze these values to determine if they correspond to a correct prediction.

The emitted A address and B address of each cycle is available to the stack 142'. Mux 140b' selects the A address or the B address if the branch type is "Procedure Call at the end of A block" or if it is "Procedure Call at the end of B block". For any other branch type either is selected. The selected address is delayed for 2 cycles via 133d' 133e' since the basic block length ALEN or BLEN requires two cycle periods to be provided. That is, the block length for the block is looked up in parallel with the I Cache so it takes 2 more cycles to get the length. The selected address is delayed to line up with the length. Mux 140a' selects from A length or B length. The proper address, length pair is added to find the address of the instruction that is one past the end of the block. This number is written to the Stack 142 after the stack pointer 141, is incremented, if the command is Procedure Call at the end of A or B block.

The branch type is delayed to line up with the sum of the block address and block length. If the branch type is "Procedure Call at the end of A block", or "Procedure Call at the end of B block", the stack pointer is incremented. The result of this increment is used to address the stack 142'. The proper address plus length is written. The stack has 8 locations. The stack pointer 141' is 3 bits and is allowed to wrap around. If the branch type is "Procedure Return" the stack Pointer is decremented but only after the value in the location pointed to has gone through Mux 144' and is in the rank 1 register. The delay of 4 cycles in the branch type path ensures that. If the branch type is "Normal Sequencing" then the state of the stack and of the stack pointer 144' are not changed.

The line predictor is trained as follows:

Suppose that the Branch Predictor examines an I Cache packet y, with an A block address $A_y$ and a B block address By, and the Branch Predictor determines that block By is not what it wanted. In this case $A_y$ is the last good A address. The branch predictor will issue a Line Mispredict Command to the Line Predictor. The Go To Address will be $A_y$. The branch predictor will provide from analysis of the branch at the end of the A block (or absence of one) the starting address of the B block. This is supplied as "B Write Data". The branch predictor will assume that the B block is the maximum length that can be fetched along with the last good A block. Further it will assume that the code flows sequentially so that the next A block is the next sequential address after this B block. This address is supplied as "A Write Data".

The Branch Predictor 40 determines the maximum size of a cache packet (12 instructions in our example). The cache packet either ended with a procedure call, a procedure return, or a normal branch. If the A block filled the cache packet, then the B block length is 0. If the A block ended in a procedure call the branch type supplied with the A write data is "Procedure Call at the end of A block". If the A block ended with a procedure return then the B block length is 0 and the branch type is procedure return. In other cases the branch type is "Normal Sequencing". If the A block ended in a normal branch to a B block, the bank select bits are set to fetch the whole A block but any banks not needed to fetch the A block are set to the B address. The branch predictor then determines with the constraint of the banks available to B, what is the maximum length of B block that can be fetched. This is the length that is used to guess that the following A block is sequentially right after this B.

Suppose that the Branch predictor examines an I Cache packet z, with an A block address $A_z$ and a B block address $B_z$, and the Branch Predictor determines that block Az is NOT what it wanted. the previous I Cache packet was y, with an A block address $A_y$ and a B block address $B_y$. This occurs if the blocks $B_y$ ended with a return from procedure, including the case with the block $B_y$ is on length 0, and the branch type accompanying A block is correctly "Procedure Return", but it went to the wrong address. In this case, this cannot be improved by writing anything to the prediction store. The Branch Predictor does not issue a Line Mispredict command, but rather issues a Go To command. the Go To Address is the correct value for $A_z$, which is known to the Branch Predictor. The Branch Predictor keeps the preceding block information so that when it determines the block $A_z$ in I Cache packet z is not correct, the branch predictor still has block A and $B_y$ address from the preceding ICache packet y.

There are 2 possibilities: 1) The address $A_z$ is wrong, or 2) the address $A_z$ is correct but the bank selects are wrong so we are not getting the A block data that is needed.

If the Address $A_z$ is wrong the prediction store 136 is written at the location given by $A_y$ to point to the correct $A_z$ as "B Write Data". The branch prediction circuit issues a Line Mispredict command to the line predictor with a Go To Address of $A_y$. The completely known ($B_y$) data is entered as B write Data. This includes the bank select bits.

The other possibility is that the address $A_z$ is correct but the bank selects were wrong so that we are not getting the correct data out of this block.

The bank selects that are used to get Az data out of the I Cache are stored in the prediction store 132 at location $A_z$. So unlike the case where the $A_z$ address is wrong, here a Line Mispredict is used with a Go To address of $A_z$.

The bank selects are set to select an A address in all banks and the B address is irrelevant. The next A address is set to be the next sequential instruction after the end of this I Cache packet, and the Branch Type is set to Normal Sequencing. Very likely, when this is executed by the Line Predictor it will fail for incorrect B block. The only way this will not happen is if the A block really is 12 or more instructions long. When this happens, the entire $A_z$ block is provided thus the $B_z$ block can be provided.

In general, when starting with completely new code, there will be 1 line Mispredict per basic block until the machine will improve. The code has been executed once. After the initial run, the line predictor will usually perform line cache preditions with better accuracy.

Instruction Cache

Figure 5:
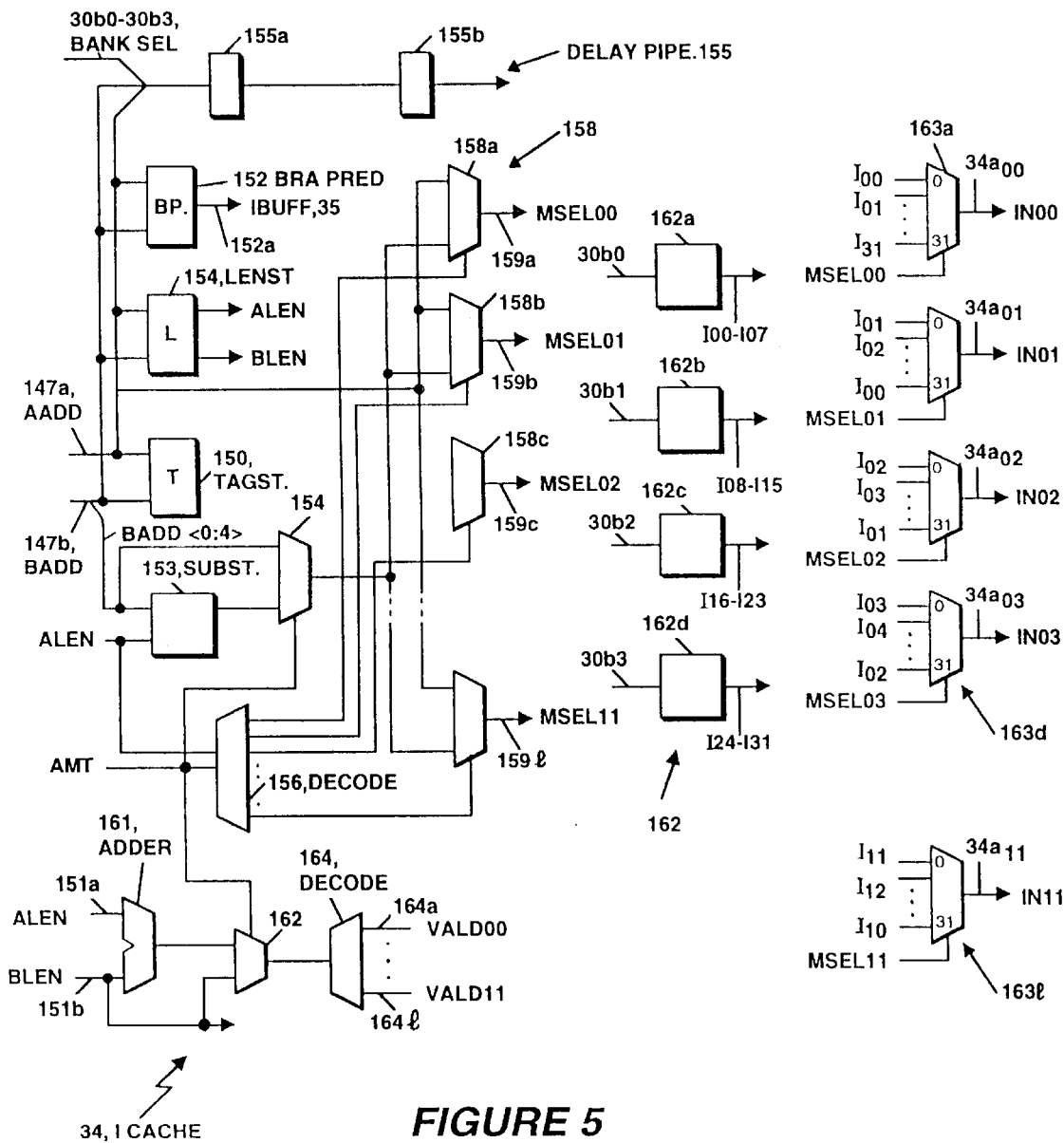
FIG. 5 is a block diagram of an instruction cache used in the CPU of FIG. 2.

Referring now to FIG. 5 an instruction cache 34 is shown to include here three individual stores corresponding to a tag store 150, a length store 154 and a branch prediction store 152. These stores are addressed via the predicted A address and B address from the line predictor 32 (FIG. 4) and provides as outputs thereof, the length of the A basic block of instructions along lines 151*a*, "ALEN"; the length of the B basic block of instructions, "BLEN"; along lines 151*b*; tag bits associated with said instructions along line 150*a*, and branch prediction bits along lines 152*a*. The tag bits from tag store 150 along lines 150*a* indicate the high order bits of the address in ICACHE 34 of the instructions and whether these particular ICACHE 34 locations are valid.

The A address and B address lines as well as, the bank select signals $30b_0$–$30b_3$ are also concatenated together and fed through a delay pipe 155 comprised of registers 155*a* and 155*b* so that the signals are available at the proper time at output 155*c* to the branch prediction circuit 40. This tells the branch predictor 40 the low order address bits of the instructions. The Branch predictor 40 reconstructs the full address of each instruction that is actually compared with the instruction which the branch predictor desired. This is accomplished to determine whether the line predictor correctly predicted the start of the address sequences that were required by the branch predictor 40.

The ICACHE 34 is shown to further include a multiplexer bank 158 here comprised of 12 multiplexers a–1 corresponding to here 12 potential instructions which can be issued by the ICACHE for each instruction cycle. The first inputs to the MUXs a–1 are the five lower order bits of the A address whereas the second input of the MUXs a–1 are derived from the B address since the B basic block addresses logically follow the A basic block addresses.

A knowledge of the length of the A basic block of fetched instructions (ie. the number of valid instructions in the A block provided by signal ALEN) and whether there is an A block or whether the A basic block is empty (does not exist) is required prior to the B basic block being determined. If there is no A basic block then the line MSEL00 to MSEL11 are the five lower order bits of the B address. If there is an A basic block then the first A block length ALEN are the first ALEN numbers of mux selects MSEL00–MSEL11 have the lower order 5 bits of the A address and the remaining ones of MSE1100–MSEL11 are the lower order 5-bits of the B address minus the length of the A block (ALEN).

Instruction MUXes 163a–163l are organized so that the first address LSB's can produce a sequential set of an ALEN number of instruction addresses which are provided to an ALEN number of MUXes 163a–163l. If the value of ALEN is less than 12, the remaining MUXes receives B addresses. To obtain the correct B address, the LSBs of the B address are offset by the value of ALEN (A length) to provide the first B address to the MUX where the B address starts.

Thus, the instruction cache further includes a subtractor 153 which is fed the lower order 5-bits of the B address as well as the length of the A basic block to provide a result at one input to a MUX 154 with a second input to the MUX 154 being simply the lower order A address bits. The inputs to these MUXs are chosen based on the value of signal AMT (indicating A empty) which indicates whether an A basic block exists. If an A basic block exists then the output of MUX 154 is the result of the B address bits minus the A length. If however, AMT (i.e. A empty) indicates the A basic block does not exist then the signal is used to select the first input of the MUX 154 and thus the output of the MUX 154 would simply be the lower order B address bits. Thus, in either event one of these two signals is applied to the second inputs of multiplexers 158a–158l.

The ICACHE 156 further includes a decoder 156 which is fed the A length signal on line 151a and the AMT signal on line 151b. If AMT signal on line 151b indicates that there is an A block then the combination of the A length signal ALEN on line and AMT signal on line 151a are used to assert the upper number corresponding to a ALEN number of outputs from decoder 156. These signals are provided as enables to select the A address lines as selected outputs to be coupled to the outputs from each of a selected number of the multiplexers 158a–158l, determined by the value of ALEN, whereas the remainder if any, of said enables (i.e. the nonasserted ones) are used to select the B address lines on banks 158b–158l. if there is not an A address on lines 147a (FIG. 4) then the decoders are all selected to provide the B address at the outputs 159a–159l of multiplexers 158a–158l respectively.

These multiplexer output signals are used as select signals (MdSEL00–MSEL11) for a second bank 163 of multiplexers comprised of here 12 multiplexers 163a–163l.

The instruction cache 34 further includes a bank store 162 here comprised of four individual banks 162a–162d of instructions I00–I31. Here the instructions are distributed to each store with instruction numbers I00 to I07 provided in bank 162a, I08–I15 in bank 162b and so forth. Each store 162a–162d is here five hundred and twelve words by eight instructions wide. The address inputs to the banks are the bank select signals $30b_0$–$30b_3$ from the line predictor circuit (FIG. 4) respectively, as shown, and the outputs from the banks 162a–162d are fed to the multiplexer bank 163 in the arranged order as shown. The outputs from bank 162a correspond to instructions I00–I07, the output from bank 162b corresponding to I08–I015, the output from bank 162c corresponding to I16–I23 and the output from bank 162d corresponding to I24–I31 respectively. These outputs are coupled to corresponding inputs of the multiplexer bank 163. Each succeeding one of banks 163b to 163l has corresponding inputs thereof coupled from a succeeding one of said instruction lines from store bank 162. The instruction which is fed to a first input of one of said banks is "wrapped around" to be fed to the last input of the next, succeeding bank.

Thus, the exemplified multiplexer 163a has I00 as the first (0) position input to the multiplexer 163a and I31 as the last (31) position input to the multiplexer 163a. Correspondingly, the last multiplexer 163l has I31 at the (0) position input to multiplexer 163l and I30 at the last (31) position.

The positions of the inputs to the multiplexers 163b through 163l are arranged such that the ICACHE is capable of issuing twelve instructions from the outputs of multiplexers 163 via lines IN00–IN11 in a selected order of the instruction.

Register Mapping

Figure 6:
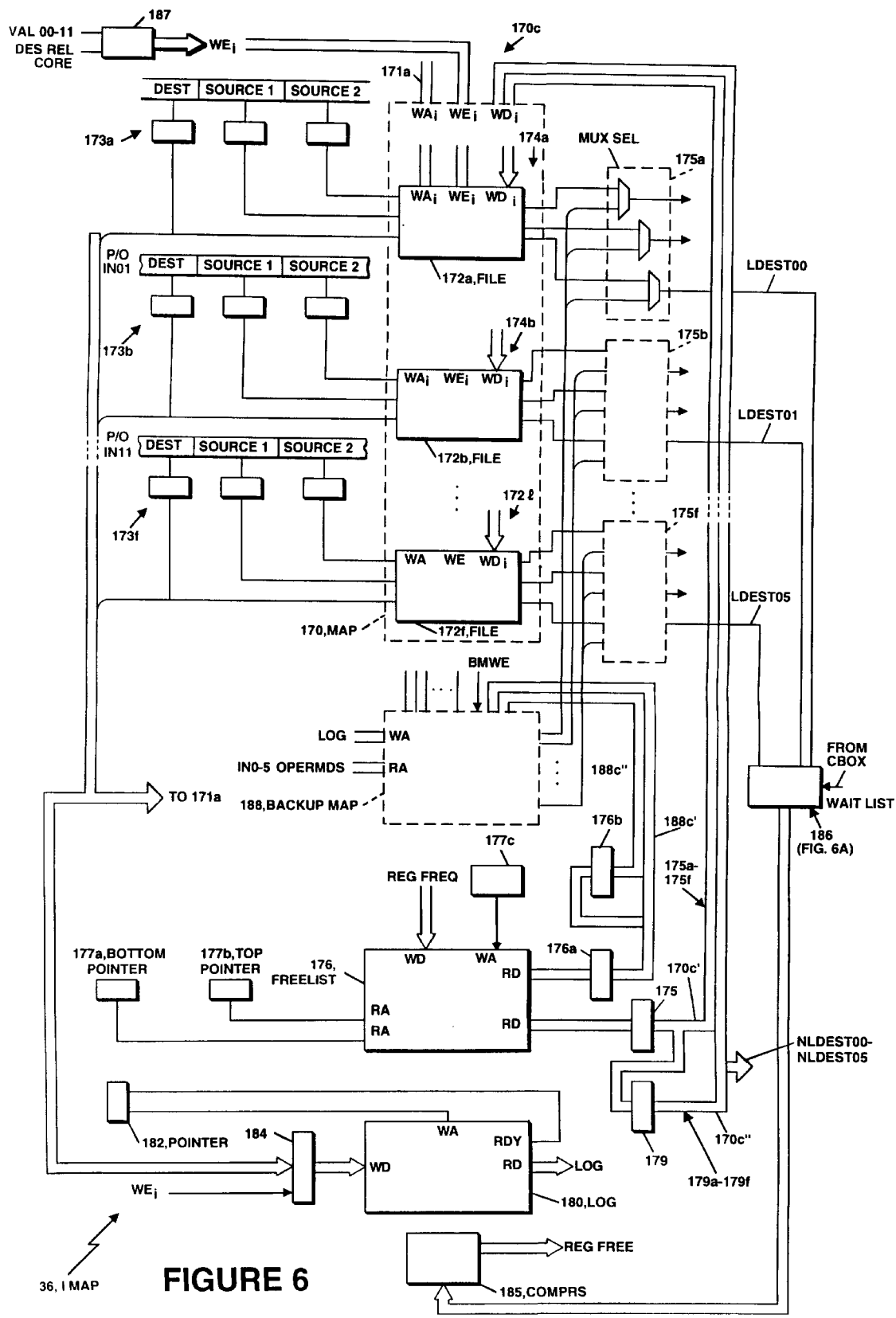
FIG. 6 is a block diagram of an integer mapper used in the CPU of FIG. 2.

Referring now to FIG. 6, an integer register mapper 36 (IMAP) is shown to include a first map 170 comprised of here six individual register files 172a–172f corresponding to the number of instructions issued by the instruction buffer 35 in a given instruction cycle. Each register file 172a–172f of the first map 170 includes six write ports generally denoted as 170 each comprising six write address port lines $171a_{00}$–$171a_{05}$, memory write enables $171b_{00}$, to $171b_{05}$ and write data ports 171c, 171c'. Each register file 172a–172f of the map 170 also has three read ports 170b with read address ports 173a–173f and read data ports from port lines 174a–174f. The read ports 170b are shown individually connected to the register files 172a–172f whereas the write port lines are not shown individually connected to the register files. These connections for the write port 170a are omitted for the sake of clarity in the drawings. However, it is to be understood that each of the write address lines $171a_{00}$–$171a_{05}$, write enable lines $171b_{00}$–$171b_{05}$, and write data lines $171c_{00}$–$171c_{05}$ are connected to each of the files.

Each of the register files are used to store data corresponding to assigned register names. Each register file contains 32 locations of 7-bits wide with each file having the six write ports 170a and the three read ports $170b_{00}$–$170b_{05}$. The files are provided with special properties. The first property is that if there is a collision between any write and any read (i.e. a request for read and write operation with the same address in the same cycle) then the data being written in the same cycle will be provided as an output for the read request. These files are generally referred to as write through files. The second special property is that if there are collisions between the writes, the write ports are assigned a fixed priority and the write port having the highest priority write is given access to the file and correctly writes data to its address location.

Thus, the map 170 has six register files 172a–172f with the six write address lines and a write data port fed selective data in accordance with TABLE I below.

TABLE I

| Reg. File | write port 00 | write port 01 | write port 02 | write port 03 | write port 04 | write port 05 |
|---|---|---|---|---|---|---|
| 172a | ps00 | ps01 | ps02 | ps03 | ps04 | ps05 |
| 172b | ps01 | ps02 | ps03 | ps04 | ps05 | ts00 |
| 172c | ps02 | ps03 | ps04 | ps05 | ts00 | ts01 |
| 172d | ps03 | ps04 | ps05 | ts00 | ts01 | ts02 |
| 172e | ps04 | ps05 | ts00 | ts01 | ts02 | ts03 |
| 172f | ps05 | ts00 | ts01 | ts02 | ts03 | ts04 |

Where table I shows the distribution of instructions to each of the register files, with ps00 to ps05 corresponding to the previous set of six instructions and ts00 to ts05 corresponding to the current or this set of instructions.

TABLE II shows the connection of address lines of the register files from the output of destination operand registers 173a to 173f (for current instructions) and output of register 184 (destination operand registers 184a to 184f of previous instructions).

TABLE II

| Reg. File | Write port 00 | Write port 01 | Write port 02 | Write port 03 | Write port 04 | Write port 05 |
|---|---|---|---|---|---|---|
| 172a | 184a | 184b | 184c | 184d | 184e | 184f |
| 172b | 184b | 184c | 184d | 184e | 184f | 173a |
| 172c | 184c | 184d | 184e | 184f | 173a | 173b |
| 172d | 184d | 184e | 184f | 173a | 173b | 173c |
| 172e | 184e | 184f | 173a | 173b | 173c | 173d |
| 172f | 184f | 173a | 173b | 173c | 173d | 173e |

Each register file also has three read ports, with the three read address ports having data provided from respectively the destination register operand field, source 1 register operand field, and source 2 register operand field of the instruction being mapped. The register addresses are stored in a register bank 173a–173f respectively as shown. That is each of the register operands are stored in one of the plurality of register bank 173a–173f in accordance with the particular instruction IN00–IN05 respectively. The register fields are applied as read addresses to each of the corresponding files 172a–172f. In response to the contents of the register operand fields is provided at the outputs of said files read data along lines 174a–174f respectively. The read data from each of the files corresponds to a new physical address in a register file where the contents of the logical register designated by the register operand field is stored. That is, for each source operand it is the new physical register number, whereas for each destination operand it is the old physical register number.

Each of these lines is fed to a corresponding plurality of MUX banks with one MUX for each one of the read data ports of the file 172a. The first input to the MUXs are thus provided from the file read data outputs of the map 170 whereas the second input to the MUXs are provided from a backup map 188 which is identical in construction to the map 170 and thus will not be further described herein. Suffice it here to say that the MUXs banks 181a–181f provide the new physical register number for each of the source operand registers and the old physical register number for the destination operands. Alternatively, the second inputs to said MUX banks 181a–181f are provided from outputs of the backup Map 188. Thus in the event of a restart, the register map can be returned quickly to a previous state, prior to the condition which caused the restart. The map files 172a–172f each have a field of valid bits, indicating that the entries in the map files are valid. Thus, backing up of the map is accomplished by clearing all of the valid bits in the Map 170 to enable Mux select bits to select the backup map 188 as the source of data. Events which cause a restart include a branch mispredict or an exception. Further details of general principals of backing up the register mapper, using the backup map and the register file can be briefly described.

To backup the map, the set of the last logical registers whose physical homes were updated in the backup map 188 is read from the log 180 by using pointer 182. Since, it is the new physical homes that were stored in the locations for the logical registers in the backup map 188 that must be updated, the present physical homes are read from the backup map 188 as determined from the log 180. The old physical homes from the last register updated are read from the freelist 176 using the pointer 177a. These old physical homes replace the new physical homes for the corresponding logical registers in the backup map. At this juncture, the backup map has been restored by one cycle worth of data.

To complete an instruction from the integer mapper 26, the new source addresses for each source register operand of each instruction are concatenated with the new destination register address for the destination register operand field along with the remainder of the instruction provided to the mapper 36. The new destination register for each of the six instructions is assigned a physical address from six outputs from a free list store 176 as will be described.

Still referring to FIG. 6, the IMAP 36 is shown to further include the free list 176 mentioned above which is a register store of here 32 locations by 42 bits (i.e. 6, 7 bit fields) which is addressed via a pair of pointers 177a, 177c which point to respectively the location to be read and the location to be written. The free list 176 provides the current source of the physical register numbers which are currently free for reassignment by the map 170.

The free list 176 accesses or provides six register addresses per cycle and stores the six most recent register addresses in register bank 175 while also storing the preceding six register addresses in register bank 179. The output operands 175a to 175f and 179a to 179f from these two register banks 175, 179, respectively, are fed via busses 170C' and 170C" to the map 170 and thus provide the write data to write ports of each of the files in the map 170. The busses are distributed to each of the write data ports of the files 172a–172f in accordance with TABLE III below.

TABLE III

| REG. FILE | WRITE PORT 00 | WRITE PORT 01 | WRITE PORT 02 | WRITE PORT 03 | WRITE PORT 04 | WRITE PORT 05 |
|---|---|---|---|---|---|---|
| 172a | 179a | 179b | 179c | 179d | 179e | 179f |
| 172b | 179b | 179c | 179d | 179e | 179f | 175a |
| 172c | 179c | 179d | 179e | 179f | 175a | 175b |
| 172d | 179d | 179e | 179f | 175a | 175b | 175c |
| 172e | 179e | 179f | 175a | 175b | 175c | 175d |
| 172f | 179f | 175a | 175b | 175c | 175d | 175e |

The freelist 176 further includes an extension portion (part of the previously mentioned 32 locations) which is used to store data for backup map 188. Data is read from this freelist to the backup map by a third pointer 177b which keeps track of the first location of the freelist extension.

A similar arrangement is provided for the backup map 188 via registers 176a, 176b and busses 188c' and 188c" respectively as shown. The assignment of the lines to the write data ports (not shown) of individual files (not shown) of the backup map 188 similarly to that for map 170 shown in TABLE III above.

The integer map 36 is shown to further include a log store 180 which has a write port and a read port. The write port is addressed via a pointer 182 which points into the most recent entry position into the log 180 to store write data via register bank 184. Register bank 184 provides the present destination registers of the present destination register operand of instructions IN00–IN05 respectively as shown. These destination registers operands of these instructions are recorded in the log along with a write enable bit indicating whether the instruction does or does not actually write a result to a register. The write enable is used to enable writing of selective ones of the destination operands to the log 180 or alternatively is used as additional bits associated with each one of the register addresses to indicate whether or not the destination register is associated with an actual register write.

Write enables are provided from the output of a logic circuit 187. Circuit 187 logically combines valid bits VAL00–VAL05 and destination decodes DES00 to DES05 to provide the write enables WE00 to WE05. The circuit 187 provides a write enable signal (We$_i$) for each one of the instructions in accordance with the status of the "valid data bits" and the "instruction destination register use" signals. The memory write enable signals (We$_i$) are fed to the map 170 and are used to enable writing at a particular write port of a particular file, in accordance with the state of the write enable bit indicating which the particular instruction was a valid instruction and an instruction of the type which includes a destination register operand line.

This technique saves replacing register addresses for instructions which were either invalid instructions or ones which did not contain a destination register address,and it efficiently utilizes the available free registers.

A compressor circuit 185 takes the write enable bits WE00 to WE05 and the register numbers from registers 175a and 175b to pack the unused registers to fill lines of six to go to the freelist 176. It similarity accepts register numbers arriving from the wait list to fully pack a six location line to put on the freelist 176.

The mapper 36 further includes a wait list 186. The wait list is sent the previous destinations of each of the contents of the map 170. These values are written to the wait list and are stored in the wait list for a sufficient period of time to ensure that the register values will no longer be needed during either a replay or restart of the instruction stream. The wait list is here a register file of 8 bits by 100 locations for a serial arrangement of register numbers.

The wait list 186, as shown in FIG. 6A, has a compress circuit which packs lines of registers before placing them on the wait list in a similar manner as compress 185 above and includes a register file having a field for a register operand and a ready bit. The ready bit is cleared when a register number is written to the location. The ready bit is set from a logical instruction number log 189 as will be described in conjunction with FIGS. 6A and 6B. The register values are moved onto the compressor 185 and on to the freelist 176 if the ready bit is set and all logically preceding ready bits are set.

Figure 6B:
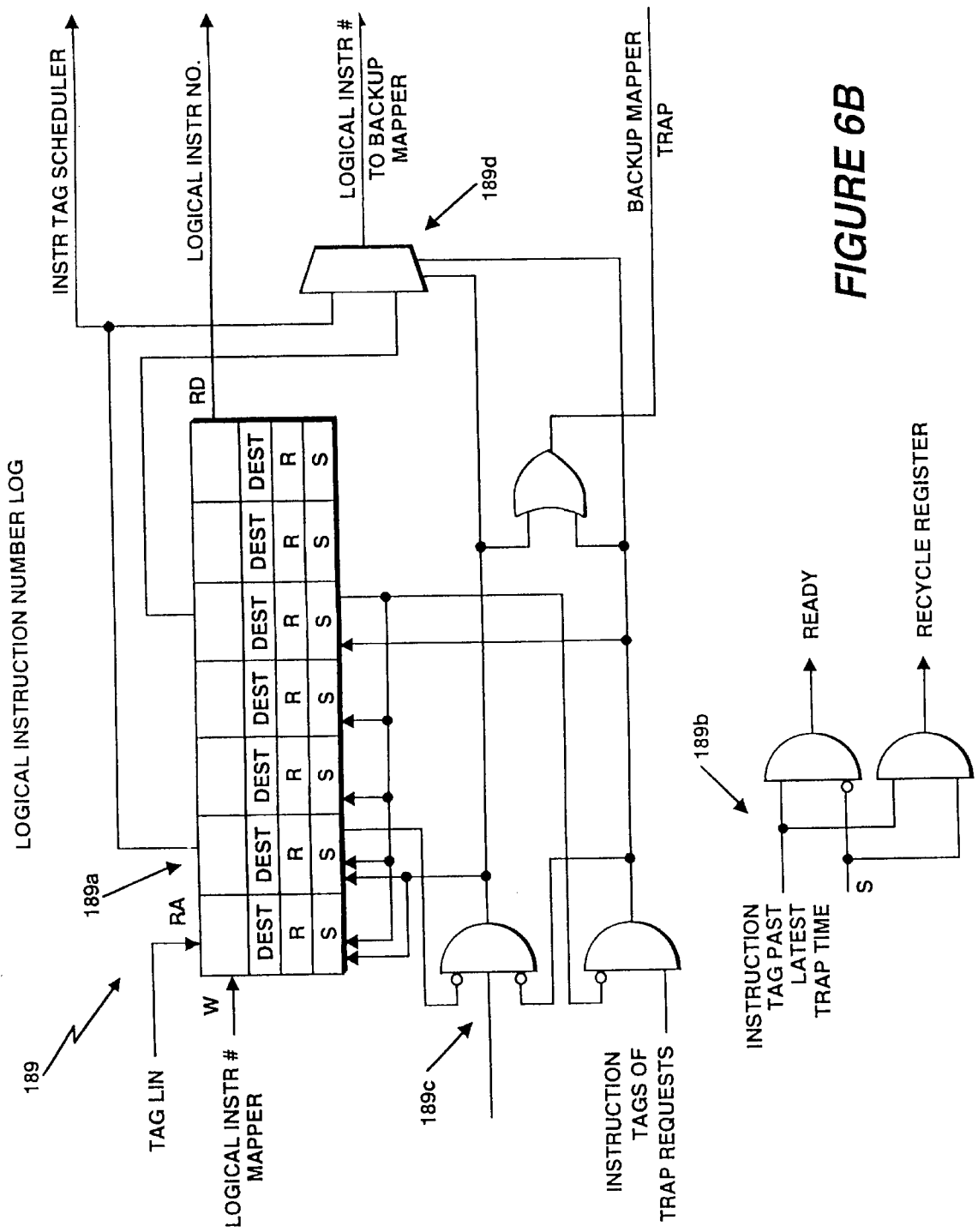
FIG. 6B is a block diagram of a logical instruction number log portion of the wait list of FIG. 6B.

As shown in FIG. 6B, the wait list has an additional structure referred to as a logical instruction number log 189a. The logical instruction number log 189a is a register file which has a write port addressed by ascending sequence by a counter and a read port addressed by the tag of an instruction reported from other parts of the processor. For each entry in the register file are the following fields: the logical instruction number field, the destination register operand field a ready bit and a shadow bit status bit. The logical instruction number of all real mapped instructions is written to the register file at the location specified by a write pointer (not shown). Each instruction emerging from the mapper is tagged with the value of the fill pointer as the logical instruction number tag. The tag travels with the instruction to other parts of the processor which may report the tag indicating some status of the instruction. The physical register destination operand if any is also stored with each logical instruction number.

The ready bit in the wait list is cleared when the register is placed on the wait list. There are also ready and shadow bits for the logical instruction number log. These bits are cleared when the logical instruction numbers are placed on the logical instruction number log. The shadow bit is provided to the logic circuit 189b shown and indicates that the current tag was in the shadow of a restart or backup and thus the register in the logical instruction log can be reused.

The wait list can discard registers as a result of restarts but the logical instruction number log does not. The logical instruction number log further has logic 189c to handle instruction tags of trap requests. A MUX is used to select which instruction number is provided to the backup map 188 during a backup, and the logical instruction number is provided from register stack 189a as shown during normal retirement of an instruction. The logical instruction number log is a circular file that is written over if the new location has the ready bit set. If the next location to which the fill pointer will increment in the logical instruction number log does not have the ready bit set the mapping in the mapper is halted.

Normal retirement of an instruction begins when the replay buffer reports the tag of the instruction which is now past it s latest trap or replay time. The tag is reported to the logical instruction number log 184. The tag is applied as an address to the store 189a. The ready bit at this address is set. We also read the logical instruction number, S bit and destination register at this location. The S bit goes to the logic 189b if the S bit is set (=1). The destination register is sent to the compressor 185 and then on to the freelist. If the S bit is 0, the logical instruction number is used to address the wait list to set the ready bit in the wait list. When all previous ready bits in the wait list have been set the register number recorded there will be sent to the compressor 185 and on to the freelist.

Returning to FIG. 2, the IBOX 20 is shown to further include, an instruction buffer 35 disposed in the path of the instruction stream. The buffer is here provided to smooth instruction throughput since the ICACHE 34 can issue here up to 12 instructions at a time whereas, the ISCEHD 38 schedules up to 5 instructions at a time. Alternative arrangements to accomplish this would include providing the ICACHE 34 to issue only 5 instructions at a time providing corresponding simplifications to the logic or to increase the ISHED 38 to schedule more than 5 instructions at a time such as 6 or 12 instructions for example. Having the IMAP map more or fewer instructions worth of register operands is relatively straightforward with the technique mentioned above. It is preferrable that the number of instructions seheduled per cycle match the number of registers mapped per cycle.

Here the potential 12 instructions issued by the ICACHE 34 are accepted by the buffer 35 each cycle provided that the buffer is not full. The buffer 35 provides a predetermined amount of storage here for 48 instructions and issues a signal to the branch predictor indicating when it is full. If the buffer 35 is full the branch predictor 40 issues a restart command to the line predictor to reissue any packets which were issued by the ICACHE 34 but not accepted by the buffer 35. Here the buffer provides a partial decode to determine whether the instruction is a floating point or integer instruction and the number of operands and whether it writes a result. The buffer presents up to here five (or six if the ISCHED 38 is adapted to process 6 at a time as described below) integer instructions at output 35a to the IMAP 36 and the ISCHED 38 and up to here 8 instructions to the FMAP 70 and the FSCHED 72, or what ever maximum number of instructions can be scheduled by the schedulers. The buffer does not change the logical order of instructions within either group of instructions, but merely stores several cycles worth of instructions and separates the instructions into floating point and integer types. The use of the buffer buries the effect of line mispredicts since the buffer can store many instructions and the occurance of a line mispredict may be invisible to the ISCHED and IMAP circuits.

Instruction Scheduler

Figure 7:
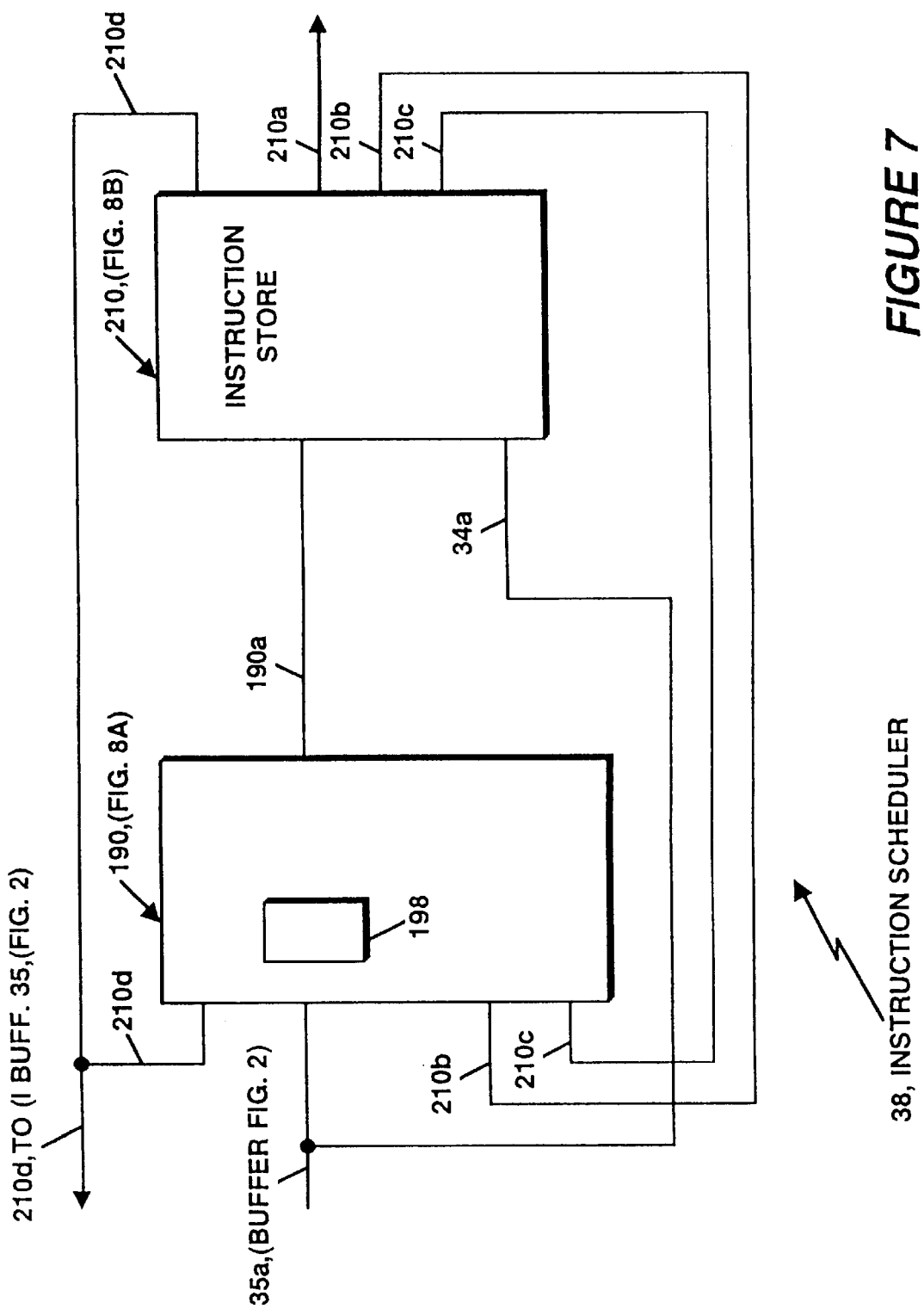
FIG. 7 is a block diagram of an instruction scheduler used the CPU of FIG. 2.
Figure 8A:
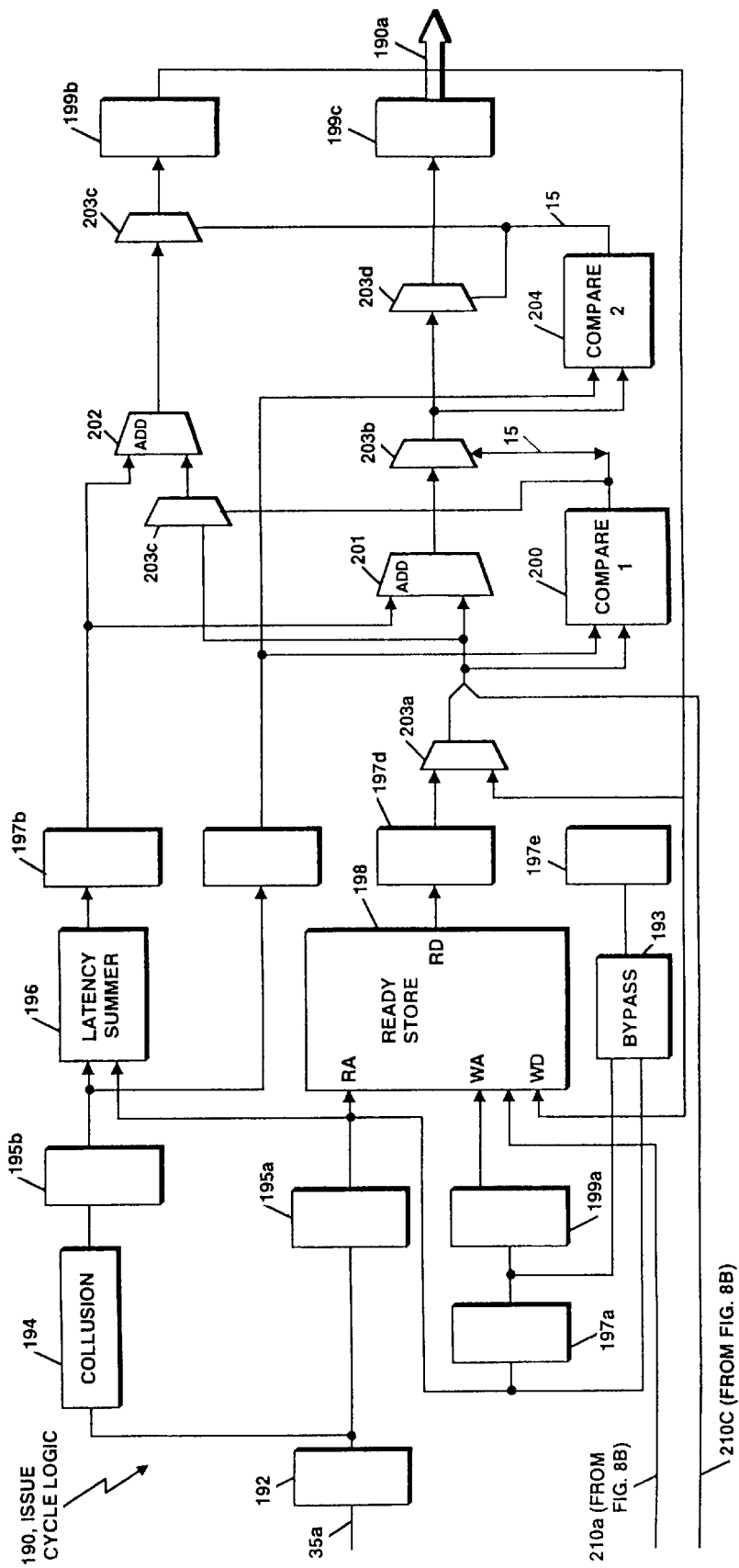
FIG. 8A is a block diagram of an issue cycle logic circuit used in the instruction scheduler of FIG. 7.
Figure 8B:
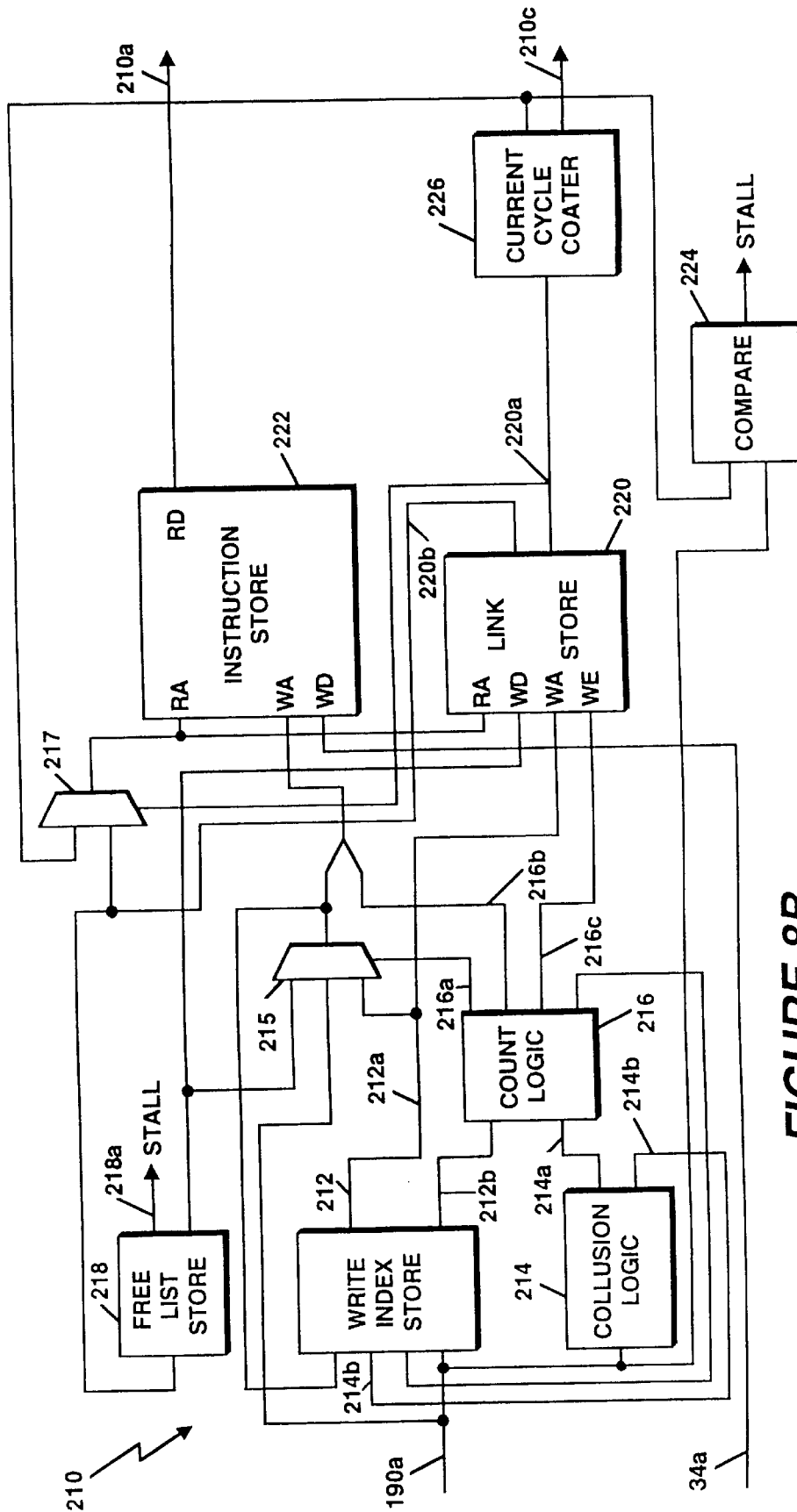
FIG. 8B is a block diagram of an instruction store used in the instruction scheduler of FIG. 7.

Referring now to FIG. 7, an instruction scheduler 38 is shown to include an issue cycle logic circuit 190 as will be further discussed in conjunction with FIG. 8A and an instruction store circuit 210 to be discussed in conjunction with FIG. 8B. The scheduler 38 is here shown to accept five instructions in parallel at the input of the issue cycle logic circuit 190 from the IBUFF 35 (FIG. 2).

For the machine contemplated in FIG. 2, a preferred implementation of scheduler 38 is to accept six instructions in parallel. However, the differences between the present described scheduler and one which accepts six instructions in parallel will now become apparent on one of ordinary skill in the art. For a six instruction scheduler, the circuits to be described are similar. With the additional instruction, each path in the ISCHED 34 is wider, and the scheduler stores, as appropriate are wider. Furthermore, certain of the circuits have additional logic circuits provided to determine whether instruction IN05 is hit by any preceding instructions, as will be generally described.

Thus, for the five instruction scheduler, the issue cycle logic circuit 190 examines each of the five instructions accepted at the input thereof and assigns a cycle number to each instruction that is a nominal cycle number in which this instruction will issue from the instruction scheduler 38. The instruction in general would issue in this cycle number if there were sufficient resources available in the remainder of the processor. However, due to finite availability of resources in the processor occasionally a given nominal cycle number may be executed out as several sequential physical cycles if necessary to wait for a resource to be free or a previous instruction to be executed, until all of the instructions assigned to the given cycle number have executed.

The instructions are assigned cycle numbers at the time of acceptance of the instruction rather than at the time the scheduler issues the instructions. The issue cycle logic provides cycle numbers for each of the instructions along line 190a whereas the actual instructions are fed to the instruction store 210 (FIG. 8B) via line 34a from the ICACHE 34. The instruction store, stores the instructions waiting to be issued from the instruction scheduler 38 and supplies a sufficient number of instructions in parallel at a sufficiently fast cycle time as to permit the processor to execute instructions efficiently.

The instruction store 210 is designed to handle an arbitrary number of instructions that are assigned during any given cycle and which may arrive in random order to be stored in the instruction store 210. Not only are these instructions stored they are also retrieved from the store very rapidly to ensure a sufficiently fast cycle time of instructions provided from the instruction scheduler 38. The instruction store 210 provides the instructions from the scheduler 38 via line 210a provides a status message via line 210b indicating that the instructions have been issued from the instructions scheduler 38 back to the issue cycle logic 190 and also provides a message via lines 210c indicating the next earliest possible cycle to issue instructions from the next set of instructions being assigned cycle numbers from the issue cycle logic 190. Furthermore, the instruction store also provides a stall message via line 210b to the issue cycle logic 190 and the IBUFF 35 (FIG. 2) to halt the fetching of instructions from the IBUFF 35 and assigning of cycle numbers to instructions via the issue cycle logic 190.

As mentioned above, a plurality of instructions are presented in parallel to the issue cycle logic 190. In the illustrative example, the number of instructions presented is five (5) although a larger or smaller number of instructions can be provided. Information regarding these instructions are stored in a ready store 198. The cycle numbers which have been assigned to all instructions preceding the five current instructions and that are still relevant are available to the issue cycle logic circuit 190 and are stored in the ready store 198, as will be further described in conjunction with FIG. 8A. This information therefore is available as needed in the issue cycle logic 190 and will be used to assign cycle numbers to the present group of five instructions fed to the issue cycle logic 190. The information on the previous issued and assigned instructions is necessary in order to provide cycle numbers for the present five instructions since the determination as to when to issue a given instruction of one of the present five current instructions may be dependant upon when a previous instruction will issue since the results of the previous instruction may be necessary to execute the present instruction or some data used by the previous instruction may alternatively be provided by the present instruction. Moreover, the cycle numbers which is assigned to each of the five instructions by the issue cycle logic 190 are determined relatively rapidly in order that the instructions are ready to be processed through the issue cycle logic into the instruction store 210 and that the next group of 5 instructions which will be present in the next cycle at the input of the issue cycle logic 190 may likewise be processed. The issue cycle number (provided on line 190a) assigned to each of the five instructions is the earliest cycle number in which its required input operands are ready and thus the earliest cycle number in which the instruction can be issued from the scheduler 38.

The following notation will be used throughout the discussion of the instruction scheduler 38. Assuming an instruction $I_N$ where $I_N$ is the $N^{th}$ instruction out of the group of five present instructions that are being scheduled, includes a number of operands whose availability must be determined by the issue cycle number logic. Thus, the instruction can be represented as follows $I_N (A_{N0}, A_{N1}, A_{N2})$ where $A_{N0}-A_{N1}$ are the particular source register operands and $A_{N2}$ is the destination register operand of the instruction $I_N$ and where $A_{N0}, A_{N1}$ are used as an address to a look up table to provide a result $B_{N0}-B_{N1}$ which is a base cycle number (ie. either BN0 or BN1) in which the data corresponding to the respective operand $A_{N0}-A_{N1}$ will be available and $A_{N2}$ is the destination operand which is delayed for two cycles via registers 197a and 199a and is used as a write address in the Ready Store 198 to store the availability or the cycle number when the destination register is available for a subsequent instruction.

Several constraints are encountered in looking up the cycle numbers for the availability of the operands of the particular instruction $I_i$. For example, for either one of these lookups the results could correspond to a bit set in the Ready Store 198 used to indicate the result is already "ready". If this occurs for a particular look up then the value that is used for the issue cycle number is the Earliest Possible Cycle Number rather than which ever value for cycle number is present in the ready store. The Earliest Possible Cycle Number is the cycle number supplied by the Instruction Store 210 (FIG. 8B) as the earliest possible cycle number at the current time and as will be further described below. Issue cycle logic 190 will never assign a cycle number that is less than the earliest possible cycle number.

Even if a look up value is not accompanied by a bit indicating that this data is already "ready", the value could still precede the earliest possible cycle number. In this event, the value that is used is the earliest possible cycle number. Each of the two input operands for a particular instruction come from some previous instruction either within the group of five instructions that are presently processed or an instruction that was processed earlier.

As an illustration of the scheduling, assume that the group of instructions are N instructions in number or five $I_0$ to $I_4$ and thus N is indexed from 0–4. If the input operand $A_{N0}$ for an instruction $I_N$ is from an instruction that was processed earlier, then the necessary data for operand $A_{N0}$ will be ready either in a base number cycle (BN0) for instruction N, operand $A_{N0}$ or at the earliest possible cycle number. Determination of BN0 is provided by a read operation of the ready store 198 at the address of $A_{N0}$ for the instance mentioned above. If the input operand 1 for instruction $I_N$ comes from an instruction that was processed earlier then that data will ready in cycle BN1 or earliest possible cycle number as described above. The earliest possible cycle number, and cycle numbers BN0, BN1 are candidate cycle numbers assignable to instruction $I_N$.

If however, an operand for instruction $I_N$ comes from another instruction $I_N$ within the current group of instructions that are currently being processed then it is less straightforward to ascertain when instruction $I_N$ will issue. However, if it is required to have an input for the instruction then it can be assumed that the data needed from instruction $I_M$ will be available ($L_M$) cycles after instruction M issues, where $L_M$ is the latency of instruction M. Noting that the index of instruction $I_M$ is less than the index of instruction $I_N$. The three possibilities for instruction 10 are that instruction 0 N=0) will issue in cycle number B00 or B01 or the earliest possible cycle number. From this, it is possible to construct a table of the possible issue cycle numbers for all five instructions where $L_N$ is the latency of the instruction N.

TABLE IV

| INSTRUCTION | POSSIBLE CYCLES WHEN INSTRUCTION WILL ISSUE |
|---|---|
| 0 | B0 |
| 1 | B1 |
|   | B0 + $L_0$ |
| 2 | B2 |
|   | B1 + $L_1$ |
|   | B0 + $L_0$ + $L_1$ |
|   | B0 + $L_0$ |
| 3 | B3 |
|   | B2 + $L_2$ |
|   | B1 + $L_1$ + $L_2$ |
|   | B0 + $L_0$ + $L_1$ + $L_2$ |
|   | B0 + $L_0$ + $L_2$ |
|   | B1 + $L_1$ |
|   | B0 + $L_0$ + $L_1$ |
|   | B0 + $L_0$ |
| 4 | B4 |
|   | B3 + $L_3$ |
|   | B2 + $L_2$ + $L_3$ |
|   | B1 + $L_1$ + $L_2$ + $L_3$ |
|   | B0 + $L_0$ + $L_1$ + $L_2$ + $L_3$ |
|   | B1 + $L_1$ + $L_2$ |
|   | B0 + $L_0$ + $L_1$ + $L_3$ |
|   | B0 + $L_0$ + $L_3$ |
|   | B0 + $L_0$ + $L_2$ + $L_3$ |
|   | B2 + $L_2$ |
|   | B1 + $L_1$ + $L_2$ |

TABLE IV-continued

| INSTRUCTION | POSSIBLE CYCLES WHEN INSTRUCTION WILL ISSUE |
|---|---|
|   | B0 + $L_0$ + $L_1$ + $L_2$ |
|   | B0 + $L_0$ + $L_2$ |
|   | B1 + $L_1$ |
|   | B0 + $L_0$ + $L_1$ |
|   | B0 + $L_0$ |

In this table BN represents BN0, BN1 or the earliest possible cycle number. Hence, each line in the table represents three distinct possible values Several observations can be made concerning TABLE IV. The first observation is that there are a total of 31*3 or 93 possible formulas (including the possibilities associated for each base number) for the 5 values that need to be produced to determine the actual cycle number for each of instructions $I_0$–$I_4$. Each of the formulas for the possible cycle number may be separated into a base number (BN0, BN1, or the earliest possible cycle number) and a sum of latencies for some instruction $I_N$. The sums of latencies are known ahead of time. That is, the latencies are all input parameters into the scheduler and not produced by any loop function within the scheduler. Moreover, for each of the instructions, a single number for the sum of latencies that will be used for each base number can be ascertained. Accordingly, for instruction $I_2$ for example, a single number can be added to $B_0$ should the correct formula for when instruction $I_2$ should issue turn out to be a formula involving B0. Likewise for instruction $I_3$, a single number can be ascertained to use if the correct formula involves B1 for issuing of instruction $I_3$ and a single number can also be used if the correct formula involves $B_0$ and so forth. The numbers are determined by comparing the destination operand register numbers from all five instructions with the source operand register numbers for all five instructions. The earlier instruction can be a source of input data to a later instruction and the results of these comparisons are sufficient to determine for any given base number which sum of latencies are candidates and which are not candidates for the number. In general, this still leaves more than one number for each base number. However, at this point it is possible to determine the correct sum of latencies to be used for each base number (i.e. exactly the larger sum of the true candidate sums for the each base number).

To determine the correct choice of latency sums to use with a given base number when providing the issue cycle for the instruction, it is noted that the largest sum of latencies is the correct choice. For example, assume that the correct formula for instruction 4 has a base number of B0, (this example is chosen because it is the most complex case) it can be determined from matching sources and destination register numbers that the following sums of latencies and no other ones are true candidates.

L0+L1+L3;

L0+L2;

L0+L1; and

L0

The object is to provide a latency sum to add to B0 to obtain the issue cycle of instruction 4. Since LN is always greater than "0" it is apparent that L0 could not be the largest number, since there are many candidate latency sums to which other numbers beside L0 are added. Moreover, it also clear that the answer is not L0+L1 since L0+L1+L3 must be larger. In this example there are only two possible candidates L0+L1+L3 and L0+L2. Since, the set L0, L2 is not a subset of the L0, L1, L3 nor is L0, L1, L3 a subset of L0, L2, it is not apparent which of the two is larger without knowing the precise values of the numbers.

As indicated above, the latency sums are added to a base number, where the base number is B01, B02 or the earliest possible cycle number. It can be observed that which of these 3 numbers is the proper number can be determined without involving any of the latencies and moreover the numbers can be determined by using which of the three numbers is the largest number. This is a relatively simple parallel compare operation between the three numbers although the compare operation is relatively slow it should be also understood that the determined latency can be added to each of the three cycle numbers in parallel with the compare operation and the result of the compare operation is used to select the proper base number and latency sum as the single result corresponding to $I_4$ and base number B0.

Issue Cycle Logic

Referring now to FIG. 8A, the issue cycle logic circuit 190 is shown to include a first register 192 here referred to a rank one register where rank corresponds to a clocking cycle through the instruction logic circuit 190. The register 192 here has the capability of loading and thus storing 5 instruction in parallel. These instructions are fed to register 192 via line 35a from the instruction buffer 35 (IBUFF) (FIG. 2). The rank one register 192 provides output data which are fed to a rank two register 195a as well as to a collision logic circuit 194 (as will be further discussed with conjunction with FIG. 9A). The collision logic circuit 194 determines if either input operand register number for any of the instructions matches an output operand register number of a logically preceding one of the five instructions. If there are such matches, this logic determines what sums of latencies could possibly be needed to schedule these instructions. It also determines for each possible base number if either base number BN0 or base number BN1 or both are ineligible to be the resultant base number BN. This information is delayed for two clock cycles via registers 195b and 197c and is thus fed to compare circuit 200. Compare circuit 200 is used to provide enable signals to MUX 203b and MUX 203c to select the highest base numbers from three possibilities before adding them to latency sums in 203c and after adding them to latency sums in 203b. Collision circuit 194 also determines for each instruction exactly which base numbers are qualified base numbers to compete for determining the issue cycle base number for the particular instruction. This latter determination of largest candidate for issue cycle (i.e. base number plus the latency) is made in compare logic circuit 204 as will be further described.

The aforementioned outputs from the second rank registers 195a is applied to a ready store circuit 198 which is here a register file having a pair of read ports for each instruction and a write port for each instruction. The output of second rank register 195a is also provided to a pair of third and fourth rank registers 197a, 199a with the output of register 199a applied to a write port of the ready store register file 198. The output of the first, second register rank 195a is also fed to a latency sum circuit 196 which the use of the output of the second, second rank register 195b provides all of the latency sums for each base number for each of the five instructions as determined by the collision logic circuit 194 and the operands from the instructions provided via registers 195a.

The output of the latency sum circuit 196 is fed to a second, third rank register 197b.

The third rank of registers is provided and includes a third, third rank register 197c which stores the outputs of the second rank register 195b and which provides as an output thereof inputs to the compare circuits 200 and 204 as mentioned earlier, as well as A fourth, third rank register 197d which is provided at the output of ready store 198 to store the read output (base cycle numbers) from the ready store 198. The output for the ready store 198 loaded in register 197d is the base numbers BN0, BN1 for all of the N instructions as well as the associated "ready already" bits.

In parallel with this read from the ready store 198 is provided all possible combinations of the needed instruction latencies and base numbers which are formed in the latency sum block in accordance with the signals provided from the collision block 194. Thus, contained in the third rank registers 197a–197d are respectively, the five fetched instructions provided to the issue cycle logic 190, all possible latency sums for each of the base numbers for each of the five instructions, the conditions determined via the collision block 194, and in register 197d the base numbers for all of the N instructions and the associated "ready already" bits for each of the base numbers for each of the instructions. This bit is set via a signal on line 210b from the instruction store 210 (FIG. 8B) when the particular instruction addressed therein is being issued.

The contents of register 197d are fed to the first input of a multiplexer 203a with the second input of the multiplexer 203a being fed from a fourth rank register 199b. Register 199b has stored the cycle number for each of the possible five previous instructions processed in the preceding cycle. This cycle number corresponds to the cycle when the result of each instruction will be available to use as an input to another instruction.

The bypass control circuit 193 is fed each address that is used to perform a read of the ready store, via register 195a and each address that is used to perform a write of the ready store, via register 197a. If there is a match between such addresses, that is a location currently being read is to be written in the following cycle, then for that data position Bypass control circuit 193 asserts, a signal via a state device 197e (a second rank register) which causes mux 203a to substitute data from register 199b for the data read from ready store 198 (contained in register 197d).

This action by MUX 203 occurs when the signal from Bypass control circuit 193 is in register 197e and the data read from the ready store at the same time that the circuit 193 provided the select signal. This technique is referred to as bypassing. The values of the "ready already" bits accompanying data from register 199b is fixed at "0".

It may happen that of the possible five addresses at which the ready store will be written, via addresses in register 197a, some of the addresses are the same. The logic of the bypass circuit 193 recognizes the proper order of the five instructions. If a read address in register 195a is matched by any number of write addresses, then the bypass control determines which write that matches said read is the logically last matching write. It is the data from this same instruction in register 199b that will be substituted for the read data from the ready store in MUX 203a. This is provided from the previous cycle so five instructions as will now be described.

For the present instructions provided at the third register rank 197a–197d it can be seen in FIG. 8A that the output of register 197b is provided to the first input of adder 202. The second input to adder 202 is fed via a multiplexer 203c which has one input provided from the output of a multiplexer 203a and a concatenated signal from input 210c provided from the instruction store circuit (FIG. 8B). Input 210c is the Earliest Possible Cycle Number status from the instruction store. The output from multiplexer 203a is provided from either the fourth third rank register 197d or the output of register 199b as previously described. These data are fed likewise to adder 201 and are supplied via the multiplexer 203c to adder 202. At adder 202 thus the latency sum is added to the base number for each of the N instructions and each of the J possible base numbers. Specifically, the latency sum that is added to each possible base number for each instruction is sufficient to equal the cycle number in which the result of this instruction will be available if the given base number is the correct one. This output is then fed to multiplexer 203c which is ultimately fed to the fourth rank register 199b. The output of register 197c as well as the output from multiplexer 203a are also fed to the first compare circuit 200.

Compare circuit 200 determines the correct choice for the base number under the eligibility limits provided from the collision block 194 via the signal from register 197c.

The data from register 197c is the data which indicates that the values looked up in the Ready Store 198 are invalid. A value BNi would be invalid if ANi matches AMi for any M<N within the same group of instructions. The data from MUX 203a is the earliest possible cycle number via line 210c and all of the possible base numbers (BN's) from the ready store 198. The output from compare circuit 200 is used as a control input to a multiplexer 203b. Multiplexer 203b is fed input signals via a adder 201 which as mentioned earlier forms all possible latencies with all the potential base numbers. These resulting sums from adder 201 are provided as inputs to the multiplexer 203b and the select signals from compare circuit 201 are used to select the proper base number and latency from the output of adder 201.

The output of multiplexer 203b is provided as one input to the second compare circuit 204 and the second input of the compare circuit 204 is provided also from the third rank register 197c. The data from register 197c are base number qualifying enables from the collision circuit 194, whereas the data from MUX 203b is the proper base number and latency sum for each instruction and each base number. The result of this comparison is a determination of which of the base numbers plus latencies over the J possible base numbers for each of the N instructions is the largest value. The value actually used is selected by the multiplexer 203d and stored in register 199c and is provided as an output from the issue cycle logic 190. The result in register 199c is the cycle number which is assigned to $I_N$ and this is provided for all instructions. This data is fed via line 190a to the instruction store circuit 210 as will be described.

Writing to the ready store 198 is accomplished as follows: For each of the five instructions, the cycle number when each instruction will have its results ready is supplied to the write data inputs of the ready store 198, via register 199b. The destination operand register number of each of the instructions provides the address for the ready store 198 where the write will be performed. The logical sequence number of each instruction which is also in register 199a is also written in the ready store 198 in the field provided for it at the address indicated by the destination operand register number of the instruction. Simultaneously, at these locations the "ready already" bits are cleared.

When an instruction is issued from the instruction store circuit 210, the destination operand and logical instruction number are delayed for the maximum latency of any instruction and then the destination number is used as an address to read the ready store 198 to obtain the logical instruction number stored there. This is compared with the logical instruction number of the issuing instruction. If there is a match the ready already bit in the ready store 198 is set.

Instruction Store

Referring now to FIG. 8B, the instruction store circuit 210 accepts up to the maximum number of instructions that the scheduler accepts per cycle. In the illustrative example this number of instruction is five. It holds the instructions until the proper issue cycle and supports the withdrawal of whatever number of instructions that can be issued in parallel at once to the remainder of the processor. It supports repetitive withdrawal at a period that can match the period of the fastest arithmetic logic unit in the remainder of the processor. Thus, if necessary, the instruction store 210 can be designed to provide two cycles of instructions per issue cycle. The instructions that can issue during any cycle are stored in an instruction store with associated cycle numbers. Accordingly, a single read instruction to the instruction store produces the proper instructions to issue.

The instruction store circuit 210 includes a write index store 212 which is addressed via the data on line 190a from the issue cycle logic circuit 190 and from devices 199c. The write index store 212 includes for each cycle number a valid bit which if "zero" (0) indicates that there are no instructions for the particular issue cycle addressed currently in the instruction store 210, or if a logic "1" indicates that at least one instruction has been previously placed in the instruction store for this instruction cycle. The write index store further includes a count status word which indicates the number of instructions that have already been stored in the current last location in the instruction store for the particular issue cycle and this data is valid only if the valid bit is set to one as described earlier.

The write index store 212 further includes the current last location in the instruction store assigned to the issue cycle and this is also significant only if the valid bit is set equal to one. The issue cycle numbers for the five instructions are used as addresses to the write index store 212 to obtain the above mentioned data fields for each of the five instructions.

In parallel with lookups in the write index store 212, the issue cycles are compared in a collision logic circuit 214. That is, the data on line 190a is also fed to a collision logic circuit 214 and a counter increment is computed for each instruction. The collision logic circuit 214 determines the number of instructions in the instruction stream fed thereto which in the illustrative example is 5 that have an issue cycle number that matches the issue cycle number of instruction N and if all of the instructions have different issue cycle numbers they all are provided count increments of 0. If a set of the instructions all have matching issue cycle numbers then each of the instructions in the set are provided with count increments of 0, 1, 2, 3 . . . No two instructions will match in both issue number and count increment. The count increment data is fed to a count logic circuit 216 along with a bit for each instruction that indicates which instruction has the highest count increment for each unique value of issue cycle number.

The count increment for instruction '0' is always zero. The count increment for instruction N is always the number of instructions in positions less than N, whose Issue Cycle numbers match the Issue Cycle numbers of instruction N. If a set of instructions all have matching Issue Cycle numbers then they will have sequentially increasing counts, whereas if a set of instructions all have different Issue Cycle numbers then they will have '0' counts. Thus, no two instructions will match in Issue Cycle number and Count increment.

The count logic circuit 216 has logic to examine the valid bits of the instructions. If the valid bit is 0 than the count is replaced for that instruction with a '0'. Then, for each instruction the count increment (via line 214a) is added to the count (via line 212b) to provide a value which is called "$C_x$". The value of "$C_x$" is compared for each instruction with the instruction store width.

If $C_x$ is equal to or larger than the instruction store width, then the MUX 215 is directed to select an address from a free list register store 218 as its output for this instruction position. The free list store 218 provides a list of all currently unoccupied locations in the instruction store 222 which are available for storage of scheduled instructions. If an address location is provided from the free list store 218 then this becomes the address of the location where the next instruction stream,g is stored.

If $C_x$ is less than the instruction store width then there are two potential conditions. The first condition is that the valid bit from the write index store for this instruction is '0'. In this case, MUX 215 selects the cycle number assigned to this instruction from line 190a as its output for this instruction. The second condition is that the valid bit from the write index store for this instruction is "1". In this event MUX 215 selects the index of this instruction read from the write index store on line 212a as its output. The count logic also produces a "column address" on line 216b for each instruction. If $C_x$ is equal to or larger than the instruction store width for an instruction then the column address is $C_x$ minus the instruction store width. Otherwise the column address is just $C_x$.

The instruction store circuit 210 also includes the free list store 218 mentioned above. Free list store circuit 218 indicates locations in the instruction store in which instructions are not stored and thus are free to be stored with new instructions as needed. At the beginning of each cycle a free list provides five free or available locations which can be assigned to any and all 5 new instructions that may be processed during a particular cycle. In any particular cycle some of these free locations are used and some are not used. The used free locations are replaced with new free locations which are available for the next cycle. If there are no free locations left when one is needed, then the processing of instructions is stalled until a free location is available.

Thus, the free list store 218 provides a stall signal along line 218a which is used to stall additional processing of instructions. Stall signal 218a is fed to issue cycle logic 190 and the branch prediction logic 40 which causes the instruction fetching from the IBUFF 35 to stop here by freezing data in registers (not illustrated).

The instruction store logic circuit 210 further includes a links store 220. Link store 220 keeps track of all of the locations in the instruction store 222 that are used in any particular nominal issue cycle. In the links store 220 is a readable location corresponding to each location in the instruction store. Given any location, the links store contains an indicator showing if this is the last location assigned to this nominal cycle or if there is a subsequent following location and the instruction store address of the next following location assigned to this nominal cycle. The links store thus provides an output signal via line 220a which is used to increment the current cycle counter 226 as well as an output signal via line 220b which is used to provide addresses to the instruction store 218 via the MUX 217. The current cycle counter value is also provided to the instruction store. The instruction store 210 also includes an instruction store bank 222 here a register file of any preferred size. As an example, a register file of 32 locations of 5 instructions per location is used.

The Link Store 220 is written for each instruction processed through the Write Index store that has the highest value of Count Increment for any given cycle number. A write is also performed only if the location for that instruction is a new value off of the free list 218 that is allocated to the present instruction. The count logic provides these signal with the logic conditions via lines 216c.

The instruction store 222 includes a read port and a write port. The write port has a write address line which is fed via the output of multiplexer 215 (ie. the row address), as well as the output of signals from count logic 216 (ie. the column address). Multiplexer 215 as indicated earlier selects from the address of the free list location, the assigned instruction issue cycle, via line 190a, and the index for the given issue cycles. This forms an address to write data via line 34a (i.e. the instructions into the instruction store 222).

Reading of instruction store 222 is accomplished by placing an address at the read address port of the instruction store 222 from multiplexer 217 which has inputs either from the output from the links store 220 via line 220b or the output from the current cycle counter 226. The links store 220 in addition to providing addresses to read the instruction store 222 is also used to increment the current cycle counter 226 via line 220b. The current cycle counter 226 holds the next nominal cycle to issue. This value is used to read the instruction store 222 and the links store. The contents read from the instruction store 222 are the instructions which are issued in this physical cycle. If the value obtained from the links store on line 220a indicates that there is a following location then the MUX 217 uses the value from the links store as the next address to the instruction store 222 and the links store rather than the value of the current cycle counter. If however, the value obtained from the links store indicates that there are no following locations, then the current cycle counter is incremented modularly and and MUX 217 selects its value to be the next address to the instruction store and the links store via signal INC_CCC (increment current cycle counter) on line 220a.

The output of the current cycle counter 226 is also compared in compare circuit 224 with the assigned cycle number for each of the instructions provided from line 190a. If the result of the compare indicates that for any instruction, the current cycle count is more than the number assigned to the instruction, or the cycle number assigned to an instruction is more than the current cycle count plus M where M is an instruction store size in cycles, using a modulo compare, then a cycle number has been assigned to an instruction that would cause conflicting double usage of a location in the instruction store. Thus the compare circuit issues a stall signal to stop the issue cycle logic and upstream logic until this location becomes available.

The address for the write into the Link Store is the Index of the instruction read from the write Index store 212 on lines 212a. The data that is written is the new location from the free list 218 that is allocated to the instruction. All of these writes set the bit in the Link Store 220 to indicate that there is a following location with an instruction to issue in the current cycle.

For the purposes of writing to the Instruction Store 222, the instruction store is addressable to a single instruction. The address for writing is comprised of two fields: the location field which corresponds exactly to the way the instruction store is read and the column which selects the particular instruction site at the given location. The location address comes from MUX 215, whereas the column address is from count logic 216. Each instruction is written in parallel at its assigned location. The value of current cycle counter is used as an address into the Write Index store 212 along a line (not shown) and the valid bit at this location is cleared.

Instructions are issued as follows: The single bit in each location of the Link Store 220 that indicates if there is a following location is destructively read that is, the bit is cleared to zero after a read. Each time a value from the link store 220 is used to access a next location in the Instruction Store, as determined by logic state of line 220a, that value from the link store 220 on line 220b is added to the end of the free list 218.

Several initializations are provided such as all link store locations indicate no following locations, all valid bits in the Write Index are reset to '0' and all locations in the instruction store 198 other than locations 0 to M that are permanently assigned to cycles 0 to M are in the free list.

Collision Logic

Figure 9A:
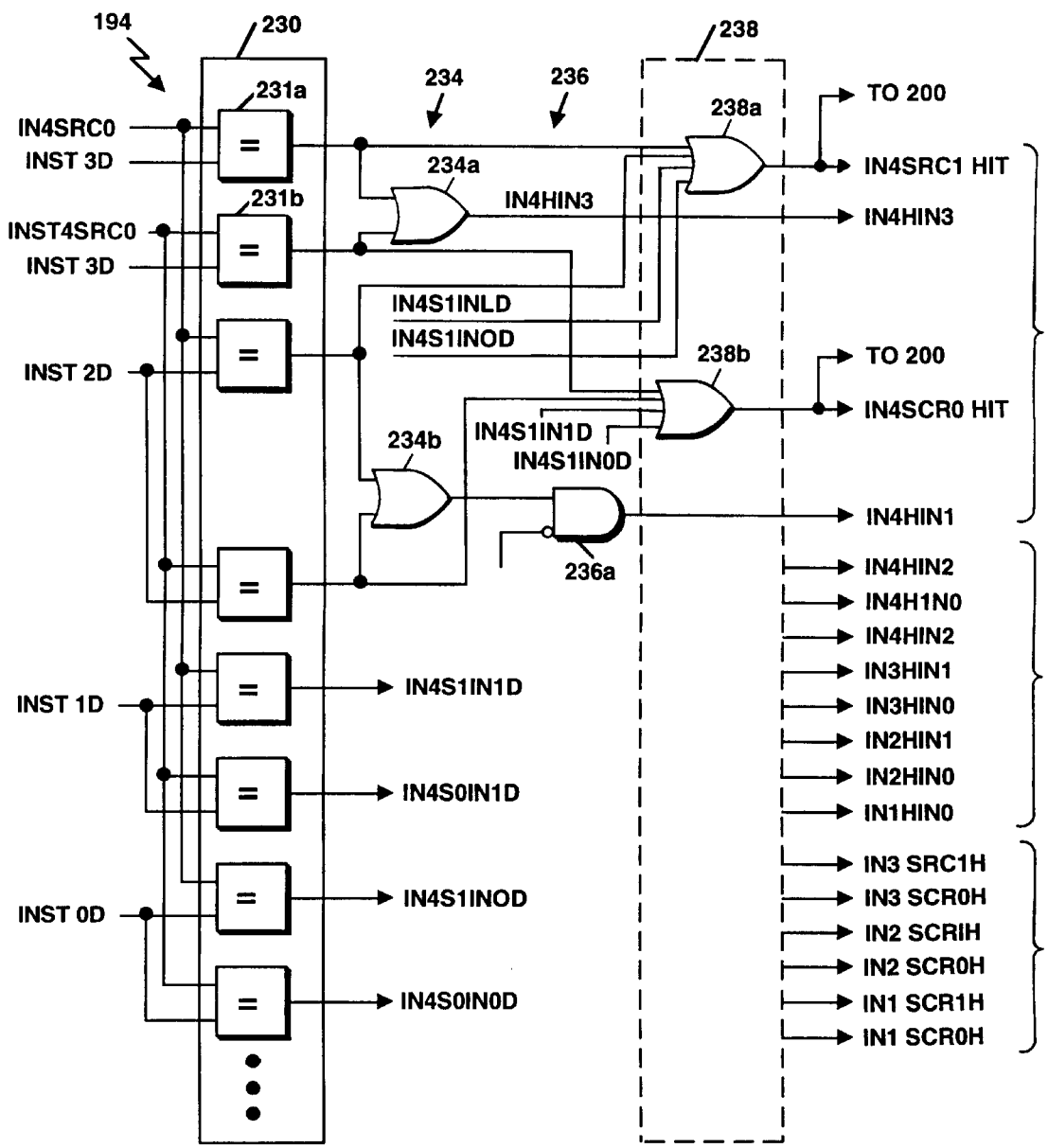
FIGS. 9A–9D are block diagrams of a collision logic circuit used in the issue cycle logic circuit of FIG. 8A.
Figure 9B:
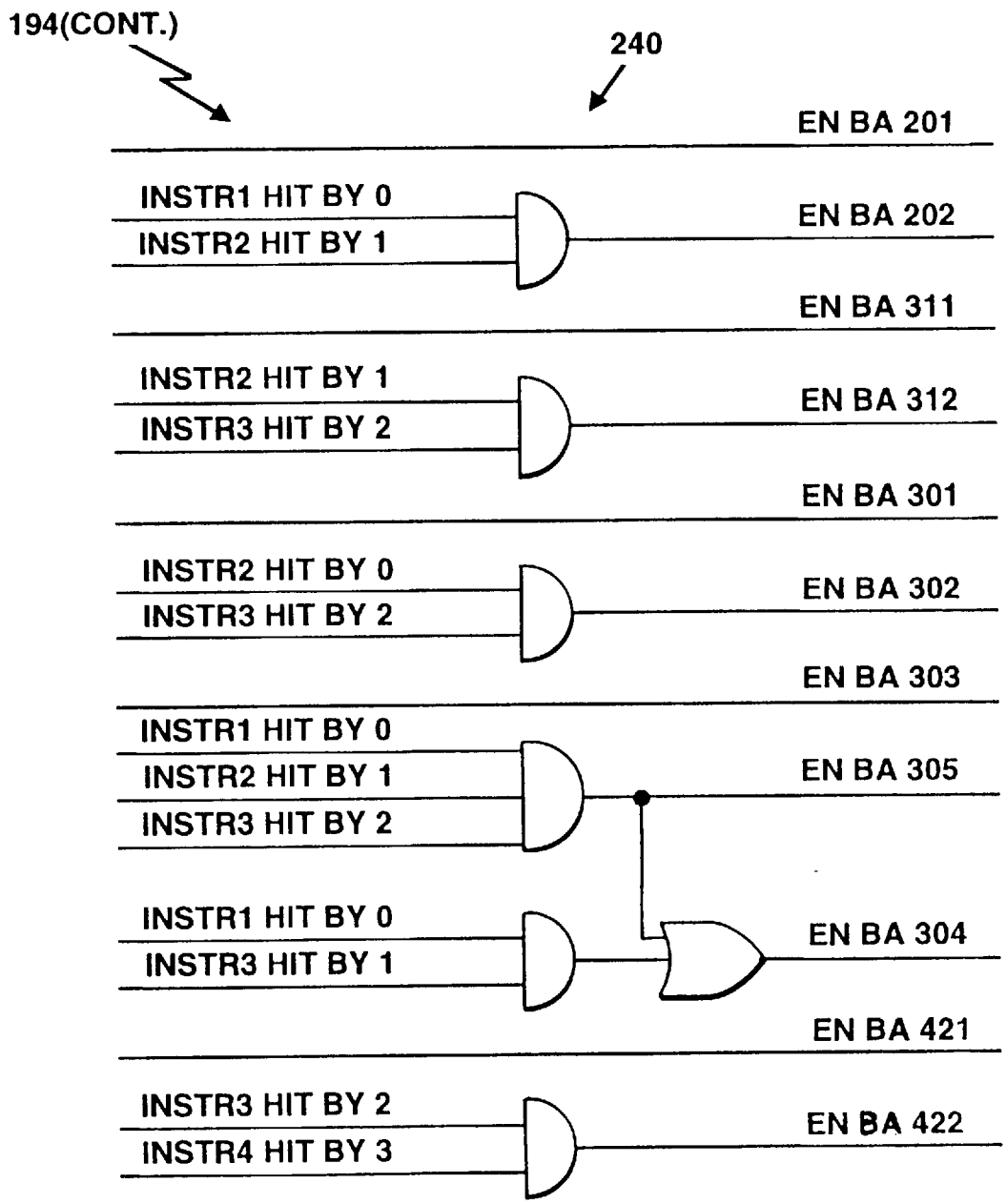
Figure 9C:
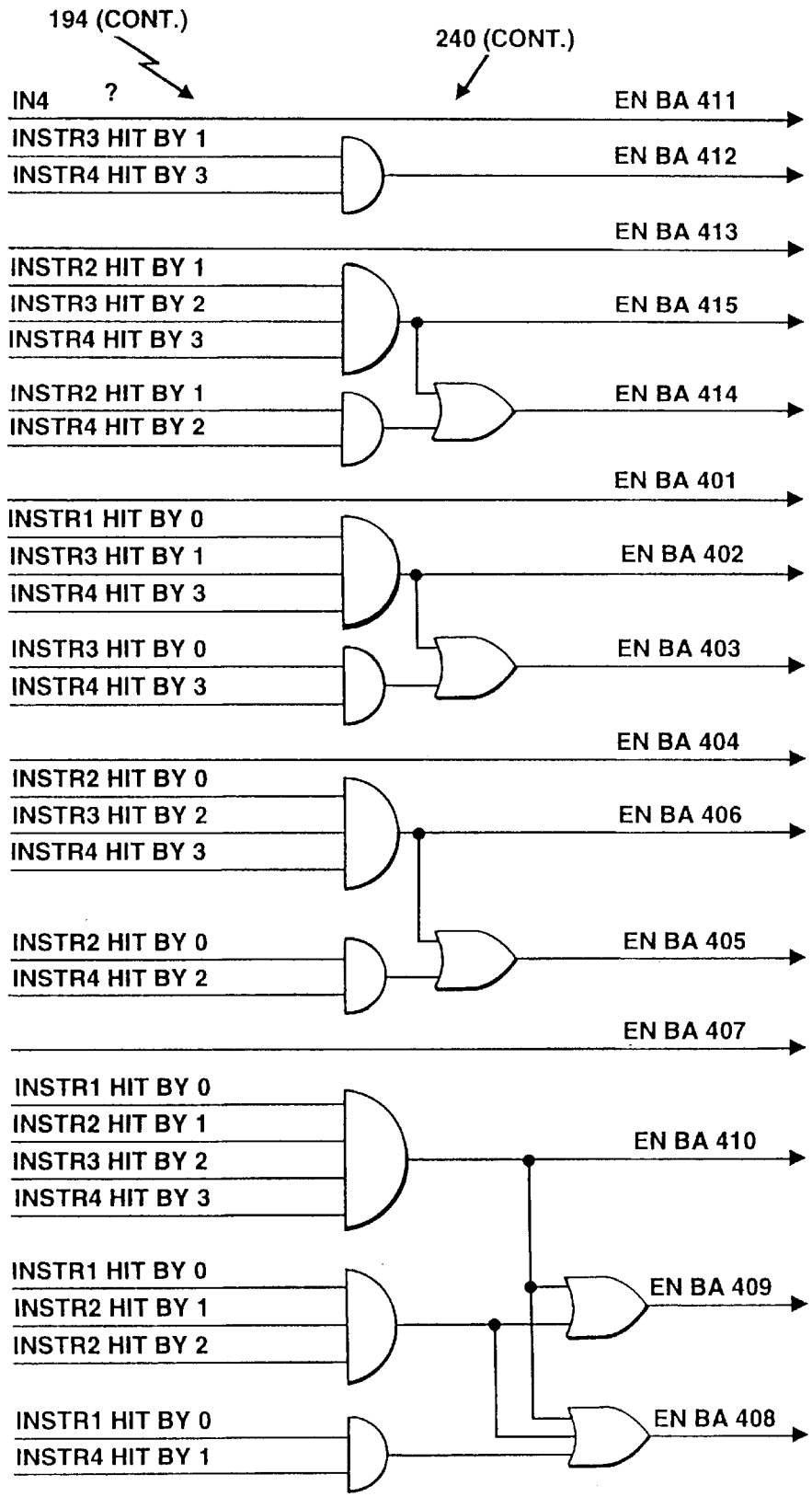

Referring now to FIG. 9A, an example of the collision circuit 194 as used in the issue logic circuit 190 (FIG. 8A) is shown to include a bank 230 of comparators 231a, 231b, and so forth here each of the said comparators being fed by the address of the source and destination registers of each of selected one of the instructions IN4–IN0. The comparators 231a, 231b, are used to determine whether a source register operand for one instruction is the same as a destination operand for a logically preceding instruction as illustrated in conjunction with comparator 231a. A comparison is provided for each instruction source register operand, i.e. source operand 1 and source operand 0 (SRC1, SRC0). In the present example, the source operands for instruction 4 are compared with the destination operand for instruction 3 via comparators 231a, 231b. If either one of the comparators indicates that an instruction destination register will write either one of the two source destination operands of instruction 4 a "one" is asserted by the respective one of the comparators 231a, 231b and a "one" is provided on line IN4H_IN3 via a OR gate 234a that is part of a logic network 234 used to ascertain the instruction hit signals. If signal IN4H_IN3 is asserted true, this indicates that instruction 3 will hit instruction 4 or conversely that instruction 4 can not execute before instruction 3 has executed. A similar arrangement is thus provided with all of the other remaining instructions.

In general, the comparator bank will include here some 26 comparators to ascertain whether an instruction M will be hit by any of the preceding instructions. The remainder of the logic is not shown in 9A for the sake of clarity but it would be similarity provided as shown for the logic of instruction 4 (which is the most complex case). Moreover, the outputs from each of the comparators are also tested in a OR gate 238a to ascertain whether for the particular instruction either of the source register operands is hit by any of the preceding instructions (ie has the same as destination register operand). These signals in FIG. 9A are fed respectively as needed and indicated to the logic circuits on FIGS. 9B and 9C to form enable signals ENBAxy where x refers to the instruction number and y is a two digit reference to an enable input to a sum circuit 196. These enable signals are used in the latency adder circuit of the issue cycle logic circuit 190 to control issuance of instructions as mentioned above.

Figure 9D:
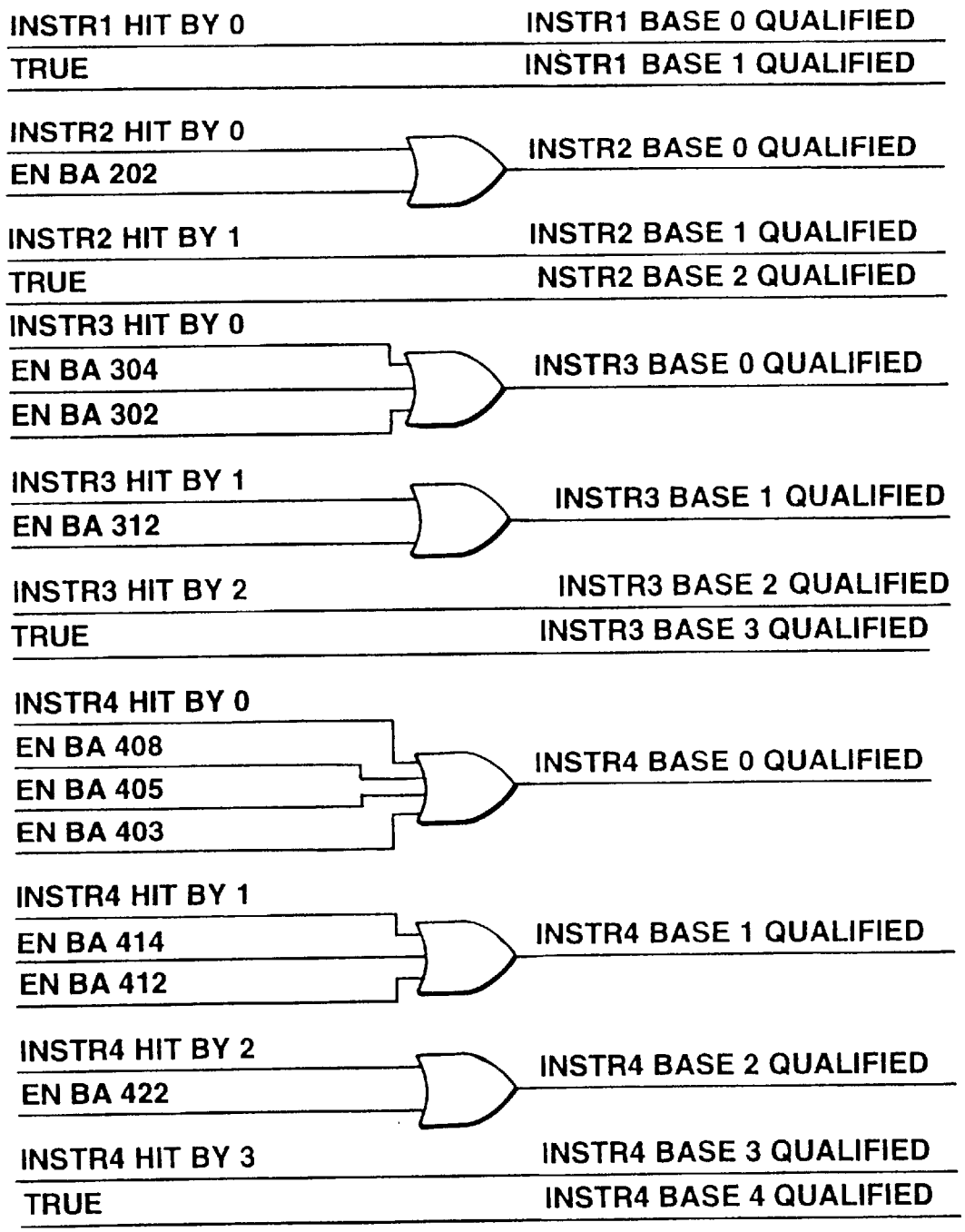

As shown in FIG. 9D, the instruction hit signals and enable signals are logically combined to provide signals indicating which base numbers of each instruction are qualified base numbers. These signals are used by compare circuit 210.

Latency Adder

Figure 10:
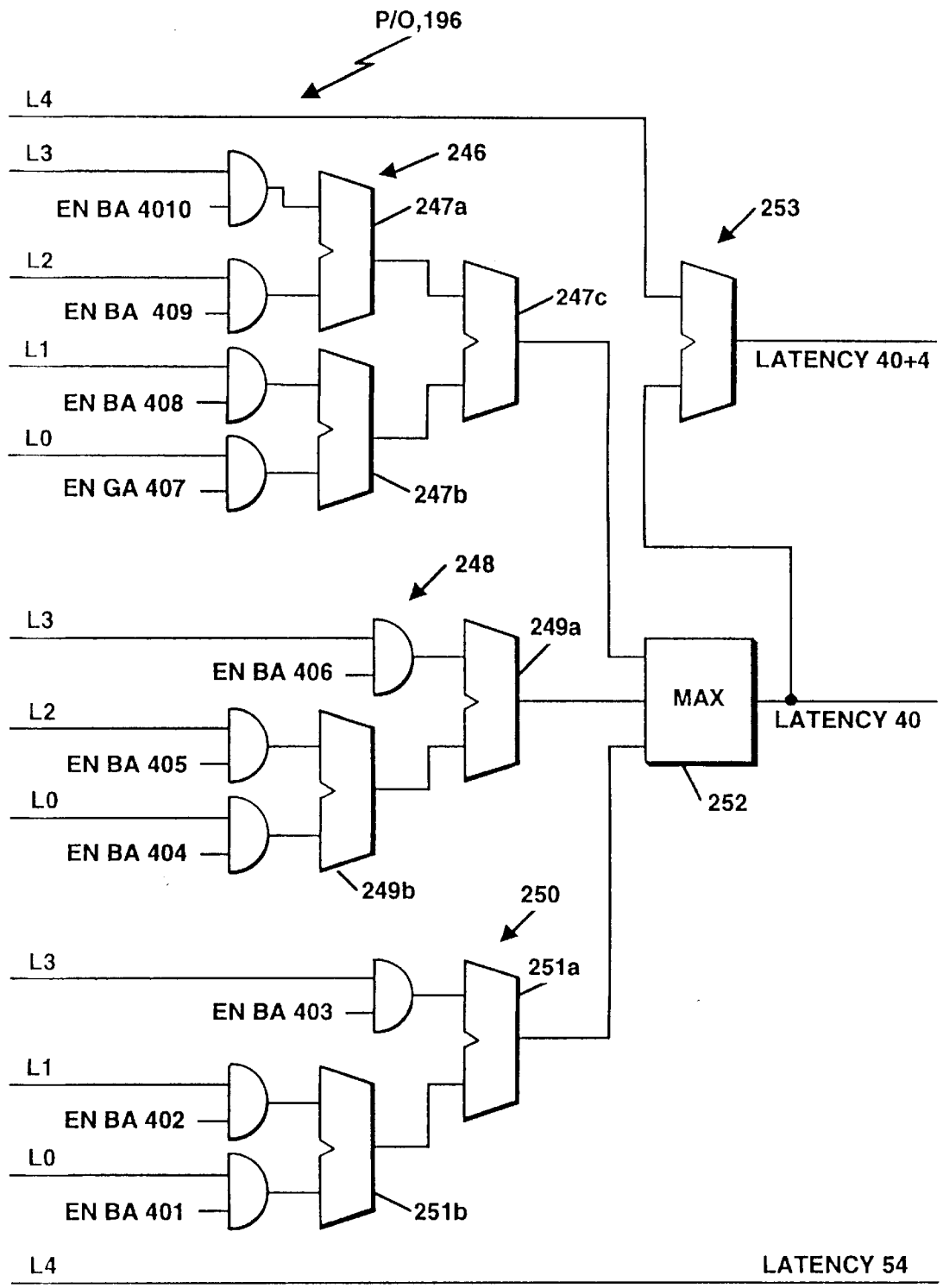
FIG. 10 is a block diagram of a typical latency adder circuit used in the issue cycle logic circuit of FIG. 8A.

Referring now to FIG. 10, a latency adder circuit 245 used to provide the latency for the instruction I4 for base I0 instruction sequence. The adder circuit 245 is exemplary of several like adders and has as inputs each instruction and possible base number in the circuit 196. The adder circuit 245 is shown to include here three adder networks 246, 248, and 250 each having adders 247a–247c, 249a–249b and 251a–251b respectively, as shown, to provide selected sums of the latencies, here L0, L1, L2, L3; L0, L2, L3; L0, L1, L3;. These latencies are tested in a circuit 252 which selects the maximum one of said latencies and adds it to the latency of L4 to provide a single latency (40+4) ie. the latency of instruction 4, base number zero, plus the latency L4 . Moreover, latency 40+4 is provided directly from latency L4 and latency 40 via the output of the max circuit 252. At adder 253, the latency 40+4 is determined. This latency is the cycle when the result of instruction 4 is ready. If this is the correct cycle number as determined above, then this latency 40+4 is written to the ready store 198 (FIG. 8B) via register 199b and adder 202.

Circuit 245 is part of the latency summer 196 and illustrates one of the roles of the enable bits from the collision circuit 194. Thus the collision circuit 194 will enable latencies L3, L2, L1, L0 in the respective networks 246–250 if there is a collision case involving the instructions represented by the said enable bits. Similar networks are provided for each of the remaining instructions but are not shown here for the sake of clarity. Suffice it here to say, however, that I4 base "0" adder being the most complex adequately illustrates the logical function of the remainder of the circuits. For example the sums of latencies that might be needed to add to B0 to provide the issue cycle number of instruction 4 are set forth in TABLE V.

TABLE V

| Group | sums of latencies |
|---|---|
| Group 1 | L0 + L1 + L2 + L3 |
| | L0 + L1 + L2 |
| | L0 + L1 + L1 |
| | L0 + L1 |
| Group 2 | L0 + L2 + L3 |
| | L0 + L2 |
| Group 3 | L0 + L1 + L3 |
| | L0 + L3 |

Each of the possible 8 needed sums are in a group. Within a group the highest line is always the largest thus the highest line enabled is the largest in a group and thus only sums between groups need to be compared to select the largest.

Each of the latencies determined in accordance with the instruction latency adder circuits are added to the earliest possible cycle number for the particular instructions as well as the base numbers BN0, BN1, to provide all the possible combinations of the base numbers, as explained above. Each of these base numbers is then fed to magnitude comparator circuits illustratively the comparator circuit 200 (FIG. 8A) and the base instruction number is selected based upon which of BN0, BN1, and earliest possible cycle numbers are the largest. Signals provided by the "Ready already" bit and the instruction source hit signals are also supplied to the comparator indicating whether the particular instructions BN0, and BN1 are valid or invalid.

Magnitude Comparators

Figure 11:
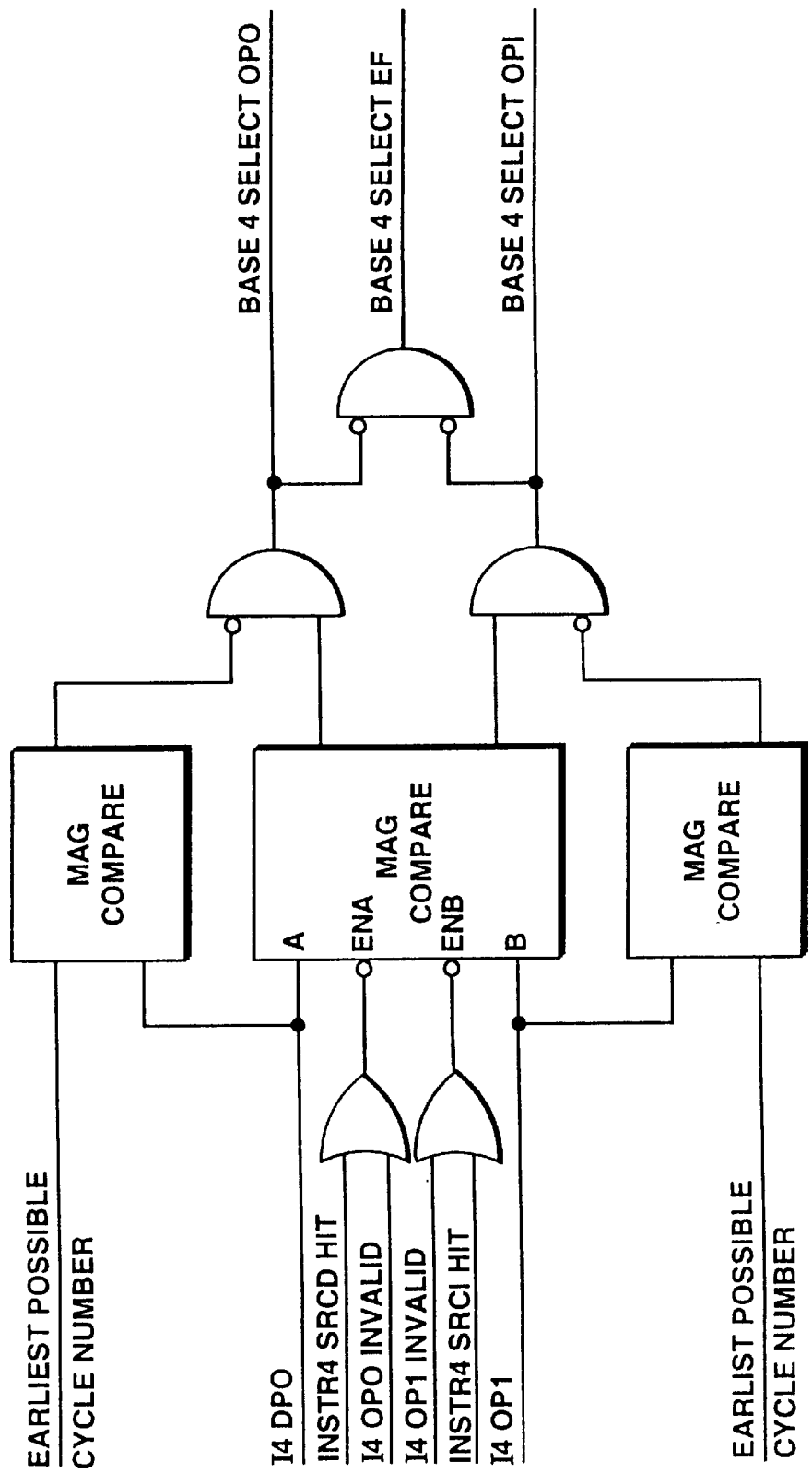
FIG. 11 is a block diagram of an illustrative compare circuit used in the issue cycle logic circuit of FIG. 8A.

In particular as shown in FIG. 11, magnitude comparators 272, 274, 276 are provided. Magnitude comparators 272 and 276 are used to compare Earliest Possible cycle No. with instruction 4 source operand 0 and 1 respectively. Comparator 274 compares instruction 4 source operands 0 and 1 to determine the largest only if such a comparison is enable by signals I4OP0 invalid and I4OP1 invalid (ie. the respective ready already bits) and INST4 SRC0 Hit and INST4 SRC1 Hit, from collision logic 194. The gating after the comparators is used to select the earliest possible cycle number if it is largest or both of the other numbers are rejected.

Exemplary one of the circuits is shown in FIG. 11 for instruction 4 and correspondingly similar circuits are provided for each of the remaining instructions. Similarly, each one of the "select base number" select signals from the output of the comparator are provided for each one of the instructions, thus totaling 15 enable signals. These signals are fed to multiplexer 203b and are used to select the instruction base Y from either the instruction base earliest possible cycle, BY0, or BY1 choices provided to the multiplexer 203b. A similar multiplexer arrangement is provided for each one of the instructions to choose between the instruction base number BY0 and BY1, and the earliest possible cycle number.

Multiplexers

Figure 12:
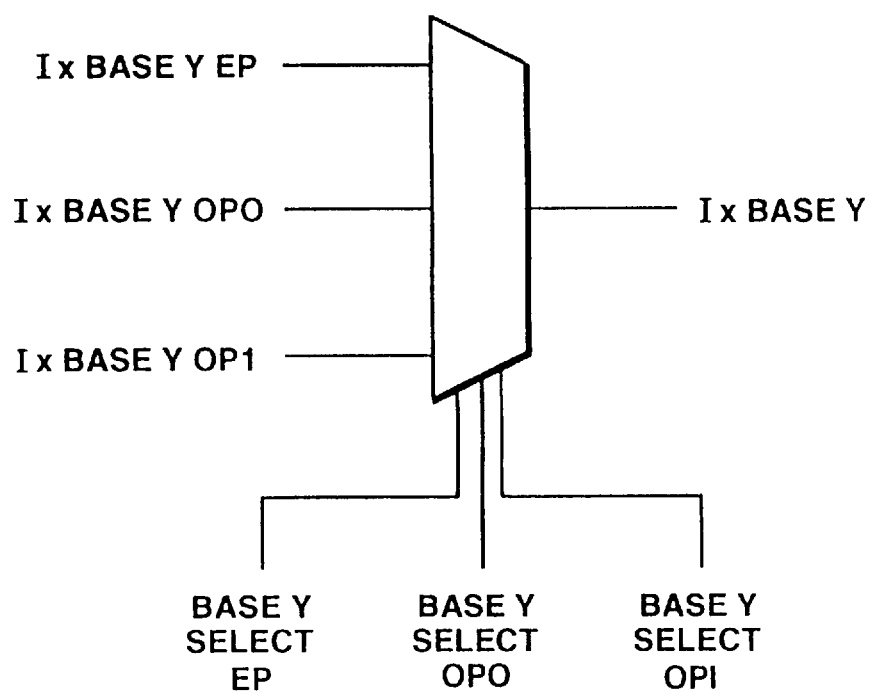
FIG. 12 is a block diagram of a first multiplexer used in the is cycle logic circuit of FIG. 8A.

As shown in FIG. 12, multiplexer 203b is used to select between the maximum of the earliest possible cycle number, and the base number operands 0 and 1 for each instruction, as shown in a simplified manner based upon select signals form compare circuit 200 (FIG. 8A).

Figure 13:
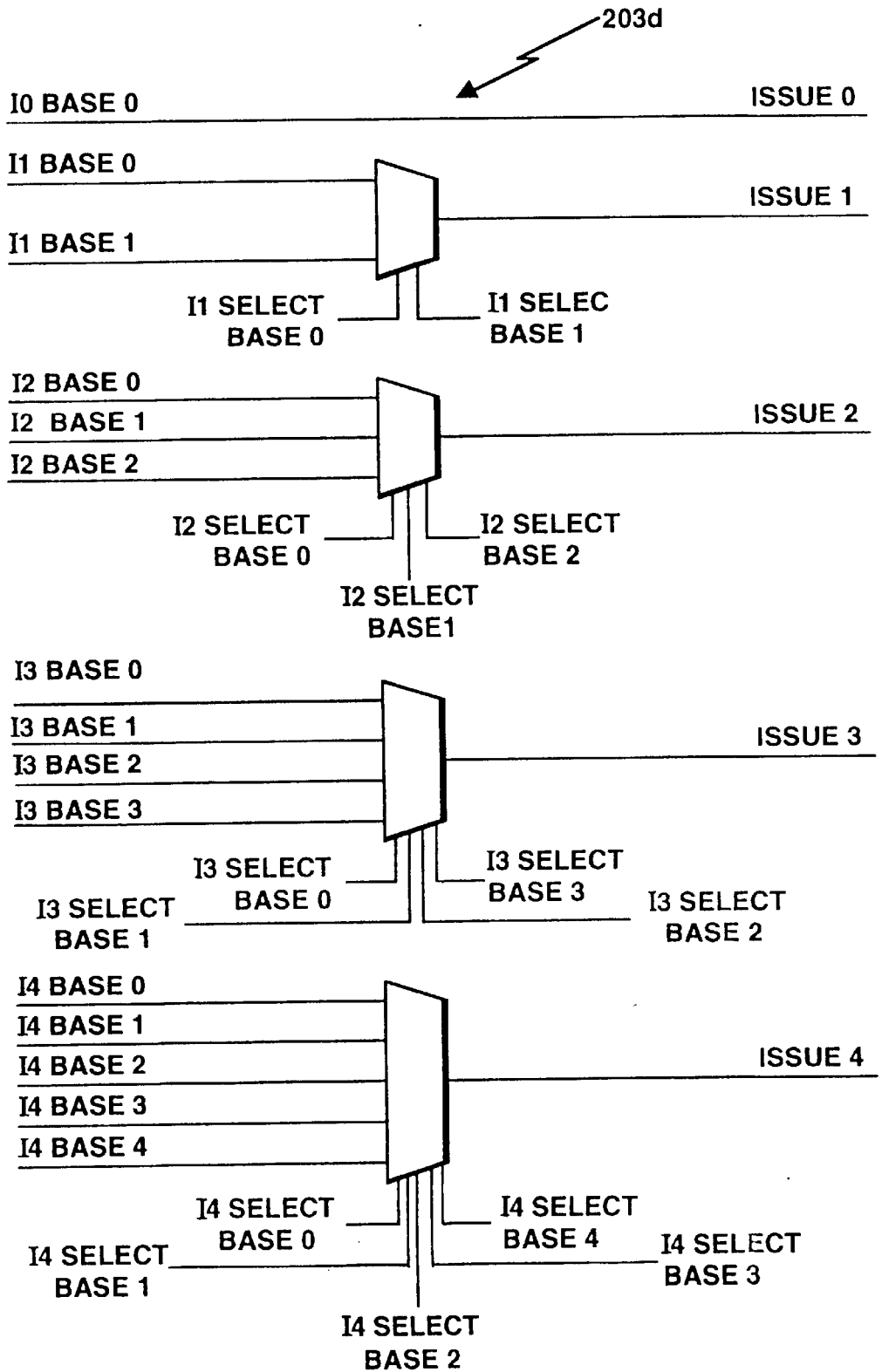
FIG. 13 is a block diagram of a second multiplexer used in the issue cycle logic circuit of FIG. 8A.

As shown in FIG. 13, multiplexer 203d is provided with select signals from comparator circuit 204, (FIG. 8A) to select the base number, in accordance with the values of the select signals provided from comparator 204. Comparator 204 is a network comprised of circuits to determine the maximum value for each instruction base number and is provide as several comparator circuits. The base number for each instruction is in accordance with the position of the instruction thus for example, instruction 0 base 0 will always be selected whereas instruction 1 base number will be either as instruction 1 base number 0 or instruction 1 base number 1. Similarly for the remaining instructions 2–4 the instructions will be selected based on base numbers 0–2 for instruction 2, 0–3 for instruction 3, and 0–4 for instruction 4.

Branch Prediction

Figure 14:
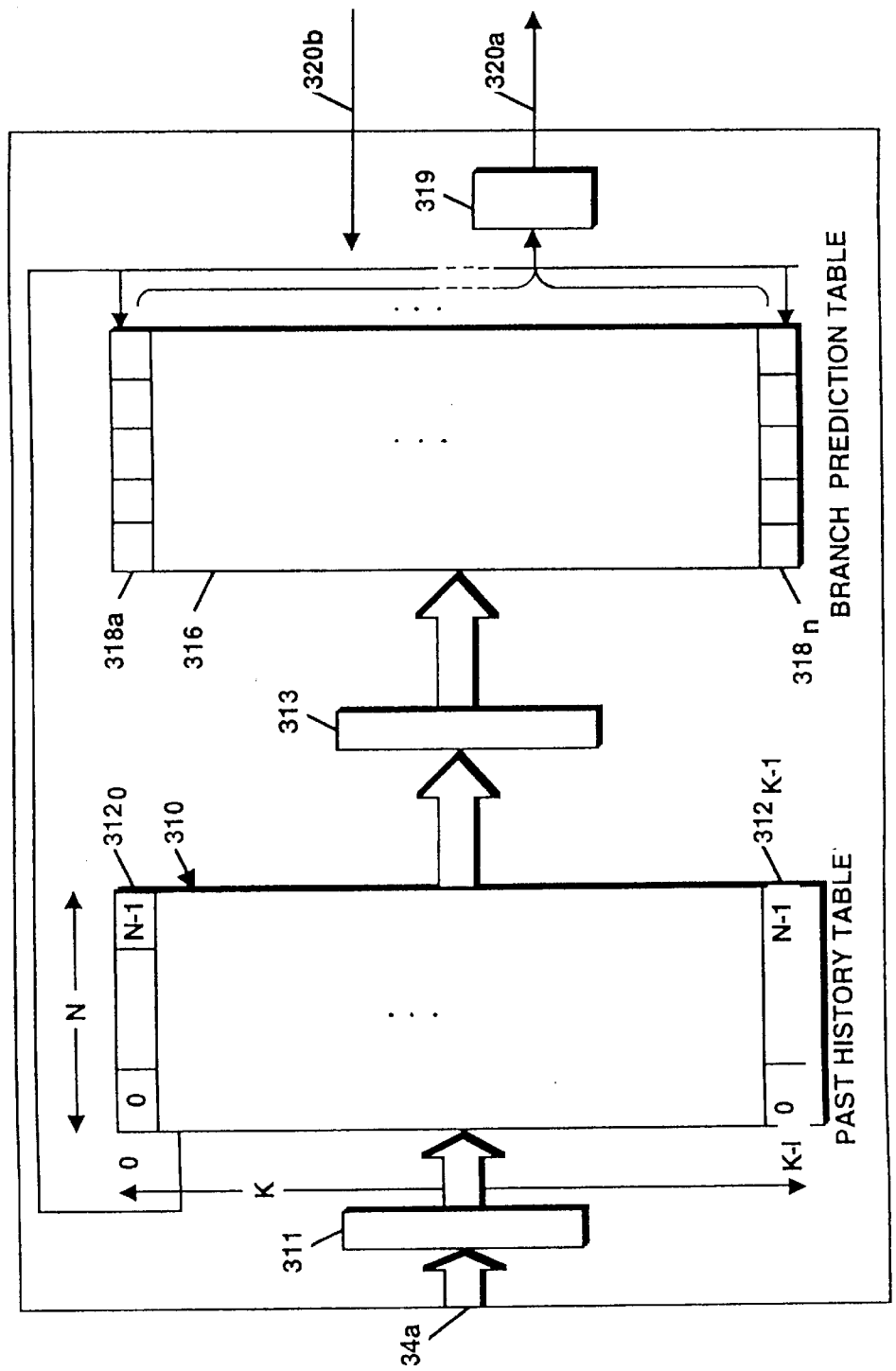
FIG. 14 is a block diagram of a first embodiment of a branch prediction circuit used in the CPU of FIG. 2.

Referring now to FIG. 14, a branch prediction store circuit 152 is shown to include a register file 310 comprised of a plurality of registers $312_0$–$312_{K-1}$. Accordingly there are K number of registers in the register file 310. Here a typical value for K is 2048 register. Each one of the registers are N-bit here right shifting shift registers. Each one of the registers 3120–312K-1 are N bits wide with bit 0 occupying the least significant bit position and bit N-1 occupying the most significant bit position.

The register file 310 is fed at an input thereof via the output line 35a from the Buffer 35 (FIG. 2) optionally the instruction is stored or latched in a storage register 311. Partial decoding is provided (via logic not shown) to ascertain whether the instruction is a branch type instruction. Such decoding could alternatively come from the displacement adder via the ICACHE 34.

If the instruction is a branch type it is loaded in the register 311. The contents of the register 311 that is the particular instruction loaded via lines 30a presents an address to the register file 310 to select a certain one of the registers $312_0$–$312_{K-1}$. The output of the register file 310 that is the selected one of the registers $312_0$–$312_{K-1}$ is fed to here a second register or latch storage means 313 which again provides an output at register 313 which is used as an address into a counter file 316 comprised of a plurality of counters 318a–318n where $n=2^N$. The outputs of each of these counters are selectively provided in accordance with the address from the register 313 to an output register 319.

In particular, here each of the counters 318a–318n are non modular M-bit wide counters here where M is equal to 5. The counters use the most significant bit as the output bit for storage in register 319 and thus the MSB of register 319 provides an indication of whether a branch should be taken i.e. when MSB equals 1 or should not be taken i.e. MSB=0 illustratively. This indication is provided on output line 34a to the branch predictor circuit 40 (FIG. 2).

The branch predictor circuit 40 checks the instruction sequence and passes the prediction, logical instruction number, and the target address on to the branch resolution circuit 42. From the branch resolution circuit 42 is provided a signal along line 320b indicating whether in fact the particular instruction at that juncture has taken the same path as predicted by the branch predictor. If the branch is taken and if the branch was correctly predicted the appropriate counter 318a–318n is incremented and a 1 is shifted into the register in table 310, into the least significant bit position of the register at the corresponding location.

Thus, table 312 is here referred to as a branch prediction history table in which the N previous occurrences of that particular instruction and the result of whether a branch was taken or not taken are recorded in the table 310 for each one of the particular instructions.

On the other hand the table 316 is a branch prediction table which is used to provide a certain granularity to the branch prediction. That is, since a non-modulo counter is used an addressable entry to each one of the entries in the table 316, the most recent occurrence of the instruction is given only partial weight in determining whether the instruction will branch or not branch the next time that location and hence that instruction is encountered.

In particular, the counters 318a–318b are up/down counters and moreover, are nonwrap around counters that is when the counter reaches a state 11111 or 00000 the counter is not incremented to the next modulo state that is the counter will remain in the particular aforementioned state and would only be decremented to the next lower state or incremented to the next higher state respectively.

Accordingly, this technique of branch prediction, examines the history of the previous N number of branches as provided from the past history table and the contents of the associated counter for the particular instruction, to provided a prediction on the behavior of the current branch type of instruction.

This technique will provide a higher accuracy than prior approaches since the technique uses two tables to determine branch history information and to make branch predictions. The first table, the history of the branch prediction or branch prediction table 310 is used to determine what happened during the actual last N number of branches. Whereas the second table, the branch prediction table 316 is used to ascertain a particular branch behavior of the particular pattern provided from the branch history table 312.

Recalling for the moment that the branch prediction history table provides an address entry via register 313 to the branch prediction table, the address entry is a specific pattern associated with a particular instruction. For the particular pattern (from the appropriate register in table 312) a more trained guess can be provided by the appropriate counter in branch prediction table 318. Accordingly, for the same instruction a different pattern may be provided based upon the recent past history of the instruction. This different pattern is used as a different address to the branch prediction table to obtain a different counter which will contain possibly a different count pattern to ascertain whether a branch should be taken or not taken.

Figure 15:
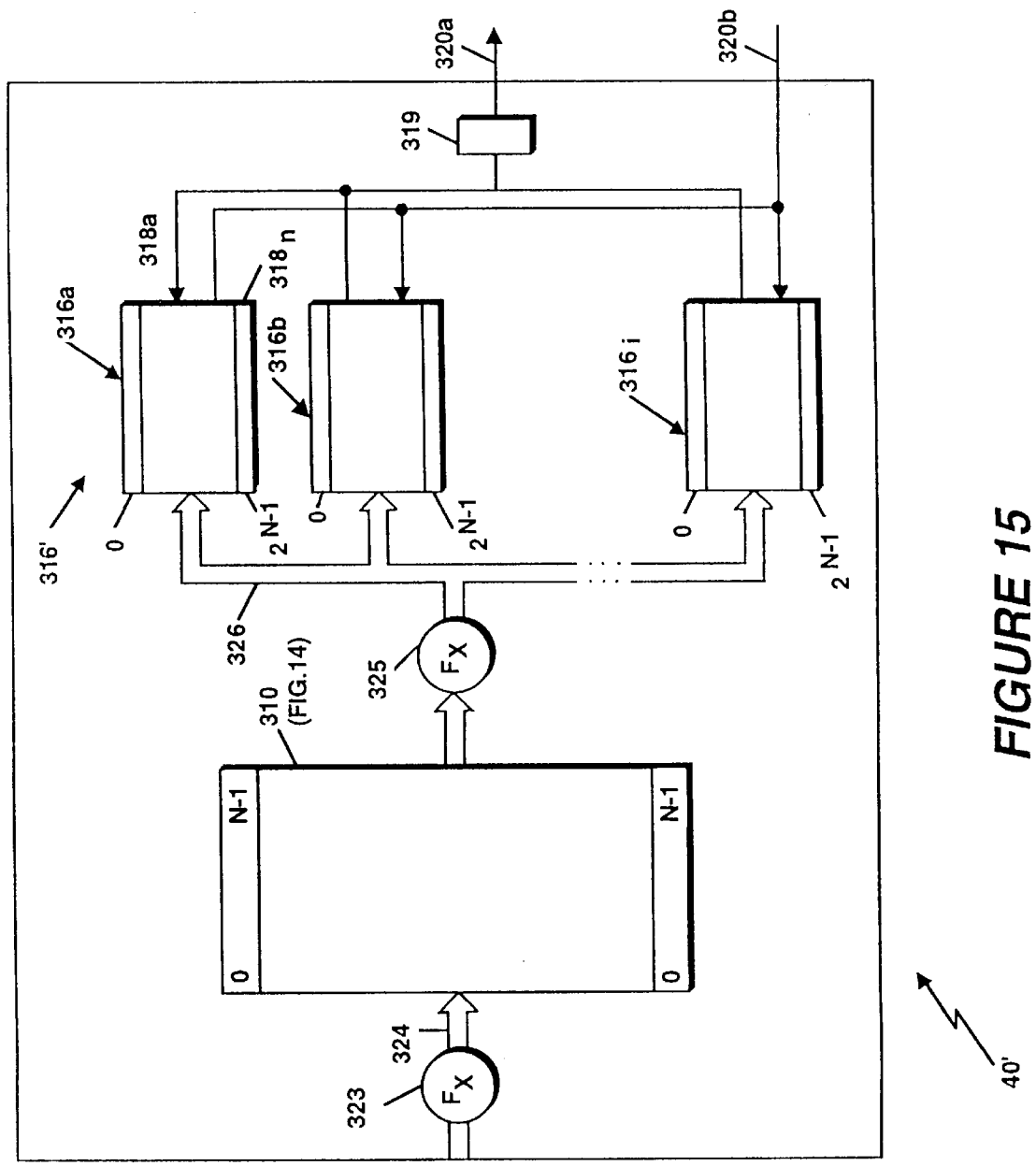
FIG. 15 is a block diagram of an alternate embodiment of a branch prediction circuit used in the CPU of FIG. 2.

Referring now to FIG. 15, a branch prediction circuit 40' is shown to include the register file 310 comprised of the plurality of registers $312_0$–$312_{K-1}$, again with K number of registers in the register file 310. Each one of the registers are right shifting shift registers as mentioned above. Each one of the registers 312₀-312K-1 are N bits wide with bit 0 occupying the least significant bit position and bit N-1 occupying the most significant bit position. The register file 310 is fed at an input thereof via a logic network 323 which can be any appropriate so called "Hashing Function". The logic circuit 323 can have a register (not shown) to store the results of the logic manipulation of the instruction from the ICACHE 34. The output from the Hashing function circuit 323 presents an address to the register file 310 to select a certain one of the registers $312_0$–$312_{K-1}$.

The logic circuit 323 can for example be used to preprocess the address of the instruction to more evenly distribute entries in the table 312. In so called "super scalar" machines, where multiple instructions are executed at one time in multiple execution boxes the 2 LSB's of the instruction address can be "exclusive orred" with higher order bits of the instruction address. This will more evenly distribute accesses throughout the table.

The output of the register file 310 that is the selected one of the registers $312_0$–$312_{K-1}$ is fed to here a second "Hashing Function" circuit 325 which provides a second logical manipulation to data at the output of the past history table 310. Here circuit 325 is used to concatenate bits from the address of the instruction with the output from the past history table 310. These bits are used as an index to select one of a plurality of branch prediction subtables 316a to 316i of the branch prediction table 316'. Each of the subtables 316a to 316i is comprised of a plurality of counters 318a–318n where n=$2^N$ as branch prediction table 316 (FIG. 14). The output of a selected one of the counters in a selected one of the subtables 316a to 316i is determined in accordance with the bit pattern from the past history table to select one of said counters 318a–318n and the bit pattern for the past history table and concatenated bits from the program counter are used to select the particular subtable 316a to 316i.

In particular, here each of the counters 318a–318n are non-modulo M-bit wide counters here where M is equal to 5. The counters use the most significant bit as the output bit for storage in register 319 and thus the MSB of register 319 provides an indication of whether a branch should be taken i.e. when MSB equals 1 or should not be taken (i.e. MSB=0) illustratively. This indication is provided on output line 320a to the branch prediction circuit 40 (FIG. 2) and thus onto the branch resolution circuit 42.

From the branch resolution circuit 42 is provided a signal along line 320b indicating whether in fact the particular instruction at that juncture has taken the branch. If the branch is taken and if the branch was correctly predicted the appropriate counter 318a–318n in the particular subtable 316a to 316i is incremented and a "1" is shifted into the register in table 310.

As before the branch prediction history table 310 stores the N previous occurrences of that particular instruction and the result of whether a branch was taken or not taken.

On the other hand the table 316' is a branch prediction table comprised of a plurality of subtables 316a to 316i which is used to provide a certain granularity to the branch prediction that is since a non-modulo counter is used the most recent occurrence of the instruction is given only partial weight in determining whether the instruction will branch or not branch. As above, the counters 318a–318i are up/down counters and moreover, are nonwrap around counters that is when the counter reaches a state 11111 or 00000 the counter is not incremented to the next modulo state. Rather the counter will remain in the particular aforementioned state and would only be incremented to the next lower or next higher state, respectively.

The plurality of branch prediction tables permits the branch predictor 40' to provide different predictions for the same past history of different instructions.

It is believed that this technique will provide higher accuracy, since the technique uses two tables to determine branch history information to make predictions. The first table, the history of the branch prediction or branch prediction table 310 is used to determine what happened during the actual last N number of branches. Whereas the second table, the branch prediction table is used to ascertain a particular branch behavior for the particular pattern. Recalling for the moment that the branch prediction history table provides an address entry via register 313 to the branch prediction table.

Figure 16:
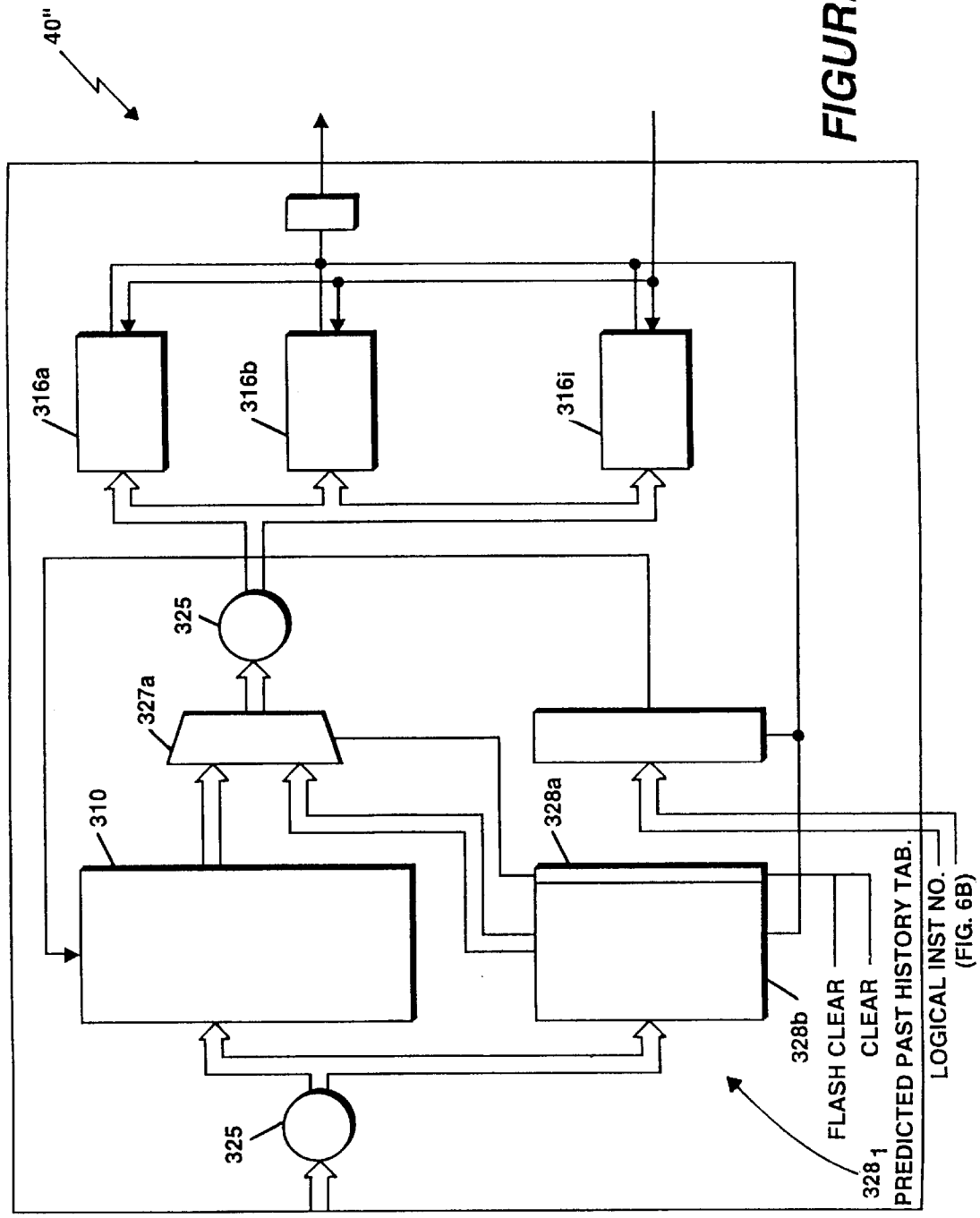
FIG. 16 is a block diagram of a still further alternate embodiment of a branch prediction circuit used in the CPU of FIG. 2.

Referring now to FIG. 16, a branch prediction circuit 40' is shown to include the register file 310 comprised of a plurality of registers $312_0$–$312_{K-1}$ providing the past history table as in FIG. 14 and FIG. 15, the counter file 316' including a plurality of subtables 316a–3 16i as discussed in conjunction with FIG. 15 as illustrated here. (Alternatively, the branch prediction table 316 of FIG. 14 can be used.) The branch prediction circuit 40" also includes the Hashing Function circuits 323 and 325 as in FIG. 15.

The branch prediction circuit 40" further includes a predicted past history table 328. The predicted past history table includes a valid bit field 328a and a past history branch field 328b. The predicted past history table 328 includes a plurality of locations for each of the aforemention fields typically equal to the number of registers in past history table 310. Alternatively, the predicted past history table could be fully associative. That is, the address on bus 324 is compared to the address in each location in table 328 to find the correct entry for 328.

The branch prediction circuit 310" further includes a second table 340 here having a single bit for each entry here referred to as a prediction bit field 340a. This table is indexed via a logical instruction number and is a one bit history of the predicted direction of the branch instruction. During a prediction, look ups in both of the past history and predicted past history tables 316, 328 are made. The valid bit 328a in the predicted past history table 328 is a signal used as a MUX select for MUX 327a. This bit thus controls which past history is passed on to the hashing function 325 and thus onto the branch prediction table 316.

In a machine of the type discussed above, the number of instruction cycles from when a branch prediction is made and the time when the true direction is known could take many cycles in which case many other branch predictions could have been made even concerning the particular instruction. This is particularly true when the branch prediction includes a loop. To provide the best prediction, the second instance of the branch prediction on the same branch should use a past history for that branch that includes a history of the first instance as if it had already completed and the truth concerning the prediction is known. Since the machine is reordering instructions, the completion of branches is performed out of original order. This presents a problem since it is possible that branches which should not execute before an earlier branch has completed will complete execution.

Accordingly, after making a prediction, the prediction direction is shifted into the corresponding entry in the predicted past history table 328 and the valid bit 328a of that entry is turned on. The predicted direction is also stored into the one bit wide table 340 under the entry indexed by the logical instruction number. During a restart operation, all of the valid bits are flashed cleared whereas, after a retirement of a correctly predicted branch, its logical instruction number indexes table 340 to provide the correct predicted direction table 340 which is the value applied to the past history table 310 and the corresponding branch prediction counter.

The outputs of Mux 327a are provided to the branch prediction table 316' via the hash function 325 (or 316 FIG. 14). The data acts as an address to one of the subtables 316a to 316i.

The branch resolution table 42 (FIG. 2),is fed the predicted direction provided from the branch prediction table 316 (FIGS. 14–16) the logical instruction number from the instruction scheduler 38 and the corresponding contents of the branch target program counter in the branch prediction circuit 40. The branch resolution circuit 42 (FIG. 17) stores these data for each branch type of instruction. For all other unconditional transfers of control, the branch resolution circuit 42 stores the logical instruction number and the branch target address from the program counter.

Figure 17:
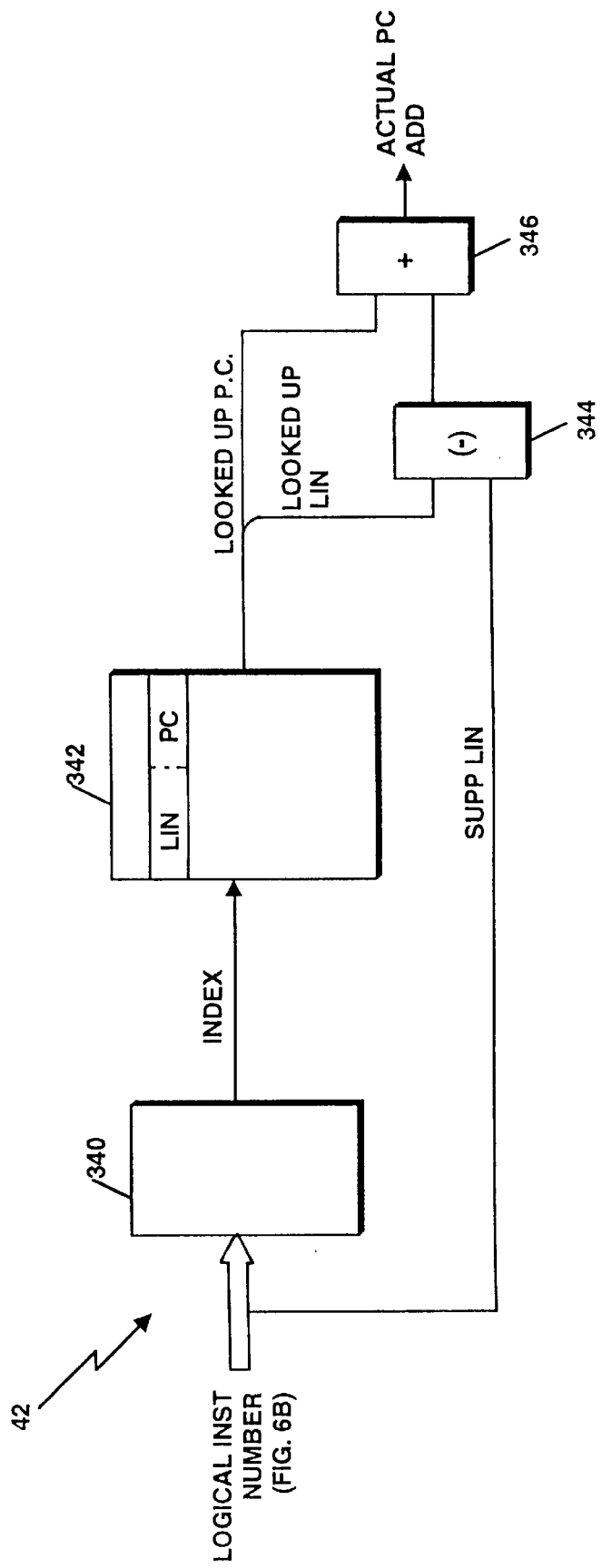
FIG. 17 is a block diagram of a portion of a branch resolution circuit used in the CPU of FIG. 2.

Referring now to FIG. 17, in order to resolve a branch problem ie. misprediction, the branch resolution circuit 42 provides the program counter address of any particular instruction to determine the address at which the particular instruction is stored in memory. The branch resolution circuit 42 thus further includes, a new PC table 342 in which each "taken" branch has the address of the branch stored in the table 342 and an index store. The new PC table is filled sequentially in logical instruction order which is the order in which information arrives at the branch resolution circuit 42. Old entries that are no longer needed are written over. Each entry in the New PC table contains the logical instruction number of the instruction stream altering instruction and the new pc value that the instruction is predicted to go to. The logical instruction number of an instruction is exactly the location in the logical instruction index table assigned to the instruction. In this location is placed the index in the New PC table 340 of the last preceding transfer of control.

Thus, the branch resolution circuit 42 can produce the PC of any instruction from the supplied logical instruction number by using the supplied logical instruction number to address the logical instruction index table 340. The resulting index is used as the address for a lookup in the New PC table which provides the looked up logical instruction number and the PC value of the last preceding transfer of control. The difference between the supplied logical instruction number and the looked up logical instruction number is determined and, to this difference is added the looked up PC value to provide the correct or actual PC (program counter value).

Replay Buffer

Figure 18:
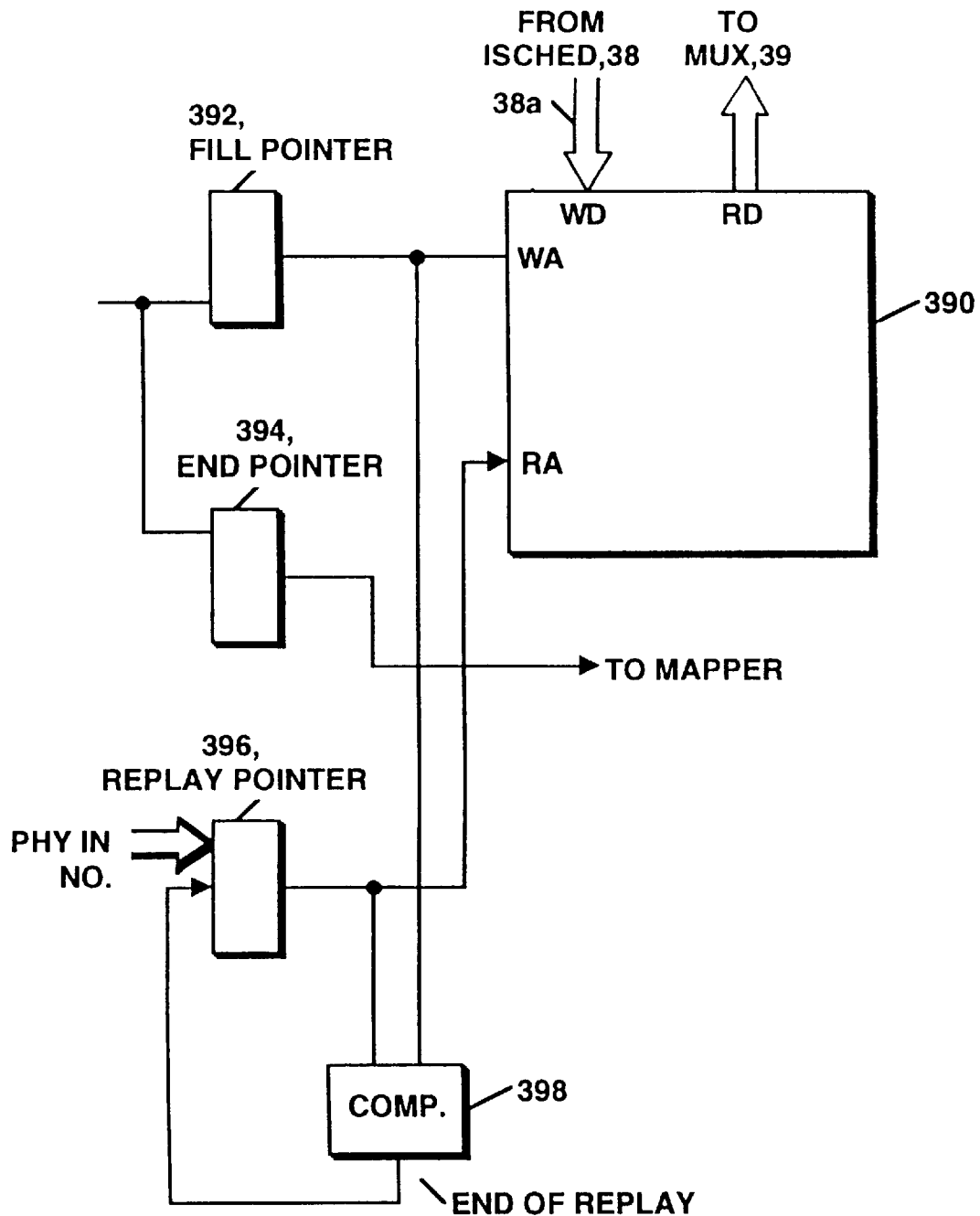
FIG. 18 is a block diagram of a replay buffer used in the CPU of FIG. 2.

Referring now to FIG. 18 a replay buffer 44 is shown to include a register store 390 containing a mirror of the instructions issued from the ISCHED 38 in exact order and containing the reassigned register fields provided by the IMAP 34. The store is addressed via a fill pointer 392. The replay buffer further includes an end pointer 394 used to indicate the address of instructions which are past the latest trap time. This address is used to read the replay buffer to obtain the tag and the tag is sent to the logical instruction log in the mapper. A replay pointer 396 is used to provide a read address to the replay buffer store 390 by loading via a physical instruction log (not shown) a physical instruction number to fetch out instructions from read port 390a to feed onto the MUX 39 (FIG. 2). The buffer further includes a comparator circuit 398 which compares the read address from pointer 392 and the replay pointer 396 to provide an indication of the end of a replay.

As each instruction is written into the replay buffer 44 the location in the replay buffer that holds it is associated with the instruction, and travels with it through out the IBOX, CBOX, and EBOX. The EBOX or CBOX may need a replay for various reasons. When this occurs, the EBOX or CBOX reports the Replay buffer location to start the replay. This value is loaded into the replay pointer.

Write Buffer

Figure 19:
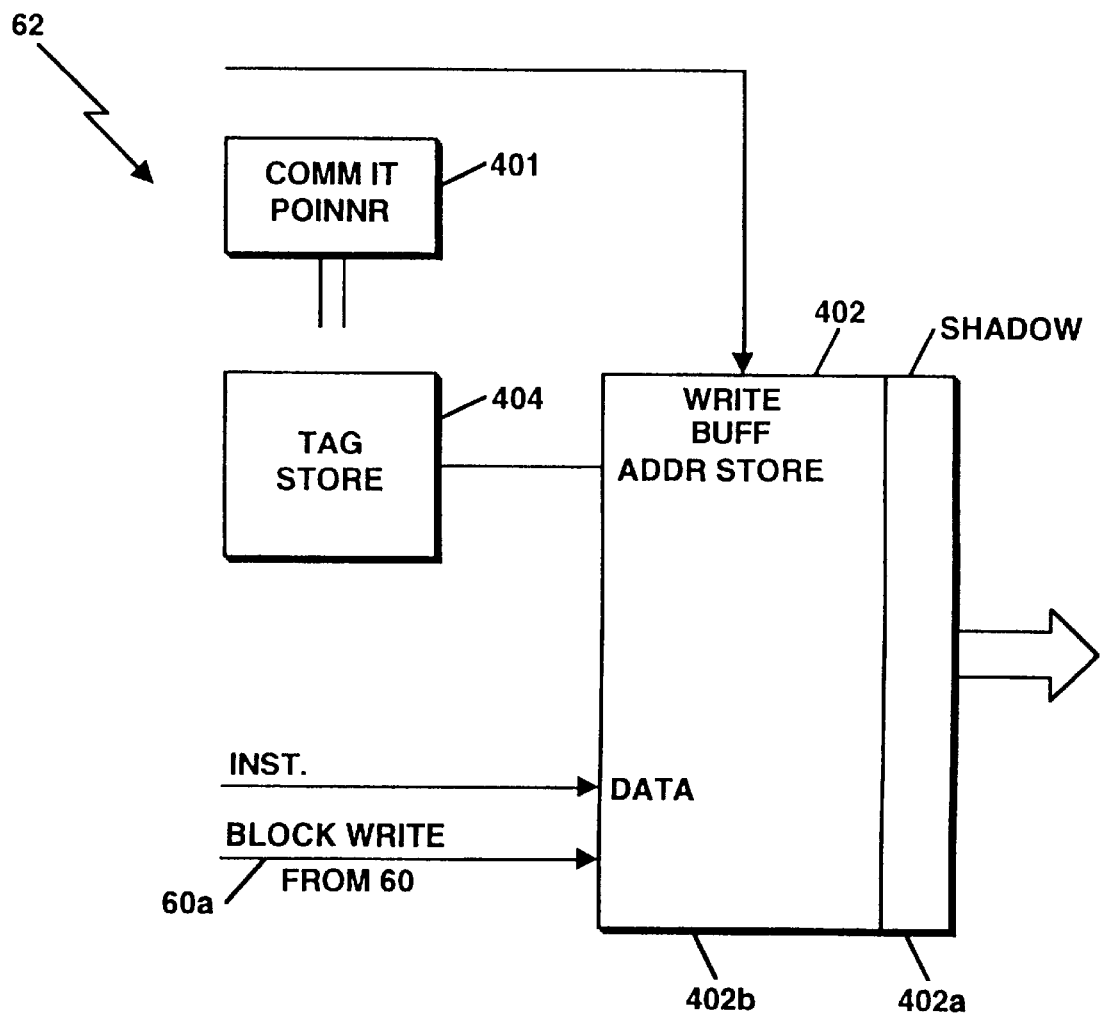
FIG. 19 is a block diagram of a write buffer used in the CPU of FIG. 2.

Referring now to FIG. 19, the write buffer 62 which is part of the CBOX 24 keeps track of all LOADs and STOREs performed by the machine until it has been determined that these operations have been done correctly. The STOREs are held here until it is certain that the STORE is correct. When it is determined that the stores are correct the STOREs are issued to memory (effectively) in logical order.

The other major function of the Write Buffer 62 is to check for out of order LOADs and STOREs. For each STORE that arrives, the Write buffer has logic circuits (not shown) that searches all logically following LOADs that have preceded it. If a matching physical address is found there is a STORE-LOAD ordering error. This is fixed by the write buffer requesting a restart on the load instruction. Similarly, for each LOAD that arrives the logic in the write buffer searches all logically following STOREs that have preceded it. If the physical addresses match this is another conflict that is fixed. Colliding STOREs are not a problem since they will go to memory in correct logical order. However, colliding stores can be noted by the write buffer and the tag generator 62a can provide a memory reference tag for the pair of colliding instructions.

The IBOX 20 sends an instruction tag of each LOAD or STORE, including floating point, to the C Box at the time that the instruction is issued to the E Box 22. There is then a fixed time from when the instruction tag arrives in the C Box to when the address and command will show up if it was a LOAD or STORE. The instructions arrive at he write buffer with the tags assigned to them by the mapper 36.

The Write Buffer 62 includes a storage structure 402 which is indexed by the instruction tag. Each LOAD or STORE, including Floating Point LOADs and STOREs are recorded here as they are loaded in the Write buffer 62. Each is stored by its instruction tag. LOADs and STOREs that are to be replayed are prevented from being entered into the write buffer.

The write buffer 62 is arranged by instruction tag making it an image of the Logical Instruction Number Log. The Logical Instruction Number Log (FIG. 6A ie part of the wait list) sends the write buffer 62 the number of instructions to commit each cycle. As an image of the Logical Instruction Number Log, the write buffer 62 also has "shadow bits" in field 402a. Whenever the mappers back up, the Logical Instruction Log sends the target instruction tag and shadow length. The write buffer reconstructs a duplicate of the trap shadow in the shadow bits. This can be done before the first instruction mapped after the trap could arrive. This allows the write buffer 62 to be maintained as an image of the wait list.

The shadow bits in the write buffer are set, if the entry being marked "in the shadow" is a STORE, the corresponding D Cache invalidate is generated. If a new entry is inserted in the write buffer in a location already marked "in the shadow", the corresponding D cache invalidate is generated.

In any event, instructions in the write buffer 62 are committed exactly in instruction tag order. All entries with the shadow bit on are discarded and skipped over. The result for the remaining entries is that it is also exactly in logical order. This also means that an instruction is not committed if the mappers can still back up to it.

As each entry passes a commit pointer counter 404 it is emptied and the shadow bit is turned off to prepare it for reuse since the write buffer is a circular list.

When a STORE is committed, the address and data are scheduled to be written in the second level cache 64 and third level cache 66 as soon as possible. In the meantime matches on the address are made for all cache functions to make it so that the data is already effectively in the caches for all functions. This means the data is effectively in memory. We are then done with the store.

When a Load is committed we are done with it. When a floating point STORE is committed it is moved to the FP write buffer (not shown) where it is waiting for data. As soon as notification of the data arrives, the write goes to the third level cache 66. Floating point STOREs are executed in logical order. This means that floating point STORE data will show up in the same order as the FP write buffer. The data itself goes to the third level cache 66 via lines 24b but notification is sent to the FP write buffer. When notification from the second level cache arrives that a data word was send, the next address sent to meet it in order from a floating point (FP) write buffer. When the FP write buffer fills no more FP STOREs are committed to the FP write buffer.

The write buffer 62 then fills and then we have to replay until there is room. All LOADs have to be checked against the FP write buffer. If there is a hit, the LOAD is replayed. This includes floating Point LOADs. The LOAD keeps on getting replayed until it no longer hits the FP write buffer. Each STORE that is committed from the write buffer is checked against the FP write buffer. Because everything in the FP write buffer was committed earlier, the write being compared to the FP write buffer is logically after the FP writes. If there is a match, then the write is prevented from updating the caches, and must stay in the write buffer until it does not match anything in the FP write buffer. This stops all issuing from the write buffer until the matching entry is gone from the FP write buffer. This keeps integer and floating point writes to the same location in logical order.

It will be noted that there are associative compares of physical addresses of LOADs and STOREs to the FP write buffer. It is arranged in each case that making a mistake on these compares in the direction of saying they match when there is no match delays further processing, but does no functional harm. Consequently, it is enough to match enough low order bits to have the frequency of false compares compares low enough to not be a performance concern.

Each LOAD that comes in, including Floating PointLoads, matches its physical address against all STOREs in the Write buffer. There can be a match only if the shadow bit is not on. If it matches a logically preceding STORE (any STORE with an earlier tag that is not in the shadow of a trap), and if this LOAD missed in the D Cache, then the second level cache will not yet have the correct data. The correct data is sent from the CBOX 24 to the RAM where it is merged with data from the RAM and sent to the E Box. The Data is not written into the second level cache. The D Cache tag is updated, as usual, to show the new block valid. In actual fact, matches to the write buffer will involve only some low order bits of the PA not the entire PA. If there is a match then the full PA match is done on the single candidate pair to see if the match is real.

If it matches a logically following STORE (a STORE with a later tag that is not in a shadow), then we have an ordering problem. The LOAD got wrong data from the D Cache. If there was a D Cache tag match then this D Cache tag entry is invalidated. In any event this is treated as an ordinary D Cache miss. This implies that there will be a replay back to the Load, and a second level access is started. This action is undertaken on the basis of the match of some low order bits of the PA, not the entire PA so there will be some false matches. It is only necessary that false matches do not significantly increase the cache miss rate.

Each STORE that comes in including floating Point STOREs is matched with all logically following LOADs. Only entries with shadow bits off can match. If there is a physical address match there has been an ordering error.

In this case there is a trap, not a replay, back to the LOAD. By virtue of the LOAD being in the write buffer it is not in the shadow of a replay. First stage trap arbitration is skipped and the instruction tag goes right to second stage. No other action is required to fix this. Notice this fix also works just as well if the LOAD happened to be a floating point load. This action can be undertaken on the basis of a match of just some low order bits of the PA. Taking the trap needlessly is not a functional error. Alternatively, a full PA match could be done just on the candidate pair to confirm the match before requesting the trap, if it is desired.

This logic may be busy for a variety of reasons or out of some resource. In any such case this logic may simply ignore any instruction or any sequence of instructions. All that has to be done is that it asserts replay request for each ignored instruction.

The write buffer 62 does associative compares to its entire contents. The associative compares are to physical addresses and can be some number of low order bits of the physical address.

Memory Reference Tagging

Referring back to FIG. 2, the IBOX 20 is shown to further include an memory reference tag circuit store 33. The memory reference tag store 33 is a memory or register file circuit addressed by the instruction address from the line predictor 30 and provides at least one bit associated with said instruction indicating that the current memory reference instruction can or can not be scheduled around. This information is thus used by the ISCHED 38 as a fourth register operand (not illustrated in conjunction with FIGS. 7–13). If such a scheme were to be implemented with a instruction scheduler as ISCHED 38, the described scheduler would have additional circuitry to accommodate an additional operand.

The tag bits are provided by the Write Buffer 62, tag circuit 62a according to a predetermined algorithm. Since the Write Buffer 62 checks all memory reference instructions for possible collisions before sending the memory reference instructions onto memory, the results of these checks can be used to generate memory tags for instructions that are memory reference instructions. The memory reference tag store is a sufficient number of locations by x bits wide where x is the number of bits generated by tag circuit 62a and a sufficient number of locations is about four thousand locations for example.

Generally, a partial decode of the op-code is performed to determine if the instruction is a memory reference instruction. Either, a logic circuit is provided at the memory reference tag store or the instruction type is provided elsewhere such as at the displacement adder 30 (FIG. 2).

Several algorithms can be implemented is the write buffer tag circuit 62 to provide the tag bits. In a preferred approach, when a pair of load and store instructions cause a problem the first time through the write buffer, a portion of the address in memory which resulted in a load-store collision are saved in a register and this portion is fed to the memory tag store 33 and stored at the location in the store 33 determined by the line predictor address. Generally the lower order 2 to 6 bits of the address are sufficient to determine collisions between memory reference instructions. In an illustrative example, assume in a sequence of instructions, the following instructions are encountered after being reordered by the ISCHED 38.

|  |  |
|---|---|
| Inst 1000 |  |
| Inst 1004 |  |
| Inst 1006 |  |
| Inst 1001 |  |
| Inst 1010 |  |
| Inst 1011 | LOAD X @ 111110000101010010 |
| Inst 1008 |  |
| Inst 1009 |  |
| Inst 1010 |  |
| Inst 1007 | STORE X @ 111110000101010010 |

Assuming that it was determined by the Write Buffer 62 that the store instruction should not have been reordered in front of the second load. The write buffer tag circuit will strip the here five (5) least significant bits from the conflicting memory address and associate these bits (10010) with Inst 1007 and Inst 1011. These instruction addresses and the tag bits will be stored in the memory reference store 33. The next time these instructions are called by the line predictor, the memory reference tag circuit will provide the tag bits to be used by the instruction scheduler 38. If these two instructions appear with the identical tag bits (10010) the ISCHED 38 will not reorder the instructions and the order will thus appear as follows:

| TAG |  |  |
|---|---|---|
|  | Inst 1000 |  |
|  | Inst 1004 |  |
| (10010) | Inst 1002 | LOAD X @ 111110000101010010 |
|  | Inst 1003 |  |
|  | Inst 1006 |  |
|  | Inst 1001 |  |
|  | Inst 1010 |  |
| (10010) | Inst 1007 | STORE X @ 111110000101010010 |
| (10010) | Inst 1011 | LOAD X @ 111110000101010010 |
|  | Inst 1008 |  |
|  | Inst 1009 |  |
|  | Inst 1010 |  |

That is, the second time that the store-load pair is encountered the ISCHED 38 will not reorder instruction 1011 ahead of instruction 1007.

A second technique is to tag the memory reference instructions with a problem number which could be a number provided from a counter ie. 1 or 2 bits. Two memory reference instructions with the same address and number will not reorder. However, if the two memory reference instructions have a different number, the instructions will reorder.

A third technique would be to have a bit to indicate that an instruction should not be reordered. That is for a store that previously caused a problem in the write buffer, the instruction is tagged with a bit indicating that the ISCHED 38 cannot reorder memory reference instructions around the Instruction tagged with the bit. This in general will not affect reordering of any instructions before the tagged instruction nor reordering of any instructions after the tagged instructions.

A fourth technique would be to turn off reordereing for some distance when entering a subroutine for example. in this technique generally, during a subroutine call, there are some initial stores and some exiting loads. it would not be desirable to reorder the exiting loads before the initial stores.

Execution Box

Referring now to FIG. 20, a typical architecture for EBOX's 24 is shown to include a pipelined register stack 424 comprised of here four equal width register stacks 424a–424d, as shown. Each of said register stacks has a read port and a write port. The EBOX 24 is shown to further include a pipelined arithematic logic unit (ALU) 426 comprised of ALU's 426a–426d and a piplelined DCACHE 428 comprised of DCACHE's 428a–428 as shown. The AlU's have carry outputs which are pipelined via a register pipeline comprised of registers 425a–425c, as shown. An input pipeline comprised of registers 422a–422c is used to properly temporally line up portions of an input instruction on line 39a from the MUX 39 (FIG. 2) for execution in each of the ALU's 426a–426d. Similarily, each of the DCACHE's 428a–428d are pipelined connected via registers 430a–430c, as shown.

Each ALU has three inputs to each of two ports A and B. One input is from the corresponding Register stack 424a–424c, the second is from the corresponding DCACHE 428a–428d and the third is from the one output of the current ALU. Data from the DCACHE and the ALU are also fed to the Register stack. The ALU operates as follows: FIG. 20 presents the E Box subsystem 22, including the main register file 424a–424d, the D Cache 428a–428d, and the ALU itself 426a–428d. This EBOX 24 processes 64 bit words. As indicated in FIG. 2, The processor would contain some number of copies of this design, e.g. 22a, 22b, 22c. This E-Box design is optimized for the very shortest possible latency for integer adds and subtracts, logical operations, and D Cache accesses. That is, if another instruction J requires as input the result of a preceeding operation I that is an integer add, subtract, logical operation, or load operation that hits in the D Cache, to allow operation J to be done as quickly after operation I as possible.

To this end, the 64 bit wide E Box has been broken into 4 16 bit slices. Each slice is complete with a 16 bit register file, 16 bit ALU, and a 16 bit slice of the D Cache. A 16 bit E Box can be made with a significantly smaller latency than can a 64 bit E Box. This is due both to having fewer levels of gating, most particularly in the carry of adds and subtracts, and also in the compactness in physical layout of the much smaller 16 bit E Box compared with a 64 bit one.

The effect of a single 64 bit E Box is obtained by using the 4 16 bit slices together. Relative to slice 0 that handles bits 0–15, slice 1 that handles bits 16–31 has every function ½ cycle later in time. This is accomplished by delaying the addresses to the register file by ½ cycle in register 422a, delaying the address to the D Cache by ½ cycle in the register 430a, and delaying all of the control signals to the slice (not shown) by ½ cycle in registers that are not shown. In exactly similar fashion, slice 2 that handles bits 32–47, does every function the same as slice 1 but ½ cycle later than slice 1, which is 1 full cycle later than slice 0, and slice 3 that handles bits 48–63 does the same function ½ cycle later than slice 2, which is 1.5 cycles later than slice 0.

The staggering of the cycles provides time for the carry signal to be generated in slice 0 and brought to the slice 1 ALU early enough so that it is not delaying the addition or subtract operation in slice 1. The carry signal from slice 0 is synchronized to slice 1 timing which runs ½ cycle later in register 425a.

In exactly similar fashion the carry signal from slice 1 is brought to slice 2 early enough so as not to impede the operations in slice 2, and the carry signal from slice 2 is brought to slice 3 early enough so as not to impede the progress at slice 3.

For accesses to the D Cache, slice 0 produces address bits 0–15 which is sufficient by itself to address the D Cache RAM. In the C Box, all address bits will have to be checked to determine if the currect data was obtained from the D Cache (if it was a D Cache hit or miss), but only bits up to bit 15 are used to address the D Cache itself. This provides for a very tight loop in slice 0 including the ALU and the D Cache, for the shortest possible latency.

The same address used to access data from the D Cache in slice 0 is delayed by ½ cycle in register 430a and used for the D Cache address in slice 1. Similarly it is delayed an additional ½ cycle in register 430b and used in slice 2, and delayed an additional ½ cycle in register 430c and used in slice 3.

Having described preferred embodiments of the invention, it will now become apparent to one of ordinary skill in the art that other embodiments incorporating their concepts may be used. It is felt, therefore, that these embodiments should not be limited to the disclosed embodiments, but rather should be limited only by the spirit and scope of the appended claims.

What is claimed is:

1. Apparatus for scheduling at least two instructions per a cycle of the apparatus, comprising:

means for scheduling said at least two instructions for execution by said apparatus by providing for each instruction a cycle number indication of when the instruction can be issued by the apparatus, said means for scheduling including:

a register file addressed by a destination register operand portion of each of said instructions, said file containing fields for storing, for each of said instructions, said cycle number and a logical sequence number, said register file providing said cycle number information for determining an issue cycle for said respective instruction; and means for storing said at least two instructions, said means for storing addressed by said issue cycle number for each of said at least two instructions.

2. The apparatus of claim 1 wherein the register file of said means for scheduling further comprises:

means for storing a status bit indication of the availability of data associated with the contents of a plurality of stored register operands.

3. The apparatus of claim 2 wherein said means for scheduling further comprises:

a combinatorial logic network, coupled to receive said instructions, for determining whether a source register operand of one of said instructions is dependant upon the destination operand of any preceding instructions according to the respective logical sequence numbers of each of said instructions.

4. The apparatus of claim 3 wherein said means for scheduling further comprises:

means, coupled to said combinatorial network, for determining all possible combinations of latencies of all instructions preceding a current one of said instructions and a base number of cycles of execution when each operand of said preceding instructions will have valid data ready.

5. The apparatus of claim 4 further comprising:

means, coupled to said means for determining, for comparing the base number and latency combinations and an earliest possible cycle number value for each of said instructions, and assigning the smallest one of said values as an issue cycle number associated with said instruction.

6. The apparatus of claim 1 wherein said means for scheduling further comprises:

a status bit stored in said register file for each instruction said status bit providing an indication of the availability of data associated with the contents of the stored plurality of register operands corresponding to said at least two instructions;

means for determining whether a source register operand of one of said instructions is dependant upon a destination operand of any one of the at least two instructions preceding said instruction;

means for determining all possible combinations of latencies of all instructions preceding a current one of said at least two instructions and base number of cycles of execution when each operand of said current instruction will have valid data ready for each of said instructions preceding said current instruction according to the respective logical sequence number of each of said instructions.

7. Apparatus for scheduling at least two instructions per a cycle of the apparatus, comprising:

means for scheduling said at least two instructions for execution by said apparatus by providing for each instruction a cycle number indication of when the instruction can be issued by the apparatus, said means for scheduling including:

a register file addressed by a destination register operand portion of each of said instructions, said file containing fields for storing, for each of said instructions, said cycle number and a logical sequence number, said register file providing said cycle number information for determining an issue cycle for said respective instruction;

means for storing said at least two instructions, said means for storing addressed by said issue cycle number for each of said at least two instructions;

an index store addressed by said issue cycle number from said register file and including for each cycle number a bit which indicates whether there are valid instructions for the particular issue cycle in said means for storing said at least two instructions; and means for linking locations in said means for storing said at least two instructions for issuance during a current instruction issue cycle in accordance with the issue cycle number.

8. The apparatus of claim 7 wherein said means for scheduling further includes:

means for determining whether a source register operand of one of said instructions is dependant upon a destination operand of any one of the plurality of instructions preceding said one instruction; and means for comparing a base number and latency combinations and an earliest possible cycle number value for each of said instructions, and assigning the smallest one of said values as the issue cycle number associated with said instruction.

9. The apparatus of claim 7 wherein said means for storing further comprises:

a current cycle counter responsive to a signal from said linking means for incrementing said counter to indicate a subsequent issue cycle of instructions to issue from the apparatus and to provide a read address value for said means for storing said at least two instructions.

10. The apparatus of claim 7 wherein said scheduling means further comprises:

means for bypassing said first register file comprising:

means, responsive to addresses used to write to said first register file and to addresses used to read said register file, for comparing said addresses to determine whether there are any matches; and means, for selecting between an issue cycle number stored in said first register file, if there is a match, and an issue cycle number to be written to said register file if there is a match.

11. The apparatus of claim 10 wherein said means for storing further comprises:

means for determining a next available storage location in said means for storing said at least two instructions.

12. The apparatus of claim 11 wherein said means for determining a next available storage location asserts a stall signal if no free locations are available, said stall signal preventing further instructions from being scheduled.

* * * * *